US012577637B2

(12) United States Patent
Zehner et al.

(10) Patent No.: US 12,577,637 B2
(45) Date of Patent: Mar. 17, 2026

(54) SYSTEMS AND PROCESSES FOR THE RECOVERY OF $^{226}$Ra FROM PHOSPHOGYPSUM

(71) Applicants: SpectronRx, Indianapolis, IN (US); DMT GmbH & Co KG, Essen (DE)

(72) Inventors: John A. Zehner, Indianapolis, IN (US); Peter Webner, Fishers, IN (US); David Trump, Granger, IN (US); Michael Haschke, Essen (DE); Marie Charlotte Bornhoft, Essen (DE)

(73) Assignees: Village Enterprises, Inc., Indianapolis, IN (US); DMT GmbH & Co KG, Essen (DE)

( * ) Notice: Subject to any disclaimer, the term of this patent is extended or adjusted under 35 U.S.C. 154(b) by 0 days.

(21) Appl. No.: 18/948,314

(22) Filed: Nov. 14, 2024

(65) Prior Publication Data

US 2026/0002236 A1 Jan. 1, 2026

Related U.S. Application Data

(60) Provisional application No. 63/664,532, filed on Jun. 26, 2024.

(30) Foreign Application Priority Data

Nov. 14, 2024 (WO) ................ PCT/US2024/055997

(51) Int. Cl.
*C22B 60/00* (2006.01)
*C22B 3/06* (2006.01)
(Continued)

(52) U.S. Cl.
CPC .............. *C22B 60/00* (2013.01); *C22B 3/065* (2013.01); *C22B 3/08* (2013.01); *G21G 1/10* (2013.01); *G21G 1/12* (2013.01)

(58) Field of Classification Search
None
See application file for complete search history.

(56) References Cited

U.S. PATENT DOCUMENTS 4,311,677 A * 1/1982 Gerunda ............. C22B 60/0282 423/20
4,421,731 A 12/1983 Palmer et al.
(Continued)

OTHER PUBLICATIONS

Al-Hwaiti, M. S. Assessment of the Radiological Impacts of Treated Phosphogypsum used as the Main Constituent of Building Materials in Jordan. Environ Earth Sci 2015, 74 (4), 3159-3169.
(Continued)

*Primary Examiner* — John J Figueroa
(74) *Attorney, Agent, or Firm* — New River Valley IP Law, P.C.; Michele L. Mayberry; Ashley M. Gates

(57) ABSTRACT

Methods of processing phosphogypsum (PG) to recover Radium (e.g., $^{226}$Ra), and/or other constituents from PG, are described. PG (stockpiled PG, fresh PG or a combination) is combined with a leach solution, allowed to react for 2-6 hours (e.g., a single leaching step), at a temperature in the range of about 40-70° C. to obtain leachate and leach residue. Further processing by subjecting the leachate and/or the leach residue to one or more separation techniques, such as ion exchange, enables the recovery of one or more constituents of interest. By separating $^{226}$Ra, rare earth elements (REE) and/or other constituents from this secondary resource (e.g., waste PG), gypsum can be purified for use in the construction industry, the recovery of $^{226}$Ra can be used to produce dedicated isotopes like $^{223}$Ra and/or $^{225}$Ac for life-saving cancer medication, and raw materials can be provided for the high-tech industry, agriculture and the building industry.

21 Claims, 20 Drawing Sheets

$^{226}$Ra leaching efficiency by $Ca(NO_3)_2$ concentration

(51) Int. Cl.
*C22B 3/08* (2006.01)
*G21G 1/10* (2006.01)
*G21G 1/12* (2006.01)

(56) References Cited

U.S. PATENT DOCUMENTS

| | | | | |
|---|---|---|---|---|
| 4,431,610 A * | 2/1984 | Asagao | C22B 60/0282 423/320 |
| 8,715,598 B2 | 5/2014 | Kabai et al. | |
| 9,631,258 B2 * | 4/2017 | Genkin | C22B 59/00 |
| 2015/0284822 A1 * | 10/2015 | Abramov | C22B 7/007 423/21.5 |
| 2016/0032423 A1 * | 2/2016 | Genkin | C22B 59/00 423/21.1 |
| 2016/0047015 A1 * | 2/2016 | Genkin | C22B 3/065 423/21.1 |
| 2021/0388466 A1 * | 12/2021 | Mazouz | C22B 3/10 |
| 2023/0039227 A1 * | 2/2023 | Helmle | C04B 7/04 |
| 2024/0101440 A1 * | 3/2024 | Cohen | C22B 26/20 |

OTHER PUBLICATIONS

Al-Hwaiti, M. S. et al., Heavy metal assessment of phosphogypsum waste stockpile material from Jordan, Jun. 2005, 1 page.
Al-Marsi, M. S. et al., Chapter 2: Leaching of 226Ra from Syrian Phosphogypsum: Damascus, 1999.
Bi, Y. et al.; Removal of Radium from Synthetic Shale Gas Brines by Ion Exchange Resin. Environmental Engineering Science, 2016, 33 (10), 791-798.
Bilal, E.; et al. Phosphogypsum circular economy considerations: A critical review from more than 65 storage sites worldwide. Journal of Cleaner Production 2023, 414-137561.
Bojanowski, R.; et al. Leachability of Radionuclides from Fly Ash and Phosphogypsum. Nukleonika [Online] 1998, No. 43, 505-520.
Brower, E. and Renault, J.; Solubility and Enthalpy of the Barium-Strontium Sulfate Solid Solution Series: Circular 116. New Mexico State Bureau of Mines and Mineral Resources 1971, No. 116.
Brown, P. L. et al.; The Aqueous Chemistry of Radium. Radiochimica Acta 2022, 110 (6-9), 505-513.
Canovas, C. R.; et al. Leaching of Rare Earth Elements (REEs) and Impurities from Phosphogypsum: A Preliminary Insight for further Recovery of Critical Raw Materials. Journal of Cleaner Production 2019, 219, 225-235.
Chiarizia, R. et al.; Radium Separation Through Complexation by Aqueous Crown Ethers and Ion Exchange or Solvent Extraction*. Separation Science and Technology 1999, 34 (6-7), 931-950.
Chuan, L. M. et al.; Policies, Standards and Managements Associated with PG Utilization. IOP Conf. Ser.: Earth Environ. Sci. 2017, 81, 12084.
Cichy & Jaroszek 2013—Cichy, B.; Jaroszek, H. Phosphogypsum Management. World and Polish Practice. Przemysl Chemiczny 2013, 92, 1336-1340.
Cisse, L.; Mrabet, T. World Phosphate Production: Overview and Prospects. Phosphorus Research Bulletin 2004, 15, 21-25.
El Afifi, E. M.; et al. Treatment of Tenorm Waste: Phosphogypsum Produced in Fertilizer Industry. Radiochemistry 2010, 52 (4), 441-445.
El Afifi, E. M.; et al. Leachability of Radium-226 from Industrial Phosphogypsum Waste Using Some Simulated Natural Environmental Solutions. Environ Earth Sci 2018, 77 (3).
El Bamiki, R.; Raji, O.; Ouabid, M.; Elghali, A.; Khadiri Yazami, O.; Bodinier, J.-L. Phosphate Rocks: A Review of Sedimentary and Igneous Occurrences in Morocco. Minerals 2021, 11 (10), 1137.
El-Didamony, H.; et al. Treatment of phosphogypsum waste produced from phosphate ore processing. Journal of Hazardous Materials 2013, 244-245. 596-602.
El-Didamony, H,; et al. Treatment of Phosphogypsum Waste Using Suitable Organic Extractants. Journal of Radioanalytical and Nuclear Chemistry 2012, 291 (3), 907-914.
El-Reefy, S.A. et al.; 2007, Te-Norm in phosphogypsum characterization and treatment, abstract, Waste Management 2007—Global Accomplishments in Environmental and Radioactive Waste Management conference, Tucson, Arizona, USA.
Freyer, D. and Voigt, W., 2003, Crystallization and phase stability of CaSO4 and CaSO4—based salts, Monatshefte für Chemie, vol. 134, p. 693-719.
GC Raju, et al., Remediation of Lead Contaminated Gypsum Sludge, Geotechnical Special Publication, GeoCongress, 2008, 8 pages.
Ghose, S.; et al. Radiochemistry of Bangladeshi Phosphogypsum and Leachate Study. J Environ Sci Public Health 2020, 04 (03).
Haschke, M.; et al. Sustainable raw material supply chains for radiopharmaceutical cancer treatment by extraction of Ra-226 from phosphogypsum, IAEA International Symposium on Trends in Radiopharmaceuticals 2023 (ISTR-2023), abstract #18, Vienna.
Haschke, M.; et al. Sustainable Raw Material Supply for Radiopharmaceutical Cancer Treatment by Extraction of Ra-226 from Phosphogypsum, World Resources Forum 2023, abstract #208, Geneva.
Hedström, H. et al.; 2013, Characterization of Radium Sulfate, Journal of Nuclear Chemistry, vol. 2013, article ID 940701, 4 pages.
Kirby, H. W., Salutsky, Murrell L., Grace, W. R. The Radiochemistry of Radium; NAS—NS No. 3057: Springfield, Virginia, 1964, 216 pages.
Mashifana, T. P. Chemical Treatment of Phosphogypsum and its Potential Application for Building and Construction. Procedia Manufacturing 2019, 35, 641-648.
Matyskin, A. V. et al.; Disassembly of Old Radium Sources and Conversion of Radium Sulfate into Radium Carbonate for Subsequent Dissolution in Acid. J Radioanal Nucl Chem 2016, 310 (2), 589-595.
Mukaba, J.-L.; et al. Rare Earths' Recovery from Phosphogypsum: An Overview on Direct and Indirect Leaching Techniques. Minerals 2021, 11 (10), 1051.
Shannon, R. D. Revised Effective Ionic Radii and Systematic Studies of Interatomic Distances in Halides and Chalcogenides. Acta crystallographica section A: crystal physics, diffraction, theoretical and general crystallography 1976, 32 (5), 751-767.
Silva, N. C.; et al. Leaching Assessment of Radioactive and Non-Radioactive Elements from Brazilian Phosphogypsum IAEATECDOC 1271, 2002, 7 pages.
Zielinski, R. A.; et al. Radionuclides, Trace Elements, and Radium Residence in Phosphogypsum of Jordan. Environmental geochemistry and health 2011, 33 (2), 149-165.

* cited by examiner

Comparison of absolute activity of PG-mix and the LRs and $\xi^{LR}$ of BRTs 1-11

$^{226}$Ra leaching efficiency depending on temperature and Ca(NO3)2 concentration verification tests (circles) and the BRTs (squares)

SYSTEMS AND PROCESSES FOR THE RECOVERY OF $^{226}$Ra FROM PHOSPHOGYPSUM

CROSS-REFERENCE TO RELATED APPLICATIONS

The present application relies on the disclosure of and claims priority to and the benefit of the filing date of U.S. Provisional Patent Application No. 63/664,532, filed Jun. 26, 2024, which is hereby incorporated by reference herein in its entirety.

BACKGROUND OF THE INVENTION

Field of the Invention

The present invention relates to the field of hydrometallurgical processing of phosphogypsum (PG) to separate and/or recover Radium and/or other elements and/or contaminants from waste PG.

Description of Related Art

Phosphogypsum (PG) is a typical waste product from the processing of natural phosphate deposits for fertilizer production. In the production of fertilizer, for every ton of phosphate fertilizer, typically on the order of about 5.5 tons of PG (usually considered waste) is produced. (Chuan 2017-Chuan, L. M.; Zheng, H. G.; Zhao, J. J.; Wang, A. L.; Sun, S. F. Policies, Standards and Managements Associated with PG Utilization. *IOP Conf. Ser.: Earth Environ. Sci.* 2017, 81, 12084. DOI: 10.1088/1755-1315/81/1/012084.) The estimated annual generation of PG worldwide is about 100 to 280 million metric tons. (Chuan 2017). This PG is typically stockpiled nearby the fertilizer production site, and due to the natural radioactive constituents of sedimentary phosphate (e.g., Radium and/or Uranium) and other trace elements, such as REE (rare earth elements) as a CRM (critical raw material), and/or fluorine bearing minerals, the stockpiled PG is not suitable for direct use in the construction materials industry. Therefore, it would be highly desirable to separate contaminants from stockpiled PG to render the PG useful.

By separating (and in some cases recovering) $^{226}$Ra, rare earth elements (REE), phosphorous (P), sulfur(S), heavy metal content such as Cadmium, and/or other constituents from this secondary resource, gypsum can be purified for use in the construction industry. Additionally, $^{226}$Ra in particular is a preferred source of raw material for further processing into dedicated medical isotopes, such as Ac-225 for life-saving alpha cancer therapy. Likewise, REE and P can be recovered as critical raw materials for the high-tech industry and agriculture (e.g., soil amendments), and calcium sulfate as a raw material for the building industry (e.g., for gypsum board, plaster).

$^{226}$Ra is the most stable radium isotope with a half-life of about 1,600 years and is thus suitable for recovery. (IAEA 1990-International Atomic Energy Agency. *The Environmental Behavior of Radium. Volume* 2. Technical Report Series No. 310, 1990.) Additionally, as a decay product of uranium, $^{226}$Ra is a low-radioactive mainly alpha particle emitter. (IAEA 1990.) Thus, Ra extraction can therefore be monitored by γ-spectroscopy indirectly through the detection of secondary gamma radiation.

In nature, $^{226}$Ra occurs due to its production in primordial decay-chains. The occurrence of the radionuclide $^{226}$Ra with a half-life of 1,600 years is caused by the decay of $^{238}$U in the Uranium-Radium decay-chain. Once a parent nuclide starts to feed the decay-chain, the individual activities of the chain nuclides start to build up. In dependency of the specific half-lives of the chain-nuclides, an activity equilibrium is reached after a certain time. Hydrochemical processes (e.g., selective leaching and/or recovery by extraction and/or precipitation) lead to a disturbance of the equilibrium in the sample, enabling materials such as $^{226}$Ra to be extracted from the natural source.

Phosphate deposits are distributed all over the world. The largest phosphor resources are located in Morocco (Western Sahara), China, Southern Africa, Jordan, and the United States. (Cichy & Jaroszek 2013-Cichy, B.; Jaroszek, H. Phosphogypsum Management. World and Polish Practice. *Przemysl Chemiczny* 2013, 92, 1336-1340.) The ore feed for phosphate production varies from sedimentary to igneous rocks. (Cisse, L.; Mrabet, T. World Phosphate Production: Overview and Prospects. *Phosphorus Research Bulletin* 2004, 15, 21-25.) The main sedimentary deposits include phosphorites (large-area phosphate deposits) and guano deposits (accumulated excrement of seabirds). Typical igneous phosphate carriers include carbonatites, alkaline intrusions, and phoscorites. These two deposit types differ in their orogeneses, but phosphorus is mainly incorporated in apatites in both. Thus, phosphorus production methods typically focus on the separation and refinement of these apatites (e.g., via flotation). The apatite concentrates are further processed by sulfuric, nitric, or phosphoric acid dissolution or thermal processing to produce phosphorus or phosphoric acid. The characteristics of each feed ore for phosphorus production and associated phosphogypsum co-production are reflected in the trace element concentrations, including Radium, in phosphogypsum.

PG tailings from phosphate production are mainly composed of calcium sulfate hydrates (e.g., gypsum). Even though the general elemental composition of different samples is very similar, they seem to differ in their mineralogical composition. Significant variations in chemical behavior are described in the literature depending on the base metal impurities of the primary phosphate, and the process management during production and stockpiling. In particular, the amount of REE and $^{226}$Ra in the PGs show a high degree of variability, with $^{226}$Ra being concentrated in PG from sedimentary phosphate deposits.

The general composition of phosphogypsum has been known to include CaO, $SO_4$, $SiO_2$, $Na_2O$, C (organic), F, $P_2O_6$, $Al_2O_3$, CI MgO, $Fe_2O_3$, Ti, Co, Cu, Zn, Hg, Pb, As, Ba, Th, U, and/or REE (+Y+Sc) as shown in Table 1:

TABLE 1

General/Typical Composition of PGs

| Element | Concentration (%) | Element | Concentration (ppm) |
|---|---|---|---|
| CaO | 24-34 | Ti | 26-470 |
| $SO_4$ | 48-58 | Co | 0.05-2.3 |
| $SiO_2$ | 0.5-18 | Cu | 2-195 |
| $Na_2O$ | 0.12-10 | Zn | 4-315 |
| C (organic) | 0.1-2.5 | Hg | 0.005-10 |
| F | 0.1-1.8 | Pb | 0.5-13.8 |
| $P_2O_6$ | 0.05-8 | As | 1.0-42 |
| $Al_2O_3$ | 0.05-6 | Ba | 20-236 |
| Cl | 0.035-0.045 | Th | 0.4-4 |
| MgO | 0.01-0.54 | U | 0.5-13.8 |
| $Fe_2O_3$ | 0.01-0.25 | REE (+Y + Sc) | 250-5500 |

Heavy metals in phosphogypsum have been found to include cadmium, chromium, manganese, and nickel, among others, and have been reported at concentrations of up to about 7 ppm for cadmium, up to about 8 ppm for chromium, up to about 15 ppm for manganese, and up to about 2 ppm for nickel. (Al-Hwaiti, M. S. et al., Heavy metal assessment of phosphogypsum waste stockpile material from Jordan1, June 2005, DOI: 10.21000/JASMR05010001.)

The Ra concentration of PG varies between 40-9,000 Bq/kg and depends on the genesis of the phosphate mineral, while REE concentration is typically between 250 and 5,500 ppm. The characteristic properties of PGs change over time due to the PG ageing processes, with a consistent pattern of REE, U, Pb, Sr, and Ra becoming more enriched as the phosphogypsum ages. It has been found that the aging of PG has an impact on Ra leachability, with fresh PG typically showing higher Ra recoveries than stockpiled PG. (Zielinski, R. A.; Al-Hwaiti, M. S.; Budahn, J. R.; Ranville, J. F. Radionuclides, Trace Elements, and Radium Residence in Phosphogypsum of Jordan. Environmental geochemistry and health 2011, 33 (2), 149-165. DOI: 10.1007/s10653-010-9328-4.) It is believed that this can be attributed to the formation and crystallization of barite (Ba,Ra) $SO_4$, and to the ongoing dissolution of gypsum, as well as the lower water solubility of $^{226}$Ra in aged samples. Additionally, $^{226}$Ra leaching efficiency depends on the lixiviant and characteristics of the PG.

The composition of PG also depends on particle size. Radionuclides are known to accumulate in the fine fraction of PG. The results of PG characterization from El-Didamony verified this enrichment in the fine particles by stronger activity of $^{226}$Ra, $^{210}$Pb, $^{238}$UJ and $^{40}$K in this fine fraction compared to the bulk of PG. (El-Didamony 2012; see also Al-Hwaiti 2005.)

The mobility of $^{226}$Ra in PG has been investigated. The test approaches used are diverse, with most studies focusing on radioactive drainage in relation to water and soil contamination or $^{226}$Ra removal from PG for the construction industry. There may also be a correlation between Ra leachability and the origin of the processed feed rock. Based on the literature, sedimentary deposits are typically more abundant and larger in volume than igneous deposits, and higher in $^{226}$Ra concentration, with higher Ra leaching efficiencies obtained for PG produced from sedimentary phosphate (Table 2):

TABLE 2

Overview of PG sources based on geological origin

| Country | Deposit Type | Ra concentration (Bq/Kg) | Reference |
|---|---|---|---|
| Togo | Sedimentary | Up to 2000 | Rutherford 1995 |
| Jordan | Sedimentary | 328.80 ± 1.3 to 355.6 ± 1.2 | Al-Hwaiti 2015 |
| Southern Africa | Igneous | 1.4.54 | El Bamiki 2021 Machifana 2019 |
| Syria | Sedimentary | 434 | Al-Marsi 1999 |
| Egypt | — | 461 ± 12 | El Afifi 2018 |
| Egypt | Sedimentary | — | El Afifi 2010 |
| Brazil | Igneous | 889 ± 52 | Silva 2002 |
| Brazil | Igneous | 170 ± 13 | Silva 2002 |
| Egypt | Sedimentary | 347-555 | El-Reefy 2007 El-Didamony 2012 |

See, e.g., Rutherford, P. M.; Dudas, M. J.; Arocena, J. M. Radium in Phosphogypsum Leachates. *Journal of environmental quality* 1995, 24 (2), 307-314. DOI: 10.2134/jeq1995.00472425002400020014x; Al-Hwaiti, M. S. Assessment of the Radiological Impacts of Treated Phosphogypsum used as the Main Constituent of Building Materials in Jordan. *Environ Earth Sci* 2015, 74 (4), 3159-3169. DOI: 10.1007/s12665-015-4354-2; El Bamiki, R.; Raji, O.; Ouabid, M.; Elghali, A.; Khadiri Yazami, O.; Bodinier, J.-L. Phosphate Rocks: A Review of Sedimentary and Igneous Occurrences in Morocco. *Minerals* 2021, 11 (10), 1137. DOI: 10.3390/min11101137; Mashifana, T. P. Chemical Treatment of Phosphogypsum and its Potential Application for Building and Construction. *Procedia Manufacturing* 2019, 35, 641-648. DOI: 10.1016/j.promfg.2019.06.007; Al-Marsi, M. S.; Ali, A. I.; Khietou, M.; Al-Hares, Z. Chapter 2*: Leaching of* 226*Ra from Syrian Phosphogypsum: Damascus,* 1999; El Afifi, E. M.; Khalil, M.; El-Aryan, Y. F. Leachability of Radium-226 from Industrial Phosphogypsum Waste Using Some Simulated Natural Environmental Solutions. *Environ Earth Sci* 2018, 77 (3). DOI: 10.1007/s12665-018-7277-x; El Afifi, E. M.; Attallah, M. F.; Hilal, M. A.; El Reefy, S. A. Treatment of TENORM Waste: Phosphogypsum Produced in Fertilizer Industry. *Radiochemistry* 2010, 52 (4), 441-445. DOI: 10.1134/S106636221004020X; Silva, N. C., Nadai Fernandes, E. A. de, Cipriani, M., Taddei, M. H. T. *Leaching Assessment of Radioactive and Non-Radioactive Elements from Brazilian Phosphogypsum* IAEA-TECDOC-1271, 2002; El-Reefy, S. A., AttaAllah, M. F., Hilal, M. A., El-Afifi, E. M., 2007, TE-NORM in phosphogypsum characterization and treatment, abstract, Waste Management 2007-Global Accomplishments in Environmental and Radioactive Waste Management conference, Tucson, Arizona, USA, 25. February-1 Mar. 2007 (El-Reefy 2007); El-Didamony, H.; Ali, M. M.; Awwad, N. S.; Fawzy, M. M.; Attallah, M. F. Treatment of Phosphogypsum Waste Using Suitable Organic Extractants. J. *Radioanalytical and Nuclear Chem.* 2012, 291 (3), 907-914. DOI: 10.1007/s10967-011-1547-3.

For example, Silva 2002 demonstrated very low (<1%) $^{226}$Ra recovery from PG using glacial acetic acid, water doped with sodium hydroxide, and a mixture of anionic IRA 420 and cationic IRA 120 resins (made by Holm and Haas).

Al-Hwaiti 2015 treated Jordanian PG for the building industry and successfully extracted 80-85% of the $^{226}$Ra from PG independent of the leaching medium (water: solid liquid ratio (SLR)=0.25, low concentrated sulfuric acid about 5%: SLR (solid to liquid ratio)=2, calcium carbonate: SSR=2.6-4), while leaching of the same PG with hybrid water (mixed solution of lime water with sea, tap, or distilled water) resulted in rates of greater than 80%.

El-Didamony 2012 investigated the leachability of radionuclides (Ra, Pb, U, K) from PG with a solvometallurgical approach, comparing the extraction rates of four commercial extractants: tributyl phosphate (TBP), trioctylphosphine oxide (TOPO), triphenylphosphine oxide (TPPO), and di(2-ethylhexyl)phosphoric acid (DEHPA). The leaching approach included a 2-hour contact/residence time, 0.5 M TBP concentration in kerosene (13.6% v/v), a liquid: solid ratio of 1:1 (TBP in kerosene vol./PG wt.), and a temperature of 25-75° C., such as 55° C. Notably, the PG was separated into six homogenous fractions and the 63 μm fraction was chosen over the 44 μm fraction. The complete removal of the organic phase from the treated PG must be questioned, however, since substances such as TBP are classified as carcinogenic and could therefore create a new hazardous potential. Additionally, no information on the potential competition of Ca and Ba was given, thus, it is not apparent that the Ra could be extracted from the leach solution in an efficient manner to actually recover a high yield of Ra.

Cánovas 2019 used $HNO_3$ or $H_2SO_4$ as a leaching agent to separate REEs from PG. The leaching rates of REEs with the addition of 3 mol/L $HNO_3$ and 0.5 mol/L $H_2SO_4$ were 80% (dissolving 63% of the gypsum) and 46%-58% (dissolving less than 6% of the gypsum), respectively. (Canovas, C. R.; Chapron, S.; Arrachart, G.; Pellet-Rostaing, S. Leaching of Rare Earth Elements (REEs) and Impurities from Phosphogypsum: A Preliminary Insight for further Recovery of Critical Raw Materials. *Journal of Cleaner Production* 2019, 219, 225-235. DOI: 10.1016/j.jclepro.2019.02.104.)

El Afifi 2010 compared $^{226}Ra$ leach tests (e.g., single-leach) with salt addition and acid addition, and reported that the highest Ra extraction efficiency achieved was only 48% (using a $Ca(NO_3)_2$ as lixiviant to treat a PG fraction that included particle sizes of up to 600 microns). El Afifi 2010 achieved an efficiency of 87% Ra recovery into a leaching solution using a double-leach, multi-step leach process, which involved washing PG waste (50 g) with 0.05 M NaOH, then treatment with 20% $Na_2CO_3$ (100 mL) for 4 hours at 85° C., followed by double leaching with 2.5 M $HNO_3$ (100 mL) for 1 hour at 25° C. Increasing the number of processing steps in this manner, however, is economically undesirable. Additionally, this process includes the unneeded digestion of carbonates, which consequently results in additional remediation steps for managing the formation of undesirable $CO_2$. Further, no information was provided regarding whether the process would be capable of achieving similar results when scaled up, nor if the process would be practical for processing larger amounts of PG (i.e., tons/day of PG), especially with respect to managing larger amounts of starting materials and reagents, as well as the production of larger amounts of $CO_2$. Multiple-leach techniques are additionally impractical in that the Ra-pregnant solutions (PLS) obtained from successive leaching steps would require either the merging of the PLS batches prior to extraction of $^{226}Ra$ from the PLS, or would require extraction of the $^{226}Ra$ from each of multiple PLS batches, resulting in an inefficient/impractical multi-stage $^{226}Ra$-extraction. Additionally, one of ordinary skill in the art would recognize that, when upscaled, such sequential leaching processes (e.g., double leaching) would add millions of dollars to the cost, rendering such production/processing prohibitively expensive. Further, in El Afifi 2010, γ-ray measurements of the material before and after leaching are used to confirm $^{226}Ra$ yield, and no step of extracting $^{226}Ra$ from the leach solution was actually performed. Because the success of extraction methods depends on the constituents of the subject liquid (e.g., different particles/substances may be present as a result of different leaching methods, which may potentially interfere with the efficiency/ability of the extraction of $^{226}Ra$ from the liquid), there is no indication that extraction from the leaching solution of El Afifi 2010 would result in a high yield of $^{226}Ra$.

Ghose & Heaton 2020 have demonstrated that leaching of PG with deionized water typically results in higher Ra leachability for fresh PG compared to aged PG. In the leaching process of Ghose & Heaton 2020, only about 50% of the $^{226}Ra$ had been leached by about 2 hours and only about 57% leached by about 40 hours, while about 80% was leached by about 240 hours. To obtain the higher leaching yields, however, the long contact time (e.g., on the order of 1-2 weeks) is very impractical for processing large amounts of PG. Additionally, the authors showed that the experimental data are related to the acidity of the liquid fraction, i.e., when phosphoric acid is present in the PG samples it affects the pH and the associated leachability of $^{226}Ra$. Further, the authors demonstrated that only 3% of $^{226}Ra$ could be leached with pure water.

Bojanowski 1998 described similar findings with only low $^{226}Ra$ leachability in water. They investigated a subsequent-leaching process (4-5 times) using deionized (DI) for 8 h, whereby the $^{226}Ra$ concentration in solution decreased with increasing leaching stage. (Bojanowski 1998-Bojanowski, R.; Piekos, R.; Paslawska, S. Leachability of Radionuclides from Fly Ash and Phosphogypsum. *Nukleonika* [Online] 1998, No. 43, 505-520.)

Moreira 2018 demonstrated the highest extraction for $^{226}Ra$ with leaching efficiency of 94%, by common acid leaching using 1 M HCl. (Moreira 2018-Moreira, R. H.; Queiroga, F. S.; Paiva, H. A.; Medina, N. H.; Fontana, G.; Guazzelli, M. A. Extraction of Natural Radionuclides in TENORM Waste Phosphogypsum. *Journal of Environmental Chemical Engineering* 2018, 6 (5), 6664-6668. DOI: 10.1016/j.jece.2018.10.019.)

The lack of practical remediation and management techniques to dispose of stockpiles of radioactive PG waste worldwide presents a great environmental concern. What is needed is an efficient and cost-effective approach to separating $^{226}Ra$ from waste PG. By way of a single-stage leaching in combination with a particular $^{226}Ra$-extraction method, the inventors provide a high-yield, efficient, and practical method for separating $^{226}Ra$ from PG with a low footprint and high scalability.

SUMMARY OF THE INVENTION

Embodiments of the invention include systems and methods for processing PG in a manner to separate and/or remove one or more elements and/or contaminants from PG. In embodiments, PG is treated in a manner to separate $^{226}Ra$ therefrom, and optionally in a manner which allows for the recovery of $^{226}Ra$ and/or the recovery of PG by-product (e.g., purified PG) and/or the recovery of other constituents of interest. Further, recovered $^{226}Ra$ can be used as a raw material in the production of dedicated isotopes such as $^{225}Ac$ for medical purposes. Once the source raw material $^{226}Ra$ is recovered, it can be irradiated to a different level to naturally decay to $^{225}Ac$. One preferred route for production of $^{225}Ac$ from $^{226}Ra$ is via accelerator irradiation using Rhodotron technology where electrons are accelerated to generate an electron beam at 40 MeV to reach the $^{226}Ra$ target. The $^{226}Ra$ in the target is irradiated creating the $^{226}Ra(g,n)^{225}Ra$ by photoreaction. The $^{225}Ra$ will then naturally decay into $^{225}Ac$. After irradiation the $^{226}Ra$ could be recycled and reconditioned. Once radioactive $^{226}Ra$ is removed from PG, the remaining material (radioactive-free or reduced in radioactivity) can be used for the production of several marketable products, including gypsum, phosphorus (e.g., as fertilizer), rare earth elements (REE) and other critical raw materials (CRM), and NORM-free products (e.g., materials having an amount of radioactivity below a specified limit). Of particular interest are processes for $^{226}Ra$ separation as sustainable methods of waste-free recycling of PG tailings.

Embodiments of the invention include Aspect 1, which is a method of processing PG, the method comprising: combining a first batch of PG with one or more lixiviant (e.g., leach solution); optionally, wherein the first batch of PG is stockpiled PG, fresh PG or a combination; allowing the leach solution to react with the first batch of PG for a residence time of up to about 24 hours and at a temperature in the range of about room temperature to about 70° C., to obtain a first batch of leachate/pregnant leach solution (PLS) and solids (leach residue); and separating the first batch of leachate/PLS from the solids (leach residue).

Further included within Aspect 1, in particular, is a method of processing PG, the method comprising: combining a first batch of PG (e.g., stockpiled PG, fresh PG or a combination) with a leaching agent/solution (lixiviant) chosen from $H_2O$ (water, de-ionized water, tap water, rain water, lime water (e.g., saturated lime water) etc.); allowing the leaching agent/solution to react with the first batch of PG for a residence time of 2, 3, 4, 5 or 6 hours (optionally wherein the residence time is a single period of time thereby constituting a single leaching step), and at a temperature in the range of about 40-70° C., such as about 45-65° C., or about 50-60° C., or about 50-55° C., to obtain a first batch of leachate/pregnant leach solution (PLS) and solids/leach residue; and separating the first batch of leachate/PLS from the solids, optionally further subjecting the first batch of leachate and/or the leach residue to one or more separation techniques, such as ion exchange and contacting at least a portion of the first batch of leachate with an ion exchange resin, thereby separating $^{226}Ra$ from the first batch of leachate to obtain an amount of $^{226}Ra$.

Further included within Aspect 1, in particular, is a method of processing PG, the method comprising: combining a first batch of PG (e.g., stockpiled PG, fresh PG or a combination) with a leaching agent/solution (lixiviant) chosen from NaCl (such as 1-20%, such as 5%, 10% or 15% NaCl); allowing the leaching agent/solution to react with the first batch of PG for a residence time of 2, 3, 4, 5 or 6 hours (optionally wherein the residence time is a single period of time thereby constituting a single leaching step), and at a temperature in the range of about 40-70° C., such as about 45-65° C., or about 50-60° C., or about 50-55° C., to obtain a first batch of leachate/pregnant leach solution (PLS) and solids/leach residue; and separating the first batch of leachate/PLS from the solids, optionally further subjecting the first batch of leachate and/or the leach residue to one or more separation techniques, such as ion exchange and contacting at least a portion of the first batch of leachate with an ion exchange resin, thereby separating $^{226}Ra$ from the first batch of leachate to obtain an amount of $^{226}Ra$.

Further included within Aspect 1, in particular, is a method of processing PG, the method comprising: combining a first batch of PG (e.g., stockpiled PG, fresh PG or a combination) with a leaching agent/solution (lixiviant) chosen from a solution of $NaCl+BaCl_2$ (such as 10% NaCl+ 0.1% $BaCl_2$, or 20% NaCl+0.2% $BaCl_2$, or 1-20% NaCl+ 0.05-0.5% $BaCl_2$,); allowing the leaching agent/solution to react with the first batch of PG for a residence time of 2, 3, 4, 5 or 6 hours (optionally wherein the residence time is a single period of time thereby constituting a single leaching step), and at a temperature in the range of about 40-70° C., such as about 45-65° C., or about 50-60° C., or about 50-55° C., to obtain a first batch of leachate/pregnant leach solution (PLS) and solids/leach residue; and separating the first batch of leachate/PLS from the solids, optionally further subjecting the first batch of leachate and/or the leach residue to one or more separation techniques, such as ion exchange and contacting at least a portion of the first batch of leachate with an ion exchange resin, thereby separating $^{226}Ra$ from the first batch of leachate to obtain an amount of $^{226}Ra$.

Further included within Aspect 1, in particular, is a method of processing PG, the method comprising: combining a first batch of PG (e.g., stockpiled PG, fresh PG or a combination) with a leaching agent/solution (lixiviant) chosen from $Ca(NO_3)_2$ (such as 2-40% $Ca(NO_3)_2$, such as 5%, 10%, 15%, 20%, 25%, 30%, or 35% $Ca(NO_3)_2$); allowing the leaching agent/solution to react with the first batch of PG for a residence time of 2, 3, 4, 5 or 6 hours (optionally wherein the residence time is a single period of time thereby constituting a single leaching step), and at a temperature in the range of about 40-70° C., such as about 45-65° C., or about 50-60° C., or about 50-55° C., to obtain a first batch of leachate/pregnant leach solution (PLS) and solids/leach residue; and separating the first batch of leachate/PLS from the solids, optionally further subjecting the first batch of leachate and/or the leach residue to one or more separation techniques, such as ion exchange and contacting at least a portion of the first batch of leachate with an ion exchange resin, thereby separating $^{226}Ra$ from the first batch of leachate to obtain an amount of $^{226}Ra$.

Further included within Aspect 1, in particular, is a method of processing PG, the method comprising: combining a first batch of PG (e.g., stockpiled PG, fresh PG or a combination) with a leaching agent/solution (lixiviant) chosen from $NH_4Ac$ (such as 2-30% $NH_4Ac$, such as 5%, 10%, 15%, 20%, or 25% $NH_4Ac$); allowing the leaching agent/solution to react with the first batch of PG for a residence time of 2, 3, 4, 5 or 6 hours (optionally wherein the residence time is a single period of time thereby constituting a single leaching step), and at a temperature in the range of about 40-70° C., such as about 45-65° C., or about 50-60° C., or about 50-55° C., to obtain a first batch of leachate/pregnant leach solution (PLS) and solids/leach residue; and separating the first batch of leachate/PLS from the solids, optionally further subjecting the first batch of leachate and/or the leach residue to one or more separation techniques, such as ion exchange and contacting at least a portion of the first batch of leachate with an ion exchange resin, thereby separating radium from the first batch of leachate to obtain an amount of $^{226}Ra$.

Further included within Aspect 1, in particular, is a method of processing PG, the method comprising: combining a first batch of PG (e.g., stockpiled PG, fresh PG or a combination) with a leaching agent/solution (lixiviant) chosen from NaOH (such as 5-30% NaOH, such as 5%, 10%, 15%, 20%, or 25% NaOH); allowing the leaching agent/solution to react with the first batch of PG for a residence time of 2, 3, 4, 5 or 6 hours (optionally wherein the residence time is a single period of time thereby constituting a single leaching step), and at a temperature in the range of about 40-70° C., such as about 45-65° C., or about 50-60° C., or about 50-55° C., to obtain a first batch of leachate/pregnant leach solution (PLS) and solids/leach residue; and separating the first batch of leachate/PLS from the solids, optionally further subjecting the first batch of leachate and/or the leach residue to one or more separation techniques, such as ion exchange and contacting at least a portion of the first batch of leachate with an ion exchange resin, thereby separating radium from the first batch of leachate to obtain an amount of $^{226}Ra$.

Further included within Aspect 1, in particular, is a method of processing PG, the method comprising: combining a first batch of PG (e.g., stockpiled PG, fresh PG or a combination) with a leaching agent/solution (lixiviant) chosen from $H_2SO_4$ (such as 2-20% $H_2SO_4$, such as 5%, 10%, or 15% $H_2SO_4$); allowing the leaching agent/solution to react with the first batch of PG for a residence time of 2, 3, 4, 5 or 6 hours (optionally wherein the residence time is a single period of time thereby constituting a single leaching step), and at a temperature in the range of about 40-70° C., such as about 45-65° C., or about 50-60° C., or about 50-55° C., to obtain a first batch of leachate/pregnant leach solution (PLS) and solids/leach residue; and separating the first batch of leachate/PLS from the solids, optionally further subjecting the first batch of leachate and/or the leach residue to one or more separation techniques, such as ion exchange and contacting at least a portion of the first batch of leachate with an ion exchange resin, thereby separating radium from the first batch of leachate to obtain an amount of $^{226}Ra$.

Further included within Aspect 1, in particular, is a method of processing PG, the method comprising: combining a first batch of PG (e.g., stockpiled PG, fresh PG or a combination) with a leaching agent/solution (lixiviant) chosen from $HNO_3$ (such as 2-20% $HNO_3$, such as 2-10% $HNO_3$, such as 3%, 4%, 5%, 10%, or 15% $HNO_3$); allowing the leaching agent/solution to react with the first batch of PG for a residence time of 2, 3, 4, 5 or 6 hours (optionally wherein the residence time is a single period of time thereby constituting a single leaching step), and at a temperature in the range of about 40-70° C., such as about 45-65° C., or about 50-60° C., or about 50-55° C., to obtain a first batch of leachate/pregnant leach solution (PLS) and solids/leach residue; and separating the first batch of leachate/PLS from the solids, optionally further subjecting the first batch of leachate and/or the leach residue to one or more separation techniques, such as ion exchange and contacting at least a portion of the first batch of leachate with an ion exchange resin, thereby separating radium from the first batch of leachate to obtain an amount of $^{226}Ra$.

Further included within Aspect 1, in particular, is a method of processing PG, the method comprising: combining a first batch of PG (e.g., stockpiled PG, fresh PG or a combination) with a leaching agent/solution (lixiviant) chosen from $H_2Ox$ (such as 2-20% $H_2Ox$, such as 5%, 10%, or 15% $H_2Ox$); allowing the leaching agent/solution to react with the first batch of PG for a residence time of 2, 3, 4, 5 or 6 hours (optionally wherein the residence time is a single period of time thereby constituting a single leaching step), and at a temperature in the range of about 40-70° C., such as about 45-65° C., or about 50-60° C., or about 50-55° C., to obtain a first batch of leachate/pregnant leach solution (PLS) and solids/leach residue; and separating the first batch of leachate/PLS from the solids, optionally further subjecting the first batch of leachate and/or the leach residue to one or more separation techniques, such as ion exchange and contacting at least a portion of the first batch of leachate with an ion exchange resin, thereby separating $^{226}Ra$ from the first batch of leachate to obtain an amount of $^{226}Ra$.

Further included within Aspect 1, in particular, is a method of processing PG, the method comprising: combining a first batch of PG (e.g., stockpiled PG, fresh PG or a combination) with a leaching agent/solution (lixiviant) chosen from a solution of $Ca(NO_3)_2+HNO_3$ (such as 5% $Ca(NO_3)_{2+3}$% $HNO_3$, such as 10% $Ca(NO_3)_{2+5}$% $HNO_3$, such as 15% $Ca(NO_3)_{2+2}$-10% $HNO_3$, such as 5% $Ca(NO_3)_{2+5}$-15% $HNO_3$, such as 10% $Ca(NO_3)_{2+2}$-10% $HNO_3$); allowing the leaching agent/solution to react with the first batch of PG for a residence time of 2, 3, 4, 5 or 6 hours (optionally wherein the residence time is a single period of time thereby constituting a single leaching step), and at a temperature in the range of about 40-70° C., such as about 45-65° C., or about 50-60° C., or about 50-55° C., to obtain a first batch of leachate/pregnant leach solution (PLS) and solids/leach residue; and separating the first batch of leachate/PLS from the solids, optionally further subjecting the first batch of leachate and/or the leach residue to one or more separation techniques, such as ion exchange and contacting at least a portion of the first batch of leachate with an ion exchange resin, thereby separating $^{226}Ra$ from the first batch of leachate to obtain an amount of $^{226}Ra$.

Further included within Aspect 1, in particular, is a method of processing PG, the method comprising: combining a first batch of PG (e.g., stockpiled PG, fresh PG or a combination) with a leaching agent/solution (lixiviant) chosen from one or more nitrate salts, such as $NaNO_3$; allowing the leaching agent/solution to react with the first batch of PG for a residence time of 2, 3, 4, 5 or 6 hours (optionally wherein the residence time is a single period of time thereby constituting a single leaching step), and at a temperature in the range of about 40-70° C., such as about 45-65° C., or about 50-60° C., or about 50-55° C., to obtain a first batch of leachate/pregnant leach solution (PLS) and solids/leach residue; and separating the first batch of leachate/PLS from the solids, optionally further subjecting the first batch of leachate and/or the leach residue to one or more separation techniques, such as ion exchange and contacting at least a portion of the first batch of leachate with an ion exchange resin, thereby separating $^{226}Ra$ from the first batch of leachate to obtain an amount of $^{226}Ra$.

Further included within Aspect 1, in particular, is a method of processing PG, the method comprising: combining a first batch of PG (e.g., stockpiled PG, fresh PG or a combination) with a leaching agent/solution (lixiviant) chosen from $Ca(NO_3)_2$, such as about 10-30% $Ca(NO_3)_2$, such as 20% $Ca(NO_3)_2$; allowing the leaching agent/solution to react with the first batch of PG for a residence time 3-5 hours, such as about 4 hours (optionally wherein the residence time is a single period of time thereby constituting a single leaching step), and at a temperature in the range of about 45-65° C., or about 50-60° C., or about 50-55° C., to obtain a first batch of leachate/pregnant leach solution (PLS) and solids/leach residue; and separating the first batch of leachate/PLS from the solids, optionally further subjecting the first batch of leachate and/or the leach residue to one or more separation techniques, such as ion exchange and contacting at least a portion of the first batch of leachate with an ion exchange resin, thereby separating $^{226}Ra$ from the first batch of leachate to obtain an amount of $^{226}Ra$.

Aspect 2 is the method of Aspect 1, further comprising separating a fine fraction from the PG, such as by using a sieve, wherein at least 75% of particles of the fine fraction are less than 25 microns in diameter, wherein the leaching is performed on the fine fraction.

Aspect 3 is the method of Aspect 1 or 2, further comprising subjecting the PLS and/or the solids (leach residue) to one or more separation techniques, such as separation by precipitation, ion exchange chromatography, solvent extraction, and/or membrane technologies.

Aspect 4 is the method of any of Aspects 1-3, wherein the separation technique is capable of separating one or more of the following constituents from the PLS or the solids: i) one or more alkaline earth metals, including for example radium (here $^{226}Ra$), calcium, barium; ii) one or more of thorium, uranium, fluorine, phosphorus, phosphate; iii) naturally occurring radioactive material (NORM); iv) technologically enhanced naturally occurring radioactive material (TENORM); v) gypsum; vi) heavy metals, such as Zn, Cr, Mn, Ni, Pb, Cd, As, Hg, Ag, Cu, Fe, Pd, Pt; vii) rare earth elements (REEs), such as: a) Sb, Be, Co, Ga, Ge, Mg, In; b) Platinum Group Elements (PGMs), such as platinum, palladium, rhodium, ruthenium, iridium, osmium; c) Nb and Ta; d) lanthanides (such as light REEs (LREEs), including La, Ce, Pr, Nd, Pm, Sm, and heavy rare earth elements (HREEs), including Eu, Gd, Tb, Dy, Ho, Er, Tm, Yb, Lu); e) Sc, Y (an HREE).

Aspect 5 is the method of any of Aspects 1-4, comprising separating $^{226}Ra$ from the PLS to obtain: i) an amount of $^{226}Ra$ and ii) one or more raffinate.

Aspect 6 is the method of any of Aspects 1-5, comprising recycling the raffinate for processing of additional PG.

Aspect 7 is the method of any of Aspects 1-6, comprising processing $^{226}Ra$ for one or more medical uses and/or processing the solids to obtain one or more construction product, such as NORM-free gypsum.

Aspect 8 is the method of any of Aspects 1-7, comprising: A) combining fresh and/or stockpiled PG with one or more lixiviant (leach solution) optionally chosen from i) $H_2O$ (water, de-ionized water, tap water, rain water, etc.); ii) NaCl (e.g., 1-20%, such as 5%, 10% or 15% NaCl, or any range in between); iii) a solution of NaCl+$BaCl_2$ (such as 10% NaCl+0.1% $BaCl_2$, or 20% NaCl+0.2% $BaCl_2$, or 1-20% NaCl+0.05-0.5% $BaCl_2$, or any range in between); iv) $Ca(NO_3)_2$ (such as 2-40% $Ca(NO_3)_2$, such as 5%, 10%, 15%, 20%, 25%, 30%, or 35% $Ca(NO_3)_2$, or any range in between); v) $NH_4Ac$ (such as 2-30% $NH_4Ac$, such as 5%, 10%, 15%, 20%, or 25% $NH_4Ac$, or any range in between); vi) lime water (e.g., saturated lime water); vii) NaOH (such as 5-30% NaOH, such as 5%, 10%, 15%, 20%, or 25% NaOH, or any range in between); viii) $H_2SO_4$ (such as 2-20% $H_2SO_4$, such as 5%, 10%, or 15% $H_2SO_4$, or any range in between); ix) $HNO_3$ (such as 2-20% $HNO_3$, such as 3%, 4%, 5%, 10%, or 15% $HNO_3$, or any range in between); x) $H_2Ox$ (such as 2-20% $H_2Ox$, such as 5%, 10%, or 15% $H_2Ox$, or any range in between); xi) a solution of $Ca(NO_3)_2$+$HNO_3$ (such as 5% $Ca(NO_3)_{2+3}$% $HNO_3$, such as 10% $Ca(NO_3)_{2+5}$% $HNO_3$, such as 15% $Ca(NO_3)_{2+2}$-10% $HNO_3$, such as 5% $Ca(NO_3)_{2+5}$-15% $HNO_3$, such as 10% $Ca(NO_3)_{2+2}$-10% $HNO_3$, or any range in between); xii) one or more nitrate salts, such as $NaNO_3$; xiii) or any combination of any one or more of these; B) allowing the leach solution to react with the PG for a residence time of up to about 24 hours, such as for about 2-6 hours, such as for about 3-5 hours, such as for about 4 hours and at a temperature in the range of about RT−70° C., such as from about 25-55° C., such as from about 30-50° C., such as from about 35-45° C., or about 40° C. to obtain i) pregnant leach solution (PLS) comprising Radium and ii) solids; and C) separating the PLS from the solids (leach residue).

Aspect 9 is the method of any of Aspects 1-8, comprising: A) combining fresh and/or stockpiled PG with one or more lixiviant (leach solution) optionally chosen from $Ca(NO_3)_2$ (such as 2-40% $Ca(NO_3)_2$, such as 5%, 10%, 15%, 20%, 25%, 30%, or 35% $Ca(NO_3)_2$, or any range in between); B) allowing the leach solution to react with the PG for a residence time of up to about 24 hours, such as for about 2-6 hours, such as for about 3-5 hours, such as for about 4 hours and at a temperature in the range of about RT−70° C., such as from about 25-55° C., or from about 30-50° C., or from about 35-45° C., or about 40° C. to obtain i) pregnant leach solution (PLS) comprising $^{226}Ra$ and ii) solids; and C) separating the PLS from the solids (leach residue).

Aspect 10 is the method of any of Aspects 1-9, comprising: A) combining fresh and/or stockpiled PG with one or more lixiviant (leach solution) optionally chosen from $Ca(NO_3)_2$ (such as 20-25% $Ca(NO_3)_2$ or any range in between); B) allowing the leach solution to react with the PG for a residence time of up to about 24 hours, such as for about 2-6 hours, such as for about 3-5 hours, such as for about 2-4 hours and at a temperature in the range of about RT−70° C., such as from about 25-55° C., such as from about 30-50° C., such as from about 35-45° C., or about 40° C. to obtain i) pregnant leach solution (PLS) comprising $^{226}Ra$ and ii) solids (leach residue); and C) separating the PLS from the solids.

Aspect 11 is the method of any of Aspects 1-10, comprising: A) combining fresh and/or stockpiled PG with one or more lixiviant (leach solution) optionally chosen from $Ca(NO_3)_2$ (such as 20-25% $Ca(NO_3)_2$ or any range in between); B) allowing the leach solution to react with the PG for a residence time of about 2-6 hours and at a temperature in the range of about RT−70° C., such as from about 25-55° C., such as from about 30-50° C., such as from about 35-45° C., or about 40° C. to obtain i) pregnant leach solution (PLS) comprising $^{226}Ra$ and ii) solids (leach residue); and C) separating the PLS (leachate) from the solids (leach residue).

Aspect 12 is the method of any of Aspects 1-11, comprising: A) combining fresh and/or stockpiled PG with one or more lixiviant (leach solution) optionally chosen from $Ca(NO_3)_2$ (such as 20-25% $Ca(NO_3)_2$ or any range in between); B) allowing the leach solution to react with the PG for a residence time of about 2-4 hours and at a temperature in the range of about RT−70° C., such as from about 25-55° C., such as from about 30-50° C., such as from about 35-45° C., or about 40° C. to obtain i) pregnant leach solution (PLS) comprising $^{226}Ra$ and ii) solids (leach residue); and C) separating the PLS (leachate) from the solids (leach residue).

Aspect 13 is the method of any of Aspects 1-12, comprising: A) combining fresh and/or stockpiled PG with one or more lixiviant (leach solution) optionally chosen from $Ca(NO_3)_2$ (such as 20-25% $Ca(NO_3)_2$ or any range in between); B) allowing the leach solution to react with the PG for a residence time of about 4 hours and at a temperature in the range of about 30-45° C., to obtain i) pregnant leach solution (PLS) comprising $^{226}Ra$ and ii) solids (leach residue); and C) separating the PLS (leachate) from the solids (leach residue).

Aspect 14 is the method of any of Aspects 1-13, further comprising separating a fine fraction from the PG using a sieve, wherein at least 75% of particles of the fine fraction are less than 25 microns in diameter, wherein the leaching is performed on the fine fraction.

Aspect 15 is the method of any of Aspects 1-14, further comprising subjecting the PLS and/or the solids (leach residue) to one or more separation techniques, such as separation by precipitation, ion exchange chromatography, solvent extraction, and/or membrane technologies.

Aspect 16 is the method of any of Aspects 1-15, wherein the separation technique is capable of separating one or more of the following constituents from the PLS or the solids: i) radium (here as $^{226}Ra$), calcium, barium; ii) thorium, uranium, fluorine, phosphorus, phosphate; iii) naturally occurring radioactive material (NORM); iv) technologically enhanced naturally occurring radioactive material (TENORM); v) gypsum; vi) Zn, Cr, Mn, Ni, Pb, Cd, As, Hg, Ag, Cu, Fe, Pd, Pt; vii) rare earth elements (REEs), such as: a) Sb, Be, Co, Ga, Ge, Mg, In; b) Platinum Group Elements (PGMs), such as platinum, palladium, rhodium, ruthenium, iridium, osmium; c) Nb and Ta; d) lanthanides (such as light REEs (LREEs), such as La, Ce, Pr, Nd, Pm, Sm, and heavy rare earth elements (HREEs), such as Eu, Gd, Tb, Dy, Ho, Er, Tm, Yb, Lu); e) Sc, Y (an HREE).

Aspect 17 is the method of any of Aspects 1-16, comprising separating $^{226}Ra$ from the PLS (leachate) to obtain: i) an amount of $^{226}Ra$ and ii) one or more raffinate; and optionally recycling the raffinate for processing of additional PG.

Aspect 18 is the method of any of Aspects 1-17, comprising processing $^{226}Ra$ for one or more medical uses and/or processing the solids to obtain NORM-free gypsum.

Aspect 19 is any of Aspects 1-18, which is a method of processing PG, the method comprising: combining a first batch of PG with one or more lixiviant (e.g., leach solution); optionally, wherein the first batch of PG is stockpiled PG, fresh PG or a combination; allowing the leach solution to react with the first batch of PG for a residence time of up to about 24 hours and at a temperature in the range of about room temperature to about 70° C., to obtain a first batch of leachate/pregnant leach solution (PLS) and solids (leach residue); separating the first batch of PLS (leachate) from the solids (leach residue); D) subjecting the PLS and/or the solids (leach residue) to one or more separation techniques, wherein one or more of the separation techniques is ion exchange chromatography and comprises contacting at least a portion of the PLS (leachate) with an ion exchange resin to remove $^{226}Ra$ from the PLS and to obtain a raffinate solution; E) optionally further comprising separating a fine fraction from the PG, such as by using a sieve, wherein at least 75% of particles of the fine fraction are less than 25 microns in diameter, wherein the leaching is performed on the fine fraction; and F) optionally further comprising retaining, as a recycled leach solution, at least a portion of the raffinate solution and recycling the recycled leach solution as lixiviant for further processing of additional PG.

Aspect 20 is any of Aspects 1-19, comprising: A) combining fresh and/or stockpiled PG with one or more lixiviant (leach solution) optionally chosen from $Ca(NO_3)_2$ (such as 20-25% $Ca(NO_3)_2$ or any range in between); B) allowing the leach solution to react with the PG for a residence time of about 2-4 hours and at a temperature in the range of about 30-45° C., to obtain i) pregnant leach solution (PLS) comprising $^{226}Ra$ and ii) solids; C) separating the PLS from the solids; D) subjecting the PLS to one or more separation techniques, wherein one or more of the separation techniques is ion exchange chromatography and comprises contacting at least a portion of the PLS with an ion exchange resin to remove $^{226}Ra$ from the PLS and to obtain a raffinate solution; E) optionally further comprising separating a fine fraction from the PG, such as by using a sieve, wherein at least 75% of particles of the fine fraction are less than 25 μm (microns) in diameter, wherein the leaching is performed on the fine fraction; and F) optionally further comprising retaining, as a recycled leach solution, at least a portion of the raffinate solution and recycling the recycled leach solution as lixiviant for further processing of additional PG.

Aspect 21 is any of Aspects 1-20, comprising: A) combining fresh and/or stockpiled PG with one or more lixiviant (leach solution) optionally chosen from $Ca(NO_3)_2$ (such as 20-25% $Ca(NO_3)_2$ or any range in between); B) allowing the leach solution to react with the PG for a residence time of about 4 hours and at a temperature in the range of about 30-45° C., to obtain pregnant leach solution (PLS) comprising $^{226}Ra$ separated from the PG and solids; C) separating the PLS from the solids; D) subjecting the PLS to one or more separation techniques, wherein one or more of the separation techniques is ion exchange chromatography and comprises contacting at least a portion of the PLS with an ion exchange resin, thereby separating radium from the PLS to obtain an amount of $^{226}Ra$ and a raffinate solution; E) optionally further comprising separating a fine fraction from the PG, such as by using a sieve, wherein at least 75% of particles of the fine fraction are less than 25 microns in diameter, wherein the leaching is performed on the fine fraction; and F) optionally further comprising retaining, as a recycled leach solution, at least a portion of the raffinate solution and recycling the recycled leach solution as lixiviant for further processing of additional PG.

Aspect 22 is any of Aspects 1-21, comprising: A) combining fresh and/or stockpiled PG with one or more lixiviant (leach solution) optionally chosen from $Ca(NO_3)_2$ (such as 20-25% $Ca(NO_3)_2$ or any range in between); B) allowing the leach solution to react with the PG for a residence time of about 4 hours and at a temperature in the range of about 30-45° C., to obtain pregnant leach solution (PLS) comprising $^{226}Ra$ separated from the PG and solids; C) separating the PLS from the solids; D) subjecting the PLS to one or more separation techniques, wherein one or more of the separation techniques is ion exchange chromatography and comprises contacting at least a portion of the PLS with an ion exchange resin, thereby separating $^{226}Ra$ from the PLS to obtain an amount of $^{226}Ra$ and a raffinate solution; E) optionally further comprising separating a fine fraction from the PG, such as by using a sieve, wherein at least 75% of particles of the fine fraction are less than 25 microns in diameter, wherein the leaching is performed on the fine fraction; and F) optionally further comprising retaining, as a recycled leach solution, at least a portion of the raffinate solution and recycling and combining recycled leach solution with one or more further batches of PG, optionally combining the recycled leach solution with additional leach solution which is the same or a different leach solution as the initial leach solution, repeating the leaching with one or more further batches of PG and separating a further batch of PLS from a further batch of solids (leach residue).

Aspect 23 is any of Aspects 1-22, comprising: A) combining fresh and/or stockpiled PG with one or more lixiviant (leach solution) optionally chosen from $Ca(NO_3)_2$ (such as 20-25% $Ca(NO_3)_2$ or any range in between); B) allowing the leach solution to react with the PG for a residence time of about 4 hours and at a temperature in the range of about 30-45° C., to obtain pregnant leach solution (PLS) comprising $^{226}Ra$ separated from the PG and solids; C) separating the PLS from the solids; D) subjecting the PLS to ion exchange chromatography, comprising contacting at least a portion of the PLS with an ion exchange resin, thereby separating radium from the PLS to obtain an amount of $^{226}Ra$ and a raffinate solution; E) further comprising separating a fine fraction from the PG, wherein at least 75% of particles of the fine fraction are less than 25 microns in diameter, wherein the leaching is performed on the fine fraction; and F) comprising retaining, as a recycled leach solution, at least a portion of the raffinate solution and recycling and combining recycled leach solution with one or more further batches of PG.

Aspect 24 is the method of any of Aspects 1-23, comprising: A) combining fresh and/or stockpiled PG with one or more lixiviant (leach solution) optionally chosen from $Ca(NO_3)_2$ (such as 2-40% $Ca(NO_3)_2$, such as 5%, 10%, 15%, 20%, 25%, 30%, or 35% $Ca(NO_3)_2$, or any range in between); B) allowing the leach solution to react with the PG for a residence time of up to about 24 hours, such as for about 2-6 hours, such as for about 3-5 hours, such as for about 4 hours and at a temperature in the range of about RT–70° C., such as from about 25-55° C., such as from about 30-50° C., such as from about 35-45° C., or about 40° C. to obtain i) pregnant leach solution (PLS) comprising $^{226}Ra$ and ii) solids; and C) separating the PLS from the solids.

Aspect 25 is the method of any of Aspects 1-24, comprising: A) combining fresh and/or stockpiled PG with one or more lixiviant (leach solution) chosen from $NH_4Ac$ (such as 2-30% $NH_4Ac$, such as 5%, 10%, 15%, 20%, or 25% $NH_4Ac$, or any range in between); B) allowing the leach solution to react with the PG for a residence time of up to about 24 hours, such as for about 2-6 hours, such as for about 3-5 hours, such as for about 2-4 hours and at a temperature in the range of about RT–70° C., such as from about 25-55° C., such as from about 30-50° C., such as from about 35-45° C., or about 40° C. to obtain i) pregnant leach solution (PLS) comprising Radium and ii) solids (leach residue); and C) separating the PLS from the solids.

Aspect 26 is the method of any of Aspects 1-25, comprising: A) combining fresh and/or stockpiled PG with one or more lixiviant (leach solution) chosen from $NH_4Ac$ (such as 5-25% $NH_4Ac$, or any range in between); B) allowing the leach solution to react with the PG for a residence time of about 2-6 hours and at a temperature in the range of about RT–70° C., such as from about 25-55° C., such as from about 30-50° C., such as from about 35-45° C., or about 40° C. to obtain i) pregnant leach solution (PLS) comprising $^{226}Ra$ and ii) solids (leach residue); and C) separating the PLS (leachate) from the solids (leach residue).

Aspect 27 is the method of any of Aspects 1-26, comprising: A) combining fresh and/or stockpiled PG with one or more lixiviant (leach solution) chosen from $NH_4Ac$ (such as 10-20% $NH_4Ac$, or any range in between); B) allowing the leach solution to react with the PG for a residence time of about 2-4 hours and at a temperature in the range of about RT–70° C., such as from about 25-55° C., such as from about 30-50° C., such as from about 35-45° C., or about 40° C. to obtain i) pregnant leach solution (PLS) comprising $^{226}Ra$ and ii) solids (leach residue); and C) separating the PLS (leachate) from the solids (leach residue).

Aspect 28 is the method of any of Aspects 1-27, comprising: A) combining fresh and/or stockpiled PG with one or more lixiviant (leach solution) chosen from $NH_4Ac$ (such as 10-20% $NH_4Ac$, or any range in between); B) allowing the leach solution to react with the PG for a residence time of about 4 hours and at a temperature in the range of about 30-45° C., to obtain i) pregnant leach solution (PLS) comprising $^{226}Ra$ and ii) solids (leach residue); and C) separating the PLS (leachate) from the solids (leach residue).

Aspect 29 is the method of any of Aspects 1-28, further comprising separating a fine fraction from the PG using a sieve, wherein at least 75% of particles of the fine fraction are less than 25 microns in diameter, wherein the leaching is performed on the fine fraction.

Aspect 30 is the method of any of Aspects 1-29, further comprising subjecting the PLS and/or the solids (leach residue) to one or more separation techniques, such as separation by precipitation, ion exchange chromatography, solvent extraction, and/or membrane technologies.

Aspect 31 is the method of any of Aspects 1-30, wherein the separation technique is capable of separating one or more of the following constituents from the PLS or the solids: i) radium (here as $^{226}Ra$), calcium, barium; ii) thorium, uranium, fluorine, phosphorus, phosphate; iii) naturally occurring radioactive material (NORM); iv) technologically enhanced naturally occurring radioactive material (TENORM); v) gypsum; vi) Zn, Cr, Mn, Ni, Pb, Cd, As, Hg, Ag, Cu, Fe, Pd, Pt; vii) rare earth elements (REEs), such as: a) Sb, Be, Co, Ga, Ge, Mg, In; b) Platinum Group Elements (PGMs), such as platinum, palladium, rhodium, ruthenium, iridium, osmium; c) Nb and Ta; d) lanthanides (such as light REEs (LREEs), including La, Ce, Pr, Nd, Pm, Sm, and heavy rare earth elements (HREEs), including Eu, Gd, Tb, Dy, Ho, Er, Tm, Yb, Lu); e) Sc, Y (an HREE).

Aspect 32 is the method of any of Aspects 1-31, comprising separating $^{226}Ra$ from the PLS (leachate) to obtain: i) an amount of $^{226}Ra$ and ii) one or more raffinate; and optionally recycling the raffinate for processing of additional PG.

Aspect 33 is the method of any of Aspects 1-32, comprising processing $^{226}Ra$ for one or more medical uses and/or processing the solids to obtain NORM-free gypsum.

Aspect 34 is the method of any of Aspects 1-33, comprising: A) combining fresh and/or stockpiled PG with one or more lixiviant (leach solution) chosen from $HNO_3$ (such as 2-20% $HNO_3$, such as 3%, 4%, 5%, 10%, or 15% $HNO_3$, or any range in between), or a solution of $Ca(NO_3)_2$+$HNO_3$ (such as 5% $Ca(NO_3)_{2+3}$% $HNO_3$, such as 10% $Ca(NO_3)_{2+5}$% $HNO_3$, such as 15% $Ca(NO_3)_{2+2}$-10% $HNO_3$, such as 5% $Ca(NO_3)_{2+5}$-15% $HNO_3$, such as 10% $Ca(NO_3)_{2+2}$-10% $HNO_3$, or any range in between), or one or more nitrate salts, such as $NaNO_3$; B) allowing the leach solution to react with the PG for a residence time of up to about 24 hours, such as for about 2-6 hours, such as for about 3-5 hours, such as for about 2-4 hours and at a temperature in the range of about RT–70° C., such as from about 25-55° C., such as from about 30-50° C., such as from about 35-45° C., or about 40° C. to obtain i) pregnant leach solution (PLS) comprising $^{226}Ra$ and ii) solids (leach residue); and C) separating the PLS from the solids.

Aspect 35 is the method of any of Aspects 1-34, comprising: A) combining fresh and/or stockpiled PG with one or more lixiviant (leach solution) chosen from $HNO_3$ (such as 3-10% $HNO_3$); B) allowing the leach solution to react with the PG for a residence time of about 2-6 hours and at a temperature in the range of about RT–70° C., such as from about 25-55° C., such as from about 30-50° C., such as from about 35-45° C., or about 40° C. to obtain i) pregnant leach solution (PLS) comprising $^{226}Ra$ and ii) solids (leach residue); and C) separating the PLS (leachate) from the solids (leach residue).

Aspect 36 is the method of any of Aspects 1-35, comprising: A) combining fresh and/or stockpiled PG with one or more lixiviant (leach solution) chosen from $HNO_3$ (such as 5-10% $HNO_3$); B) allowing the leach solution to react with the PG for a residence time of about 2-4 hours and at a temperature in the range of about RT–70° C., such as from about 25-55° C., such as from about 30-50° C., such as from about 35-45° C., or about 40° C. to obtain i) pregnant leach solution (PLS) comprising $^{226}Ra$ and ii) solids (leach residue); and C) separating the PLS (leachate) from the solids (leach residue).

Aspect 37 is the method of any of Aspects 1-36, comprising: A) combining fresh and/or stockpiled PG with one or more lixiviant (leach solution) chosen from $HNO_3$ (such as 5-10% $HNO_3$; B) allowing the leach solution to react with the PG for a residence time of about 4 hours and at a temperature in the range of about 30-45° C., to obtain i) pregnant leach solution (PLS) comprising $^{226}Ra$ and ii) solids (leach residue); and C) separating the PLS (leachate) from the solids (leach residue).

Aspect 38 is the method of any of Aspects 1-37, further comprising separating a fine fraction from the PG using a sieve, wherein at least 75% of particles of the fine fraction are less than 25 microns in diameter, wherein the leaching is performed on the fine fraction.

Aspect 39 is the method of any of Aspects 1-38, further comprising subjecting the PLS and/or the solids (leach residue) to one or more separation techniques, such as separation by precipitation, ion exchange chromatography, solvent extraction, and/or membrane technologies.

Aspect 40 is the method of any of Aspects 1-39, wherein the separation technique is capable of separating one or more of the following constituents from the PLS or the solids: i) radium (here as $^{226}Ra$), calcium, barium; ii) thorium, uranium, fluorine, phosphorus, phosphate; iii) naturally occurring radioactive material (NORM); iv) technologically enhanced naturally occurring radioactive material (TENORM); v) gypsum; vi) Zn, Cr, Mn, Ni, Pb, Cd, As, Hg, Ag, Cu, Fe, Pd, Pt; vii) rare earth elements (REEs), such as: a) Sb, Be, Co, Ga, Ge, Mg, In; b) Platinum Group Elements (PGMs), such as platinum, palladium, rhodium, ruthenium, iridium, osmium; c) Nb and Ta; d) lanthanides (such as light REEs (LREEs), including La, Ce, Pr, Nd, Pm, Sm, and heavy rare earth elements (HREEs), including Eu, Gd, Tb, Dy, Ho, Er, Tm, Yb, Lu); e) Sc, Y (an HREE).

Aspect 41 is the method of any of Aspects 1-40, comprising separating $^{226}Ra$ from the PLS (leachate) to obtain: i) an amount of $^{226}Ra$ and ii) one or more raffinate; and optionally recycling the raffinate for processing of additional PG.

Aspect 42 is the method of any of Aspects 1-41, comprising processing $^{226}Ra$ for one or more medical uses and/or processing the solids to obtain NORM-free gypsum.

Aspect 43 is the method of any of Aspects 1-42, comprising: A) combining fresh and/or stockpiled PG with one or more lixiviant (leach solution) chosen from a solution of $Ca(NO_3)_2+HNO_3$ (such as 5% $Ca(NO_3)_{2+3}$% $HNO_3$, such as 10% $Ca(NO_3)_{2+5}$% $HNO_3$, such as 15% $Ca(NO_3)_{2+2}$-10% $HNO_3$, such as 5% $Ca(NO_3)_{2+5}$-15% $HNO_3$, such as 10% $Ca(NO_3)_{2+2}$-10% $HNO_3$, or any range in between); B) allowing the leach solution to react with the PG for a residence time of up to about 24 hours, such as for about 2-6 hours, such as for about 3-5 hours, such as for about 2-4 hours and at a temperature in the range of about RT–70° C., such as from about 25-55° C., such as from about 30-50° C., such as from about 35-45° C., or about 40° C. to obtain i) pregnant leach solution (PLS) comprising $^{226}Ra$ and ii) solids (leach residue); and C) separating the PLS from the solids.

Aspect 44 is the method of any of Aspects 1-43, comprising: A) combining fresh and/or stockpiled PG with one or more lixiviant (leach solution) chosen from a solution of $Ca(NO_3)_2+HNO_3$ (such as 5-25% $Ca(NO_3)_{2+3}$-25% $HNO_3$, or any range in between); B) allowing the leach solution to react with the PG for a residence time of about 2-6 hours and at a temperature in the range of about RT–70° C., such as from about 25-55° C., such as from about 30-50° C., such as from about 35-45° C., or about 40° C. to obtain i) pregnant leach solution (PLS) comprising $^{226}Ra$ and ii) solids (leach residue); and C) separating the PLS (leachate) from the solids (leach residue).

Aspect 45 is the method of any of Aspects 1-44, comprising: A) combining fresh and/or stockpiled PG with one or more lixiviant (leach solution) chosen from a solution of $Ca(NO_3)_2+HNO_3$ (such as 10-20% $Ca(NO_3)_{2+3}$-5% $HNO_3$, or any range in between); B) allowing the leach solution to react with the PG for a residence time of about 2-4 hours and at a temperature in the range of about RT–70° C., such as from about 25-55° C., such as from about 30-50° C., such as from about 35-45° C., or about 40° C. to obtain i) pregnant leach solution (PLS) comprising $^{226}Ra$ and ii) solids (leach residue); and C) separating the PLS (leachate) from the solids (leach residue).

Aspect 46 is the method of any of Aspects 1-45, comprising: A) combining fresh and/or stockpiled PG with one or more lixiviant (leach solution) chosen from a solution of $Ca(NO_3)_2+HNO_3$ (such as 15-20% $Ca(NO_3)_{2+5}$-10% $HNO_3$, or any range in between); B) allowing the leach solution to react with the PG for a residence time of about 4 hours and at a temperature in the range of about 30-45° C., to obtain i) pregnant leach solution (PLS) (leachate) comprising $^{226}Ra$ and ii) solids (leach residue); and C) separating the PLS (leachate) from the solids (leach residue).

Aspect 47 is the method of any of Aspects 1-46, further comprising separating a fine fraction from the PG using a sieve, wherein at least 75% of particles of the fine fraction are less than 25 microns in diameter, wherein the leaching is performed on the fine fraction.

Aspect 48 is the method of any of Aspects 1-47, further comprising subjecting the PLS and/or the solids (leach residue) to one or more separation techniques, such as separation by precipitation, ion exchange chromatography, solvent extraction, and/or membrane technologies.

Aspect 49 is the method of any of Aspects 1-48, wherein the separation technique is capable of separating one or more of the following constituents from the PLS or the solids: i) radium (here as $^{226}Ra$), calcium, barium; ii) thorium, uranium, fluorine, phosphorus, phosphate; iii) naturally occurring radioactive material (NORM); iv) technologically enhanced naturally occurring radioactive material (TENORM); v) gypsum; vi) Zn, Cr, Mn, Ni, Pb, Cd, As, Hg, Ag, Cu, Fe, Pd, Pt; vii) rare earth elements (REEs), such as: a) Sb, Be, Co, Ga, Ge, Mg, In; b) Platinum Group Elements (PGMs), such as platinum, palladium, rhodium, ruthenium, iridium, osmium; c) Nb and Ta; d) lanthanides (such as light REEs (LREEs), including La, Ce, Pr, Nd, Pm, Sm, and heavy rare earth elements (HREEs), including Eu, Gd, Tb, Dy, Ho, Er, Tm, Yb, Lu); e) Sc, Y (an HREE).

Aspect 50 is the method of any of Aspects 1-49, comprising separating $^{226}Ra$ from the PLS (leachate) to obtain: i) an amount of $^{226}Ra$ and ii) one or more raffinate; and optionally recycling the raffinate for processing of additional PG.

Aspect 51 is the method of any of Aspects 1-50, comprising processing $^{226}Ra$ for one or more medical uses and/or processing the solids to obtain NORM-free gypsum.

Aspect 52 is the method of any of Aspects 1-51, comprising: A) combining fresh and/or stockpiled PG with one or more lixiviant (leach solution) chosen from one or more nitrate salts, such as from a solution comprising 3-25% nitrate salt(s), including for example $Ca(NO_3)_2$, $KNO_3$, $NH_4NO_3$, and/or $NaNO_3$; B) allowing the leach solution to react with the PG for a residence time of up to about 24 hours, such as for about 2-6 hours, such as for about 3-5 hours, such as for about 2-4 hours and at a temperature in the range of about RT–70° C., such as from about 25-55° C., such as from about 30-50° C., such as from about 35-45° C., or about 40° C. to obtain i) pregnant leach solution (PLS) comprising $^{226}Ra$ and ii) solids (leach residue); and C) separating the PLS from the solids.

Aspect 53 is the method of any of Aspects 1-52, comprising: A) combining fresh and/or stockpiled PG with one or more lixiviant (leach solution) comprising 5-20% nitrate salt(s), including for example $Ca(NO_3)_2$, $KNO_3$, $NH_4NO_3$, and/or $NaNO_3$; B) allowing the leach solution to react with the PG for a residence time of about 2-6 hours and at a temperature in the range of about RT–70° C., such as from about 25-55° C., such as from about 30-50° C., such as from about 35-45° C., or about 40° C. to obtain i) pregnant leach solution (PLS) comprising $^{226}Ra$ and ii) solids (leach residue); and C) separating the PLS (leachate) from the solids (leach residue).

Aspect 54 is the method of any of Aspects 1-53, comprising: A) combining fresh and/or stockpiled PG with one or more lixiviant (leach solution) comprising 10-20% nitrate salt(s), including for example $Ca(NO_3)_2$, $KNO_3$, $NH_4NO_3$, and/or $NaNO_3$; B) allowing the leach solution to react with the PG for a residence time of about 2-4 hours and at a temperature in the range of about RT−70° C., such as from about 25-55° C., such as from about 30-50° C., such as from about 35-45° C., or about 40° C. to obtain i) pregnant leach solution (PLS) comprising $^{226}$Ra and ii) solids (leach residue); and C) separating the PLS (leachate) from the solids (leach residue).

Aspect 55 is the method of any of Aspects 1-54, comprising: A) combining fresh and/or stockpiled PG with one or more lixiviant (leach solution) comprising 10-20% nitrate salt(s), including for example $Ca(NO_3)_2$, $KNO_3$, $NH_4NO_3$, and/or $NaNO_3$; B) allowing the leach solution to react with the PG for a residence time of about 4 hours and at a temperature in the range of about 30-45° C., to obtain i) pregnant leach solution (PLS) comprising $^{226}$Ra and ii) solids (leach residue); and C) separating the PLS (leachate) from the solids (leach residue).

Aspect 56 is the method of any of Aspects 1-55, further comprising separating a fine fraction from the PG using a sieve, wherein at least 75% of particles of the fine fraction are less than 25 microns in diameter, wherein the leaching is performed on the fine fraction.

Aspect 57 is the method of any of Aspects 1-56, further comprising subjecting the PLS and/or the solids (leach residue) to one or more separation techniques, such as separation by precipitation, ion exchange chromatography, solvent extraction, and/or membrane technologies.

Aspect 58 is the method of any of Aspects 1-57, wherein the separation technique is capable of separating one or more of the following constituents from the PLS or the solids: i) radium (here as $^{226}$Ra), calcium, barium; ii) thorium, uranium, fluorine, phosphorus, phosphate; iii) naturally occurring radioactive material (NORM); iv) technologically enhanced naturally occurring radioactive material (TENORM); v) gypsum; vi) Zn, Cr, Mn, Ni, Pb, Cd, As, Hg, Ag, Cu, Fe, Pd, Pt; vii) rare earth elements (REEs), such as: a) Sb, Be, Co, Ga, Ge, Mg, In; b) Platinum Group Elements (PGMs), such as platinum, palladium, rhodium, ruthenium, iridium, osmium; c) Nb and Ta; d) lanthanides (such as light REEs (LREEs), including La, Ce, Pr, Nd, Pm, Sm, and heavy rare earth elements (HREEs), including Eu, Gd, Tb, Dy, Ho, Er, Tm, Yb, Lu); e) Sc, Y (an HREE).

Aspect 59 is the method of any of Aspects 1-58, comprising separating $^{226}$Ra from the PLS (leachate) to obtain: i) an amount of $^{226}$Ra and ii) one or more raffinate; and optionally recycling the raffinate for processing of additional PG.

Aspect 60 is the method of any of Aspects 1-59, comprising processing $^{226}$Ra for one or more medical uses and/or processing the solids to obtain NORM-free gypsum.

Aspect 61 is the method of any of Aspects 1-60, wherein the residence time is a single period of time thereby constituting a single leaching step.

Aspect 62 is the method of any of Aspects 1-61, further comprising performing multi-step leaching of the PG using one or more of the same or different lixiviants.

Aspect 63 is the method of any of Aspects 1-62, comprising: A) combining fresh and/or stockpiled PG with one or more lixiviant (leach solution) comprising one or more of $Ca(NO_3)_2$, $HNO_3$. $NH_4Ac$, and/or $H_2Ox$, optionally $H_2Ox$ (such as 2-20% $H_2Ox$, such as 5%, 10%, or 15% $H_2Ox$, or any range in between); B) allowing the leach solution to react with the PG for a residence time of up to about 24 hours, such as for about 2-6 hours, such as for about 3-5 hours, such as for about 2-4 hours and at a temperature in the range of about RT−70° C., such as from about 25-55° C., such as from about 30-50° C., such as from about 35-45° C., or about 40° C. to obtain i) pregnant leach solution (PLS) comprising $^{226}$Ra and ii) solids (leach residue); and C) separating the PLS from the solids.

Aspect 64 is the method of any of Aspects 1-63, comprising: A) combining fresh and/or stockpiled PG with one or more lixiviant (leach solution) comprising 2-20% $H_2Ox$, such as 5%, 10%, or 15% $H_2Ox$, or any range in between; B) allowing the leach solution to react with the PG for a residence time of about 2-6 hours and at a temperature in the range of about RT−70° C., such as from about 25-55° C., such as from about 30-50° C., such as from about 35-45° C., or about 40° C. to obtain i) pregnant leach solution (PLS) comprising $^{226}$Ra and ii) solids (leach residue); and C) separating the PLS (leachate) from the solids (leach residue).

Aspect 65 is the method of any of Aspects 1-64, comprising: A) combining fresh and/or stockpiled PG with one or more lixiviant (leach solution) comprising 5-15% $H_2Ox$, or any range in between; B) allowing the leach solution to react with the PG for a residence time of about 2-4 hours and at a temperature in the range of about RT−70° C., such as from about 25-55° C., such as from about 30-50° C., such as from about 35-45° C., or about 40° C. to obtain i) pregnant leach solution (PLS) comprising $^{226}$Ra and ii) solids (leach residue); and C) separating the PLS (leachate) from the solids (leach residue).

Aspect 66 is the method of any of Aspects 1-65, comprising: A) combining fresh and/or stockpiled PG with one or more lixiviant (leach solution) comprising 5-10% $H_2Ox$, or any range in between; B) allowing the leach solution to react with the PG for a residence time of about 4 hours and at a temperature in the range of about 30-45° C., to obtain i) pregnant leach solution (PLS) comprising $^{226}$Ra and ii) solids (leach residue); and C) separating the PLS (leachate) from the solids (leach residue).

Aspect 67 is the method of any of Aspects 1-66, further comprising separating a fine fraction from the PG using a sieve, wherein at least 75% of particles of the fine fraction are less than 25 microns in diameter, wherein the leaching is performed on the fine fraction.

Aspect 68 is the method of any of Aspects 1-67, further comprising subjecting the PLS and/or the solids (leach residue) to one or more separation techniques, such as separation by precipitation, ion exchange chromatography, solvent extraction, and/or membrane technologies.

Aspect 69 is the method of any of Aspects 1-68, wherein the separation technique is capable of separating one or more of the following constituents from the PLS or the solids: i) radium (here as $^{226}$Ra), calcium, barium; ii) thorium, uranium, fluorine, phosphorus, phosphate; iii) naturally occurring radioactive material (NORM); iv) technologically enhanced naturally occurring radioactive material (TENORM); v) gypsum; vi) Zn, Cr, Mn, Ni, Pb, Cd, As, Hg, Ag, Cu, Fe, Pd, Pt; vii) rare earth elements (REEs), such as: a) Sb, Be, Co, Ga, Ge, Mg, In; b) Platinum Group Elements (PGMs), such as platinum, palladium, rhodium, ruthenium, iridium, osmium; c) Nb and Ta; d) lanthanides (such as light REEs (LREEs), including La, Ce, Pr, Nd, Pm, Sm, and heavy rare earth elements (HREEs), including Eu, Gd, Tb, Dy, Ho, Er, Tm, Yb, Lu); e) Sc, Y (an HREE).

Aspect 70 is the method of any of Aspects 1-69, comprising separating $^{226}$Ra from the PLS (leachate) to obtain: i) an amount of $^{226}$Ra and ii) one or more raffinate; and optionally recycling the raffinate for processing of additional PG.

Aspect 71 is the method of any of Aspects 1-68, comprising processing $^{226}Ra$ for one or more medical uses and/or processing the solids to obtain NORM-free gypsum.

Aspect 72 is the method of any of Aspects 1-67, wherein the residence time is a single period of time thereby constituting a single leaching step.

Aspect 73 is the method of any of Aspects 1-66, further comprising performing multi-step leaching of the PG using one or more of the same or different lixiviants, according to the same or different parameters as the first leaching.

Aspect 74 is the method of any of Aspects 1-73, wherein: i) the PG comprises $^{226}Ra$ and the PLS resulting from a first leaching of the PG comprises at least 70% such as at least 90% of the $^{226}Ra$ from the PG; and/or ii) the PG comprises $^{226}Ra$ and the solids resulting from a first leaching of the PG comprises a non-detectable amount of $^{226}Ra$ or a $^{226}Ra$ concentration of no more than a selected limit, such as no more than about 20 picocuries per gram (pCi/g), or no more than about 15 pCi/g, or no more than about 10 pCi/g, or no more than about 7 pCi/g, or about 5 picocuries per gram (pCi/g) or less.

Aspect 75 is the method of any of Aspects 1-74, comprising: recycling and combining recycled leach solution with a second batch of PG, which optionally additionally includes additional leach solution (which can be the same or a different leach solution as the leach solution for the first batch of PG) with the recycled leach solution; allowing the recycled leach solution to react with the second batch of PG under the same, similar, or different conditions as for the first batch of PG, such as for a residence time of 2-6 hours and at a temperature in the range of about 40-70° C. to obtain a second batch of pregnant leach solution (PLS) and a second batch of solids; and optionally separating the second batch of PLS from the second batch of solids.

Aspect 76 is the method of any of Aspects 1-75, wherein the second batch of PG does not comprise any PG from the first batch of PG that has been subjected to the leach solution.

Aspect 77 is the method of any of Aspects 1-76, wherein the second batch of PG comprises an additional amount of PG in combination with PG from the first batch that has been subjected to the leach solution.

Aspect 78 is the method of any of Aspects 1-77, wherein the second batch of PG comprises $^{226}Ra$ and the second batch of PLS comprises at least 70% such as at least 90% of the $^{226}Ra$ from the second batch of PG; and/or the second batch of PG comprises $^{226}Ra$ and the second batch of solids comprise a non-detectable amount of $^{226}Ra$ or a $^{226}Ra$ concentration of no more than a selected limit, such as no more than about 20 picocuries per gram (pCi/g), no more than about 15 pCi/g, no more than about 10 pCi/g, no more than about 7 pCi/g, or about 5 picocuries per gram (pCi/g) or less.

Aspect 79 is the method of any of Aspects 1-78, comprising: separating a fine fraction from the second batch of PG; wherein at least 75% of particles of the fine fraction from the second batch of PG are less than 25 microns in diameter.

Aspect 80 is the method of any of Aspects 1-79, wherein at least 90% of particles of the fine fraction from the second batch of PG are less than 25 microns in diameter.

Aspect 81 is the method of any of Aspects 1-80, comprising: subjecting the second batch of PLS and/or the second batch of solids to one or more separation techniques; optionally, wherein one or more of the separation techniques is ion exchange chromatography and comprises contacting at least a portion of the second batch of PLS with an ion exchange resin.

Aspect 82 is the method of any of Aspects 1-81, comprising: separating $^{226}Ra$ from the second batch of PLS to obtain: an additional amount of $^{226}Ra$; and one or more additional raffinate solution, including a second raffinate solution.

Aspect 83 is the method of any of Aspects 1-82, comprising: separating $^{226}Ra$ from the second batch of PLS; and retaining, as a recycled leach solution, at least a portion of the second raffinate solution.

Aspect 84 is the method of any of Aspects 1-83, comprising: recycling and combining recycled leach solution of the first, second, and/or additional raffinate with a subsequent batch of PG, optionally additionally including additional leach solution (which can be the same or a different leach solution as the leach solution for the first or second batch of PG) with the recycled leach solution; allowing the recycled leach solution to react with the subsequent batch of PG for a residence time of 2-6 hours and at a temperature in the range of about 40-70° C. to obtain a subsequent batch of pregnant leach solution (PLS) and a subsequent batch of solids; and separating the subsequent batch of PLS from the subsequent batch of solids.

Aspect 85 is the method of any of Aspects 1-84, wherein the subsequent batch of PG does not comprise any PG from the first or second batch of PG that has been subjected to the leach solution.

Aspect 86 is the method of any of Aspects 1-85, wherein the subsequent batch of PG comprises an additional amount of PG in combination with PG from the first and/or second batch of PG that has been subjected to the leach solution.

Aspect 87 is the method of any of Aspects 1-84, wherein the subsequent batch of PG comprises $^{226}Ra$ and the subsequent batch of PLS comprises at least 70% of the $^{226}Ra$ from the subsequent batch of PG; and/or the subsequent batch of PG comprises $^{226}Ra$ and the subsequent batch of solids comprises a non-detectable amount of $^{226}Ra$ or a $^{226}Ra$ concentration of no more than a selected limit, such as no more than about 20 picocuries per gram (pCi/g), no more than about 15 pCi/g, no more than about 10 pCi/g, no more than about 7 pCi/g, or about 5 picocuries per gram (pCi/g) or less.

Aspect 86 is the method of any of Aspects 1-85, comprising: separating a fine fraction from the subsequent batch of PG; wherein at least 75% of particles of the fine fraction from the subsequent batch of PG are less than 25 microns in diameter.

Aspect 85 is the method of any of Aspects 1-84, wherein at least 90% of particles of the fine fraction from the subsequent batch of PG are less than 25 microns in diameter.

Aspect 86 is the method of any of Aspects 1-85, comprising: subjecting the subsequent batch of PLS (leachate) and/or the subsequent batch of solids (leach residue) to one or more separation techniques; optionally, wherein one or more of the separation techniques is ion exchange chromatography and comprises contacting at least a portion of the subsequent batch of the PLS with an ion exchange resin.

Aspect 87 is the method of any of Aspects 1-86, comprising: separating $^{226}Ra$ from the subsequent batch of PLS to obtain: a subsequent amount of $^{226}Ra$; and one or more subsequent raffinate solution.

Aspect 88 is the method of any of Aspects 1-87, comprising: separating $^{226}Ra$ from the subsequent batch of PLS; and retaining, as a recycled leach solution, at least a portion of the subsequent raffinate solution.

Aspect 89 is the method of any of Aspects 1-88, method of separating $^{226}Ra$ from PG, the method comprising: combining a batch of PG with a leach solution (lixiviant); and performing only a single leaching of $^{226}Ra$ from the batch of PG under reaction conditions sufficient to enable separation of the $^{226}Ra$, if present, from the batch of PG to obtain solids and a first batch of pregnant leach solution comprising up to 79% of the $^{226}Ra$ of the batch of PG; wherein the batch of PG does not comprise any PG that has been subjected to the leach solution; wherein the single leaching is performed only on a fine fraction separated from the batch of PG, optionally wherein at least 75% of particles of the fine fraction are less than 25 microns in diameter; optionally comprising grinding the fine fraction prior to or during the single leaching; wherein the single leaching comprises allowing the leach solution to react with the first batch of PG for a residence time of 2-6 hours and at a temperature in the range of about 40-70° C. to obtain a first batch of pregnant leach solution (PLS) and solids; optionally wherein i) the lixiviant comprises 20% $Ca(NO_3)_2$, the residence time is about 4 hours and the temperature is in the range of about 40-45° C., or ii) the lixiviant comprises 25% $Ca(NO_3)_2$, the residence time is about 4-6 hours and the temperature is about 40-50° C., or ii) the lixiviant comprises 20% $Ca(NO_3)_2$, the residence time is in the range of about 3-5 hours and the temperature is in the range of about 40-50° C.; optionally wherein the solids comprise a non-detectable amount of $^{226}Ra$ or a $^{226}Ra$ concentration of no more than a selected limit, such as no more than about 20 picocuries per gram (pCi/g), no more than about 15 pCi/g, no more than about 10 pCi/g, no more than about 7 pCi/g, or about 5 picocuries per gram (pCi/g) or less; optionally separating a fine fraction from the batch of PG; wherein at least 75% of particles of the fine fraction from the batch of PG are less than 25 microns in diameter; optionally wherein at least 90% of particles of the fine fraction from the batch of PG are less than 25 microns in diameter; optionally subjecting the first batch of PLS and/or the solids to one or more separation techniques; optionally, wherein one or more of the separation techniques is ion exchange chromatography and comprises contacting at least a portion of the first batch of PLS with an ion exchange resin; optionally separating $^{226}Ra$ from the first batch of PLS to obtain: an amount of $^{226}Ra$ and one or more raffinate solution; optionally retaining, as a recycled leach solution, at least a portion of the raffinate solution.

Aspect 90 is the method of any of Aspects 1-89, comprising: separating $^{226}Ra$ from the second and/or subsequent batch of PLS to obtain: an additional amount of $^{226}Ra$; and an additional raffinate solution; optionally retaining, as a recycled leach solution, at least a portion of the additional raffinate solution; optionally recycling and combining recycled leach solution with one or more further batches of PG; optionally combining the recycled leach solution with additional leach solution which is the same or a different leach solution as any of the other leaching solutions; repeating the single leaching with one or more of the further batches of PG to obtain one or more further batches of PLS and one or more further batches of solids; and separating the further batch of PLS from the further batch of solids; optionally wherein: one or more of the further batches of PG comprises $^{226}Ra$ and one or more of the further batches of PLS comprises at least 70% of the $^{226}Ra$ from the one or more further batches of PG; and/or one or more of the further batches of PG comprises $^{226}Ra$ and one or more of the further batches of solids comprises a non-detectable amount of $^{226}Ra$ or a $^{226}Ra$ concentration of no more than about 20 picocuries per gram (pCi/g), no more than about 15 pCi/g, no more than about 10 pCi/g, no more than about 7 pCi/g, or about 5 picocuries per gram (pCi/g) or less.

Aspect 91 is the method of any of Aspects 1-90, comprising subjecting the batch of PLS, the first, second, additional, or subsequent batch of PLS and/or the solids, the first, second, additional, or subsequent batch of solids to one or more separation techniques; optionally wherein the separation technique is, or at least one of the separation techniques is chosen from, separation by precipitation, ion exchange chromatography, solvent extraction, or membrane technologies; optionally wherein: one or more of the separation techniques is capable of separating one or more of the following constituents from the batch of PLS; the first, second, additional, or subsequent batch of PLS; and/or the solids, the first, second, additional, or subsequent batch of solids: i) one or more alkaline earth metals, including for example radium (here as $^{226}Ra$), calcium, barium; ii) one or more of thorium, uranium, fluorine, phosphorus, phosphate; iii) naturally occurring radioactive material (NORM); iv) technologically enhanced naturally occurring radioactive material (TENORM); v) gypsum; heavy metals, such as Zn, Cr, Mn, Ni, Pb, Cd, As, Hg, Cd, Ag, Cu, Fe, Pd, Pt; vi) rare earth elements (REEs), such as: a) Sb, Be, Co, Ga, Ge, Mg, In; b) Platinum Group Elements (PGMs), such as platinum, palladium, rhodium, ruthenium, iridium, osmium; c) Nb and Ta; d) lanthanides (such as light REEs (LREEs), including La, Ce, Pr, Nd, Pm, Sm, and heavy rare earth elements (HREEs), including Eu, Gd, Tb, Dy, Ho, Er, Tm, Yb, Lu); or e) Sc, Y (an HREE).

Aspect 92 is the method of any of Aspects 1-91, wherein the separating comprises: separation by precipitation (such as selective precipitation) and/or ion exchange chromatography; optionally wherein the separating comprises: precipitation with hydroxide, such as NaOH; and/or precipitation of $Ca(OH)_2$; and/or precipitation with sulfate, such as $NaSO_4$ and/or $H_2SO_4$; and/or precipitation of (Ba,Ra) $SO_4$.

Aspect 93 is the method of any of Aspects 1-92, comprising reducing Ca content of PLS to provide a Ca-reduced PLS; optionally separating $^{226}Ra$ from the Ca-reduced PLS, such by way of one or more of selective precipitation (such as with sulfate), ion exchange chromatography, solvent extraction, or membrane technologies.

Aspect 94 is the method of any of Aspects 1-93, comprising reducing Ca content of PLS to provide a Ca-reduced PLS, e.g., by hydroxide precipitation; separating $^{226}Ra$ from the Ca-reduced PLS using ion exchange chromatography.

Aspect 95 is the method of any of Aspects 1-94, comprising separating $^{226}Ra$ from PLS or from a Ca-reduced PLS using ion exchange chromatography; optionally, wherein the ion exchange employs one or more cation exchange resin; optionally wherein the cation is H; and/or optionally, wherein the cation exchange resin comprises sulfonic acid functional groups.

Aspect 96 is the method of any of Aspects 1-95 comprising: combining PG with a leach solution (lixiviant) comprising one or more of $Ca(NO_3)_2$, $HNO_3$. $NH_4Ac$, and/or $H_2Ox$, reacting at a temperature in the range of about 40-70° C.; allowing the reacting for a selected period of time, such as for up to 960 hours, such as from up to and including 1, 2, 3, 4, 5, 6, 7, 8, 9, 10, 11, 12, 13, 14, 15, 16, 17, 18, 19, 20, 21-40, 41-60, 61-80, 81-100, 150, 200, 300, 400, 500, 600, 700, 800, 900 or 1000 hours; thereby separating radium, if present, from the PG into the leach solution to obtain a pregnant leach solution (PLS) comprising $^{226}Ra$; optionally separating the PLS from any solids present; and optionally separating $^{226}Ra$ from the PLS, such as by way of ion exchange chromatography; optionally, wherein the PG is stockpiled/aged PG, fresh PG or a combination.

Aspect 97 is the method of any of Aspects 1-96, wherein: the PLS is aged for a period of time prior to being subjected to a separations technique, such as for a period of time up to 960 hours, such as from up to and including 1, 2, 3, 4, 5, 6, 7, 8, 9, 10, 11, 12, 13, 14, 15, 16, 17, 18, 19, 20, 21-40, 41-60, 61-80, 81-100, 150, 200, 300, 400, 500, 600, 700, 800, 900 or 1000 hours or more; and/or grinding of particles of a fine fraction of the PG is done prior to or during leaching; and/or separating particles of less than 25 microns in diameter from a fine fraction, e.g., by sieve, is performed prior to or during leaching.

Aspect 98 is the method of any of Aspects 1-97 for preparing purified gypsum, comprising: combining PG with a leach solution (lixiviant), such as a lixiviant comprising one or more of $Ca(NO_3)_2$, $HNO_3$. $NH_4Ac$, and/or $H_2Ox$; allowing the lixiviant to react with the PG for 2-6 hours at a temperature in the range of about 40-70° C. to obtain a pregnant leach solution (PLS) and solids; separating the solids from the PLS by one or more physical or chemical processes; processing at least a portion of the solids into NORM-free gypsum having a non-detectable amount of $^{226}Ra$ or a $^{226}Ra$ concentration of no more than about 20 picocuries per gram (pCi/g), no more than about 15 pCi/g, no more than about 10 pCi/g, no more than about 7 pCi/g, or about 5 picocuries per gram (pCi/g) or less.

Aspect 99 is the method of any of Aspects 1-98 for preparing asphalt, the method comprising combining PG with a leach solution (lixiviant), such as a lixiviant comprising one or more of $Ca(NO_3)_2$, $HNO_3$. $NH_4Ac$, and/or $H_2Ox$; allowing the lixiviant to react with the PG for 2-6 hours at a temperature in the range of about 40-70° C. and removing at least some amount of one or more contaminants from the PG, such that the contaminant-reduced PG has a non-detectable amount of $^{226}Ra$ or a $^{226}Ra$ concentration of no more than about 20 picocuries per gram (pCi/g), no more than about 15 pCi/g, no more than about 10 pCi/g, no more than about 7 pCi/g, or about 5 picocuries per gram (pCi/g) or less; and providing an asphalt composition comprising the contaminant-reduced PG present in an amount of 5-20 wt % of the asphalt composition.

Aspect 100 is the method of any of Aspects 1-99 for preparing a radionuclide, the method comprising: subjecting PG to one or more lixiviant, such as a lixiviant comprising one or more of $Ca(NO_3)_2$, $HNO_3$. $NH_4Ac$, and/or $H_2Ox$; separating/isolating $^{226}Ra$ from the PG, such as by way of ion exchange chromatography alone or in combination with solvent extraction and/or a precipitating reaction; and converting the $^{226}Ra$ into $^{225}Ac$, such as by irradiation (e.g., neutron irradiation).

Aspect 101 is a method of preparing a radionuclide, the method comprising: subjecting PG to one or more lixiviant; separating $^{226}Ra$ from the PG; isolating $^{226}Ra$ by one or more separations method, such as ion exchange; and converting the $^{226}Ra$ into $^{223}Ra$, such as by irradiation.

Aspect 102 is a method of preparing a radionuclide, the method comprising: subjecting PG to one or more lixiviant; separating $^{226}Ra$ from the PG; isolating $^{226}Ra$ by one or more separations method, such as ion exchange; and converting the $^{226}Ra$ into $^{225}Ac$, such as by irradiation.

Aspect 103 is the method of Aspect 102, wherein the irradiation comprises accelerator irradiation, such as by Rhodotron technology where electrons are accelerated to generate an electron beam at 40 MeV to reach the $^{226}Ra$ target, then the $^{226}Ra$ in the target is irradiated creating the $^{226}Ra(g,n)^{225}Ra$ by photoreaction, then the $^{225}Ra$ will then naturally decay into $^{225}Ac$, optionally after irradiation the $^{226}Ra$ could be recycled and reconditioned.

BRIEF DESCRIPTION OF THE DRAWINGS

The accompanying drawings illustrate certain aspects of embodiments of the present invention, and should not be used to limit the invention. Together with the written description, the drawings serve to explain certain principles of the invention.

DETAILED DESCRIPTION OF VARIOUS

Embodiments of the Invention

The inventors have discovered an inventive hydrometallurgical method for the processing of PG as by-product of the phosphoric acid production from phosphate rock to separate, extract and/or recover $^{226}Ra$. The process is selective for separation of $^{226}Ra$ and as such provides for the capability of being able to utilize other valuable constituents of the PG, such as to produce NORM-free gypsum, phosphor as fertilizer, rare earth elements (REEs) and other critical raw materials (CRMs).

Due to the large amount of PG available as waste of the fertilizer production from phosphate minerals, and the large amount of gypsum (as compared to the target elements) comprised in such waste, the inventors have discovered selective leach procedures that enable further use of the purified/processed gypsum (e.g., as construction material) by selectively targeting and separating $^{226}$Ra and/or other radioactive materials or tracer elements and/or contaminants from PG. The inventive selective leaching procedures focus on separation of $^{226}$Ra from PG, while minimizing the effect on, or separation of, other constituents of the PG. Use of the inventive selective leaching processes provide not only for i) a $^{226}$Ra-PLS but also ii) a PG with reduced radioactive contamination, both of which can be used for downstream applications, such as $^{226}$Ra for medical uses and purified PG for building products.

Selective Leaching (see, e.g., EXAMPLE 1). Embodiments of the invention are directed to methods of selective leaching of $^{226}$Ra from PG, such as from PG tailings, stockpiled PG or fresh PG. One such embodiment is a selective leaching process comprising one or more of the following parameters: use of $Ca(NO_3)_2$ as lixiviant, e.g., at a concentration of 20%, a pulp density of 10%, a temperature of between room temperature and 70° C., and a retention/residence time in the range of 2-24 hours.

Figure 1:
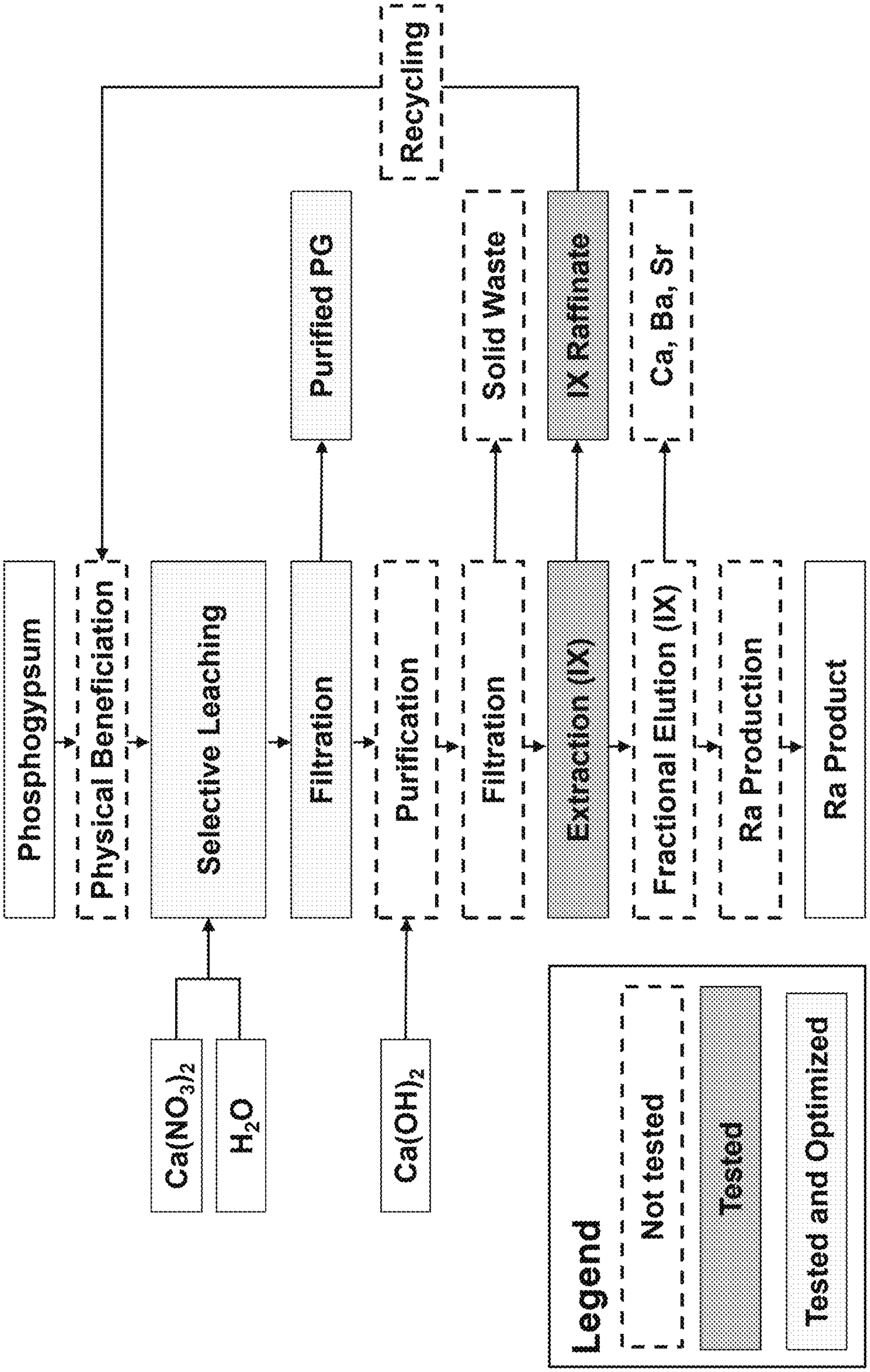
FIG. 1 is a block diagram of a representative leaching method according to embodiments of the invention (in combination with an exemplary recovery method).

FIG. 1 shows a process block diagram of a representative leaching method according to embodiments of the invention (in combination with an exemplary recovery method).

Although a particular combination of inventive methods for leaching, separating, recovering/extracting $^{226}$Ra from PG is shown in FIG. 1, it should be noted that the leaching and/or recovery methods can be substituted and/or modified according to the disclosure herein. For example, other lixiviants can be used in place of the exemplified lixiviant(s) and other process parameters can be changed according to the guidance provided by this disclosure. One of ordinary skill in the art would further understand that any of the recovery/extraction methods described herein and/or variations thereof may be used in combination with any of the leaching methods described herein and/or variations thereof.

Further, for example, although process steps may be included in the exemplified process, one or more process steps can be omitted. For example, any one or more of the steps relating to benefaction, leaching, filtration, purification, extraction, $^{226}$Ra production and/or recycling can be performed in any combination and/or in any order. For example, a purification step is optional and if performed can be performed before or after leaching. Further for example, leaching and extraction can be performed for the production of purified PG and $^{226}$Ra production. Additionally or alternatively, additional steps can be included, such as by including a physical separation step for focusing on a particular size fraction of the PG. Additionally, the methods can be performed on other feed material alternatively to PG and/or can be performed to separate and/or recover other elements of interest from any material of interest. For example, the methods can be applied to any material for selective separation of Barium or Uranium from the material or for the separation of any one or more REEs, CRMs and/or heavy metals.

Specific embodiments include for example selective leaching of PG and extraction of $^{226}$Ra for $^{226}$Ra production for various applications, including medical applications. Embodiments also include selective leaching of PG and production of purified PG, for example as a construction material. Embodiments also include leaching of PG (by any method) and extraction of $^{226}$Ra for $^{226}$Ra production and/or production of purified PG. Embodiments include selective leaching of PG, separation of $^{226}$Ra from the leachate, recycling of reduced-$^{226}$Ra raffinate for performing additional selective leaching of PG. Further embodiments include physically separating the PG to obtain a desired fines fraction and performing any of the methods described herein on the fines fraction. Additionally, the methods of the invention can be performed on stockpiled PG and/or fresh PG.

Material characterization (using QEMScan) identified gypsum/anhydrite as the dominant mineral in the PG-mix sample demonstrated in the Examples. Other mineral phases identified were quartz, barite, fluorite, silicates, Ca-phosphates, pyrite, and Fe/Ti-oxides. No discrete $^{226}$Ra or U phases were found. Since the barium content of the sample is relatively high compared to the literature and $^{226}$Ra and barium have similar solution chemistry, it is very likely that co-precipitation of $^{226}$Ra with barite, mainly by way of an inclusion (lattice replacement) process, is the main mechanism controlling the radium content in the PG samples. Additionally, $^{226}$Ra leaching is almost exclusively accompanied by leaching of other alkaline earth metals, with Ca, Ba, and Sr being the main impurities, and a correlation between $^{226}$Ra and Ba leaching was found, which supports the that $^{226}$Ra is bound within (Ba,Ra) $SO_4$.

Additionally, a majority of PG particles have a size of between about 10 and 50 μm. Since barite has very small grains with 83%<10 μm compared to most of the particles, and due to co-precipitation of $^{226}$Ra with barite, it is expected that $^{226}$Ra enrichment will occur in the fine fraction. In addition, the mineral phase liberation analysis revealed that most of the barite grains are either completely liberated or bound to the surface of gypsum or quartz particles, thus, according to embodiments of the invention low-intensity attrition by sieving can be used to liberate the remaining barite grains and produce radium enrichment through barite accumulation in the fine fraction of a screening.

Fresh PG (see, e.g., EXAMPLE 2). Leaching of fresh PG was tested with an exemplary $Ca(NO_3)_2$ lixiviant system to compare it with the results from stockpiled PG-mix. The $^{226}$Ra leaching efficiency of fresh PG was in the range of 56% for all tests and appeared to be independent of the lixiviant tested. For a 2-stage leach regime (water and $Ca(NO_3)_2$), a slight increase in $^{226}$Ra leaching to 67% was observed in the second stage. Thus, in fresh PG, it is believed that $^{226}$Ra is mainly present in a water-soluble form and that the additional leaching with $Ca(NO_3)_2$ led to a leaching of the sulfate-bound $^{226}$Ra. Any one or more of the selective leaching methods of embodiments of the invention can be performed on stockpiled PG and/or on fresh PG.

Upscaled Leaching Process (see, e.g., EXAMPLE 3). Verification tests were used to verify that the leaching conditions are applicable on a larger scale and to produce a larger volume of PLS for testing subsequent process steps. Additionally, the positive effect of increased temperature to increase the $^{226}$Ra leaching efficiency was validated, and it was found that the retention time could be reduced from 24 hours to 4 hours with the same or even better leaching efficiency. In addition, the tests were evaluated by assaying the PLS and the leach residue. A good mass balance and accountability of the $^{226}$Ra could be proven within the measurement accuracy of the γ-spectroscopy. In total, 50 L of PLS were produced and the PLS' of 4 tests were combined for the $^{226}$Ra recovery work, with the mixed PLS having a $^{226}$Ra concentration of 366±89 Bq/L.

Recovery of $^{226}$Radium (see, e.g., EXAMPLE 4) and Other Elements. In addition and/or alternatively, embodiments of the invention include methods for the separation/recovery/extraction of $^{226}$Ra from a liquid, such as recovering $^{226}$Ra from a pregnant leach solution (PLS) or leachate obtained from the selective leaching methods of the invention and/or other separation/leaching methods. Exemplary recovery methods for recovering/extracting $^{226}$Ra include recovery/extraction methods based on or comprising ion exchange (IX), selective precipitation, solvent extraction (SX) and/or membrane technologies, but are not limited to these.

$^{226}$Ra separation was tested with the PLS obtained as a result of the leaching process from EXAMPLE 1. Preferred method of efficient and economically relevant $^{226}$Ra separation is ion-exchange (IX). The specific characteristics like high salinity and a high Ca/Ra ratio were considered for the selection of suitable $^{226}$Ra-separation technology. Thus, in some embodiments, selective precipitation and ion exchange (IX) are suitable. For example, in embodiments, $^{226}$Ra can be extracted/separated/recovered from the PLS in high yields using ion exchange technology.

Selective precipitation of (Ba,Ra) $SO_4$ is demonstrated using two different precipitants. Tests with the addition of concentrated precipitants showed insufficient precipitation efficiencies, and the highest $^{226}$Ra precipitation (23%) was achieved with concentrated $H_2SO_4$ (90%) in an under-stochiometric dosage (e.g., SP_3). The sulfate dosage of this test was 56% of the stoichiometric amount. The higher precipitation efficiency demonstrates that the low efficiencies are not controlled by the sulfate dosage but kinetics and equilibration. It was concluded that a further dilution and longer retention times are favorable for a more selective $^{226}$Ra-precipitation. The precipitation of $Ca(OH)_2$ to reduce the Ca/Ra-ratio by NaOH addition showed a good selectivity at pH=12 for Ca. Only minor losses of $^{226}$Ra, Ba, and Sr could be found and were mainly assigned to adherent solution and slight co-precipitation. However, this approach consumes a high amount of NaOH and replaces high Ca concentrations by Na. Selective precipitation can be used alone or in combination with other separation techniques, such as a purification step prior to or after IX.

Ion exchange demonstrated the selectivity of the IX resin used for $^{226}$Ra extraction. The resin LEWATIT® MDS 200 H, commonly used for water treatment, was used. By increasing the volume of PLS per WSR (wet settled resin) an increasing selectivity for $Ba^{2+}$ and $Ra^{2+}$ was determined and a maximum resin loading of 3.7 nmol/$L_{WSR}$ $Ra^{2+}$ (36309 Bq/$L_{WSR}$) could be achieved. At the same time, the Ca loading was significantly reduced with increasing PLS volume. Thus, the resin is highly selective for Ra which makes it applicable for Ra separation.

The loaded IX resin is eluted in a chromatographic manner to enhance the purity of the Ra eluate. Thereby liquid fractions containing Ca, Sr, and Ba are obtained as a waste stream. The purified and concentrated $^{226}$Ra eluate can be further processed, for example by way of a $^{226}$Ra production process. (Chiarizia 1999-Chiarizia, R.; Dietz, M. L.; Horwitz, E. P.; Burnett, W. C.; Cable, P. H. Radium Separation Through Complexation by Aqueous Crown Ethers and Ion Exchange or Solvent Extraction*. Separation Science and Technology 1999, 34 (6-7), 931-950. DOI: 10.1080/01496399908951074.) Thus, the elution step can be adapted to the preferred $^{226}$Ra production process.

In embodiments, the raffinate obtained as a result of the IX process is ideally free of $^{226}$Ra, or substantially free of $^{226}$Ra, and shows only low concentrations of Ba and Sr, making it possible to use (e.g., recycle) the raffinate solution as a lixiviant (or to combine the raffinate with fresh lixiviant) for subsequent $^{226}$Ra leaching. Recycling is desirable for reducing chemical costs and the amount of waste from the process. The raffinate can be recycled to the leaching step and used with one or more second, subsequent and/or additional batches of PG (optionally used in combination with additional recycled or fresh lixiviant, wherein the original or first lixiviant (i.e., lixiviant used to leach the original or first batch of PG) and/or recycled lixiviant(s) and/or fresh lixiviants and/or second, subsequent and/or additional lixiviants can be the same or different lixiviants). When recycling raffinate as lixiviant (whether used alone or with other lixiviants), additional adjustment of the solution properties of the raffinate or raffinate+lixiviant might be needed.

As noted above, in embodiments, an additional purification step can be performed to enhance the selectivity of the IX process for $^{226}$Ra. This purification can be achieved by way of a hydroxide precipitation at pH of about 7, by the addition of $Ca(OH)_2$ or an alternative caustic reagent (e.g., NaOH, see above selective precipitation methods). Using purification and a subsequent filtration, a solid waste containing metal hydroxides (e.g., Fe and Al) is produced. The purified PLS is transferred to the IX process where $^{226}$Ra is extracted. Additionally, the obtained raffinate is free of or substantially free of $^{226}$Ra and can be recycled to the leaching step to be used with one or more second, subsequent and/or additional batches of PG (optionally used in combination with additional recycled or fresh lixiviant, wherein the original or first lixiviant (i.e., lixiviant used to leach the original or first batch of PG) and/or recycled lixiviant(s) and/or fresh lixiviants and/or second, subsequent and/or additional lixiviants can be the same or different lixiviants). When recycling raffinate as lixiviant (whether used alone or with other lixiviants), additional adjustment of the solution properties of the raffinate or raffinate+lixiviant might be needed.

In addition or alternatively, embodiments of the invention include methods of purifying PG by removing one or more contaminants/elements, such as heavy metals, REEs, CRMs and/or radioactive elements or tracer elements from PG, such as fresh PG, waste PG or stockpiled PG. The separation/removal of one or more constituents (selective or non-selective for a particular constituent) of PG can be performed simultaneously or sequentially. For example, selective leaching of $^{226}$Ra from PG can be performed, followed by a separation method used to separate any one or more of the remaining constituents of the leach residue, such as the separation of Cadmium. For example, selective leaching of $^{226}$Ra can be performed on PG, followed by separation of Cadmium from the leach residue for providing gypsum with a reduced level or non-detectable level of Cadmium.

In embodiments, one or more of the separation techniques is capable of separating one or more of the following constituents from any of the batch of PLS; the first, second, additional, or subsequent batch of PLS; and/or the solids (leach residue), the first, second, additional, or subsequent batch of solids (leach residue): i) one or more alkaline earth metals, including for example radium, calcium, barium; ii) one or more of thorium, uranium, fluorine, phosphorus, phosphate; iii) naturally occurring radioactive material (NORM); iv) technologically enhanced naturally occurring radioactive material (TENORM); v) gypsum; vi) heavy metals, such as Zn, Cr, Mn, Ni, Pb, Cd, As, Hg, Ag, Cu, Fe, Pd, Pt; vii) rare earth elements (REEs), such as: Sb, Be, Co, Ga, Ge, Mg, In; viii) Platinum Group Elements (PGMs), such as platinum, palladium, rhodium, ruthenium, iridium, osmium; ix) Nb and Ta; x) lanthanides (such as light REEs (LREEs), including La, Ce, Pr, Nd, Pm, Sm, and heavy rare earth elements (HREEs), including Eu, Gd, Tb, Dy, Ho, Er, Tm, Yb, Lu); xi) Sc, Y (an HREE).

EXAMPLE 1 (Leaching of PG-Mix Sample)

With respect to processes for leaching of $^{226}Ra$ from PG, ten lixiviants for the processing of stockpiled PG-mix are demonstrated in this EXAMPLE 1, with the highest $^{226}Ra$ leaching efficiencies obtained for $Ca(NO_3)_2$ (15%), $HNO_3$ (28%), oxalic acid ($H_2Ox$) (19%), and ammonium acetate ($NH_4$+Ac) (13%).

Many $^{226}Ra$ salts are sparingly soluble. However, $Ra(NO_3)_2$, Ra oxalate, $RaCO_3$, and $Ra(OH)_2$ are more soluble than the corresponding calcium salts. The inventors have discovered that conversion of the existing $^{226}Ra$ compound into one of these salts can enable selective leaching of $^{226}Ra$. For example, in embodiments, the methods can employ any one or more of $Ca(NO_3)_2$, $HNO_3$, oxalic acid ($H_2Ox$) and/or ammonium acetate ($NH_4Ac$) as lixiviant, alone or in combination with any other lixiviant, including water. In embodiments, the leaching processes can comprise one or more or all of the lixiviants disclosed herein for leaching of $^{226}Ra$.

Particular embodiments, for example, can comprise $HNO_3$ and/or $Ca(NO_3)_2$ as lixiviant(s) for selective leaching of $^{226}Ra$ from PG. In embodiments, the leach solution (lixiviant) comprises $Ca(NO_3)_2$, such as 10-30% $Ca(NO_3)_2$, or about 20-25% $Ca(NO_3)_2$.

Further of note is that particular temperatures, residence times and processing parameters for leaching and/or extraction can be selected according to the disclosures provided herein. For single, double or multi-step leaching, the leaching can be performed using a residence time (contact time of lixiviant and PG) in the range of up to about 24 hours, such as about 2-6 hours, such as about 2-5 hours, such as about 4 hours and/or at a temperature in the range of about room temperature (RT) to about 70° C., such as about 25-70° C., or about 30-55° C., or about 35-45° C., or about 35-50° C. Optionally, mechanical stirring of the PG and lixiviant can be employed so as to contribute a grinding effect, which may further enhance $^{226}Ra$ leachability.

According to embodiments of the invention, optional processing techniques can be included, such as grinding of the PG feed material and/or separation of an $^{226}Ra$-rich PG fraction by physical means (e.g., sieve) and performing the leaching on the fine fraction.

Exemplary leach systems, for example, using $Ca(NO_3)_2$ and/or $HNO_3$ as lixiviant(s), are described in greater detail below. It will be understood by persons of ordinary skill in the art that the exemplary process conditions/parameters demonstrated in the examples can be modified according to the teachings elsewhere in this disclosure. For example, with respect to the lixiviants exemplified, any one or more lixiviants can be substituted for any other lixiviant described herein. Further, with respect to the temperature of the leaching and/or the residence time for leaching, any temperature or time can be substituted for any other temperature or time within the ranges exemplified. Additionally, any lixiviant or lixiviant combination can be used in a leaching process with any temperature or time disclosed herein.

Abbreviations for the following terms used in this disclosure and/or used in the EXAMPLES in particular are defined as follows:

TABLE 3

Definitions

| Acronym/ Abbreviation | Term |
|---|---|
| BRT | Bottle roll tests |
| CRM | Critical raw materials |
| IX | Ion exchange |
| LR | Leach residue |
| NORM | Naturally occurring radioactive material |
| NORM-free | Free of (or within specified limits of, or a non-detectable amount of) Naturally Occurring Radioactive Material or Technically Enhanced Naturally Occurring Radioactive Material (TENORM), or comprising radioactive material at a level below a specified limit, e.g., a material having a radium concentration of no more than about 20 picocuries per gram (pCi/g), such as about 15 pCi/g, or about 10 pCi/g, such as about 7 pCi/g or about 5 picocuries per gram (pCi/g) or less) |
| $NH_4Ac$ | Ammonium acetate $NH_4CH_3COO$ |
| NORM | Natural occurring radioactive material |
| PG | Phosphogypsum |
| PLS | Pregnant leach solution |
| REE | Rare earth elements |
| SLR | Solid to liquid ratio |
| SX | Solvent extraction |
| WSR | WSR |

Five sealed bags of air-dried PG of 4-5 kg (23.9 kg of stockpile sample material) and 1.1 kg fresh, moist PG material were obtained. The dried samples were light beige in color and fine-grained with a few hard, round agglomerates. The moist sample was brown, pulpy, and fine-grained. The five sample bags of the stockpiled PG material were combined and homogenized by placing them in a round drum and mixing for 1 h.

Samples were analyzed by various analytical methods. Stockpiled PG sample material was homogenized, analyzed by XRF (X-ray fluorescence spectroscopy), γ-spectroscopy, QEMScan (Erzlabor), and ICP-MS/OES (Inductively coupled plasma mass spectrometry/optical emission spectroscopy) (Eurofins). The chemical composition was determined by XRF and ICP-MS/OES, while the QEMScan gave an understanding about mineralogical composition and associations. The radioactive nuclides were quantified by γ-spectroscopy.

In Table 4, the evaluation of the feed samples is summarized. The $^{226}Ra$ activity of the PG-mix samples was determined as $A_s$=1233.6±257.1 Bq/kg.

TABLE 4

Determination of the specific $^{226}Ra$ Activity of the feed samples

| Sample ID | Eγ in keV | N(Eγ) | ΔN(Eγ) in % | tL in s | ε(Eγ) in % | Δε(Eγ) in % | m in g | $A_s$ in Bq/kg | $\Delta A_s$ in Bq/kg |
|---|---|---|---|---|---|---|---|---|---|
| PG-mix | 186 | 23839 | 12.8 | 336763 | 2.71 | 0.41 | 57.46 | 1233.6 | 257.1 |
| Fresh PG | 186 | 54894 | 12.4 | 546083 | 2.71 | 0.41 | 70.82 | 1439.8 | 296.6 |

For the experimental data sets, the activities of the specific samples are given in the Tables below (e.g., Tables 11, 12, 13, 20, 22).

Sample characterization of stockpiled sample material using ICP-MS/OES and XRF analyses showed that the elemental data were well within the typical range of elemental composition for this type of material compared to literature data. The main elements of the sample are Ca and S. The main radium tracer element, uranium, was measured as being present in an amount of about 3-4%. The only outlier compared to the literature data was the barium content being 248 ppm, which indicates the presence of a Ba mineral such as barite.

Elemental Analysis. XRF measurements (Thermo Scientific Niton FXL 950 Field X-Ray Lab) were performed. The uncalibrated XRF measurements (i.e., without calibration using ICP-MS) are listed in Tables 5 and 6. The ranges of XRF measurements were comparable to those reported in literature, except for higher Ti and Sc concentrations. The REE were measured separately by a handheld Niton XLp 522. More specifically, Table 5 shows the uncalibrated data of XRF measurement (middle) (LOD Limit of detection), compared with literature research (left), and ICP-MS/OES measurement (right).

TABLE 5

Main element concentration of the homogenized PG sample

| Element | Literature Data in % | XRF in % | ICP-MS/ OES in % |
|---|---|---|---|
| CaO | 24-34 | 27 | 31.8 |
| $SO_4$ | 48-58 | 33 | 51.0 |
| $SiO_2$ | 0.5-18 | 2.8 | 4.3 |
| $Na_2O$ | 0.12-10 | n.d. | <0.1 |
| C (organic) | 0.1-2.5 | n.d. | 0.1 |
| F | 0.1-1.8 | n.d. | 0.345 |
| $P_2O_5$ | 0.05-8 | 0.08 | 0.75 |
| $Al_2O_3$ | 0.05-0.6 | <LOD | 0.07 |
| Cl | 0.035-0.045 | 0.05 | <0.01 |
| MgO | 0.01-0.54 | <LOD | <0.005 |
| $Fe_2O_3$ | 0.01-0.25 | 0.05 | 0.04 |

QEMScan analyses were performed (FEI Quanta 650F scanning electron microscope (SEM) equipped with two Bruker Quantax X-Flash 5030 energy dispersive X-ray spectrometers). QEMScan is also used to access the particle size distribution. The specific particle size of each grain is estimated by calculating the ECD (equal circle diameter), which represents the diameter of a circle that has the same area as the measured grain.

Material characterization using QEMScan identified gypsum/anhydrite as the dominant mineral in the sample (PG-mix sample from stockpiled PG). Other mineral phases were quartz, barite, fluorite, silicates, Ca-phosphates, pyrite, and Fe/Ti-oxides. No discrete $^{226}Ra$ or uranium phases were found. Since the barium content of the sample is relatively high compared to the literature and $^{226}Ra$ and barium have similar solution chemistry, it is very likely that coprecipitation of $^{226}Ra$ with barite ($BaSO_4$), mainly via an inclusion (lattice replacement) process, is the main mechanism controlling the $^{226}Ra$ content in the PG samples.

The chemical composition (main elements) calculated from the QEMScan measurement is in good agreement with the XRF and ICP-MS/OES data (Table 6).

TABLE 6

Main elements of the homogenized PG sample

| Element | XRF in % | ICP-MS/ OES | Calculated from QEMScan |
|---|---|---|---|
| CaO | 27 | 31.8 | 32.8 |
| $SO_4$ | 33 | 51.0 | 55.8 |
| $SiO_2$ | 2.8 | 4.3 | 2.2 |
| $Na_2O$ | n.d. | <0.1 | 0.0004 |
| C (organic) | n.d. | 0.1 | n.d. |
| F | n.d. | 0.345 | 0.14 |
| $P_2O_5$ | 0.08 | 0.75 | 0.07 |
| $Al_2O_3$ | <LOD | 0.07 | 0.02 |
| Cl | 0.05 | <0.01 | n.d. |
| MgO | <LOD | <0.005 | <LOD |
| $Fe_2O_3$ | 0.05 | 0.04 | 0.02 |

A back scattered electron (BSE) and QEMScan false color overview of the measured PG sample area was performed and showed the PG consists mainly of gypsum and/or anhydrite. Significant amounts of quartz and fluorite were observed, while no discrete $^{226}Ra$ or uranium phases were found. In addition to the high Ba contents from XRF and ICP-MS/OES, several Ba-bearing phases were detected. However, the most likely barium phase in this environment is barite.

$^{226}Ra$ and barium have similar solution chemistry, and one of the main reasons for this is the similarity in effective ionic radii, which are equal to 1.42 Å for $Ba^{2+}$ and 1.48 Å for $Ra^{2+}$ (in 8-fold coordination) (Shannon, R. D. Revised Effective Ionic Radii and Systematic Studies of Interatomic Distances in Halides and Chalcogenides. Acta crystallographica section A: crystal physics, diffraction, theoretical and general crystallography 1976, 32 (5), 751-767), making the incorporation of $^{226}Ra$ in barite most probable for the PG. Predominantly, $^{226}Ra$ is rapidly dissolved in leaching and co-precipitates in the form of Ba(Ra) $SO_4$. (Paige, C. R.; Kornicker, W. A.; Hileman, O. E.; Snodgrass, W. J. Solution Equilibria for Uranium Ore Processing: The BaSO4-H2SO4-H2O System and the RaSO4-H2SO4-H2O System. Geochimica et Cosmochimica Acta 1998, 62 (1), 15-23. DOI: 10.1016/S0016-7037 (97) 00320-7.) Therefore, co-precipitation of $^{226}Ra$ with barite ($BaSO_4$), mainly via an inclusion (lattice replacement) process, is considered the main controlling mechanism for the $^{226}Ra$ content in PG. (Zhang, T.; Gregory, K.; Hammack, R. W.; Vidic, R. D. Co-Precipitation of Radium with Barium and Strontium Sulfate and Its Impact on the Fate of Radium during Treatment of Produced Water from Unconventional Gas Extraction. *Environ. Sci. Technol.* 2014, 48 (8), 4596-4603. DOI: 10.1021/es405168b.)

Concentrations of accessory elements of the homogenized PG sample is as follows:

TABLE 7

Accessory elements of the homogenized PG sample

| Element | Literature (ppm) | XRF (ppm) | ICP-MS/OES (ppm) |
|---|---|---|---|
| Ti | 26-470 | 1227 | 90.7 |
| Co | 0.05-2.3 | 7.5 | <LOD |
| Cu | 2-195 | 6.2 | <LOD |
| Zn | 4-315 | 8.5 | 7.0 |
| Hg | 0.005-10 | 3.8 | <LOD |
| Pb | 0.5-13.8 | 2.7 | <LOD |
| As | 1.0-42 | 1.7 | 0.7 |
| Ba | 20-236 | 169 | 248 |
| Sr | 10-118 | 738 | 868 |

TABLE 7-continued

Accessory elements of the homogenized PG sample

| Element | Literature (ppm) | XRF (ppm) | ICP-MS/OES (ppm) |
|---|---|---|---|
| Th | 0.4-4 | <LOD | <LOD |
| U | 0.5-13.8 | 3.8 | 3.1 |
| REE | 250-5500 | <LOD | 91.8 |
| Sc | 0.3-4.7 | 144 | <LOD |
| Y | 2-156 | 52 | 68.5 |

The concentration of REEs is shown in Table 8, with the concentrations for Sc, Sm, Eu, Ho, Er, Tm, Yb, Lu, and Th not listed as the values were below the detection limit:

| ID | La ppm | Ce ppm | Pr ppm | Nd ppm | Gd ppm | Dy ppm |
|---|---|---|---|---|---|---|
| PG | 31.5 | 23.0 | 5.6 | 21.0 | 5.5 | 5.3 |

The comparison of the literature data with the ICP-MS/OES and XRF analyses shows that the element concentrations of the samples obtained fit well within the typical elemental composition range of these types of materials. The main elements of the sample are Ca and S, which form the main sample minerals gypsum and anhydrite. All other elements are present only in traces, in agreement with the literature. The main $^{226}Ra$ tracer element, U, was measured at 3-4%, which is in the lower range of the literature data. The Ba content of 248 ppm indicates the presence of a Ba mineral such as barite. $Na_2O$, C (organic), and F could not be measured with XRF, but ICP-MS/OES data are comparable to the literature. Comparing the results of ICP-MS/OES and XRF, the values for U, CaO, $SiO_2$, Cl, MgO, and $Fe_2O_3$ agree well. $SO_4$, $P_2O_5$, Sr, and Ba were underestimated by XRF compared to ICP-MS/OES while high Ti and Sc contents from XRF were not confirmed by ICP-MS/OES (overestimation by XRF).

The grouping of the detected material phases led to the following main phases within the PG (Table 9): Gypsum/anhydrite, quartz, barite, fluorite, silicates, Ca-phosphates, pyrite, Fe/Ti-oxides, and others.

TABLE 9

PG composition in wt % and average size of each phase

| Mineral | Composition in wt % | Average size in μm |
|---|---|---|
| Gypsum/Anhydrite | 97.23 | 28 |
| Quartz | 2.25 | 34 |
| Fluorite | 0.36 | 14 |
| Barite | 0.07 | 8 |
| Ca-Phosphate | 0.04 | 16 |
| Fe/Ti-oxides | 0.02 | 19 |
| Silicates | 0.02 | 25 |
| Pyrite | <0.01 | 8 |
| Others | <0.01 | 16 |
| Gypsum | 87.07 | 21 |
| Anhydrite | 10.16 | 8 |

Figure 2A:
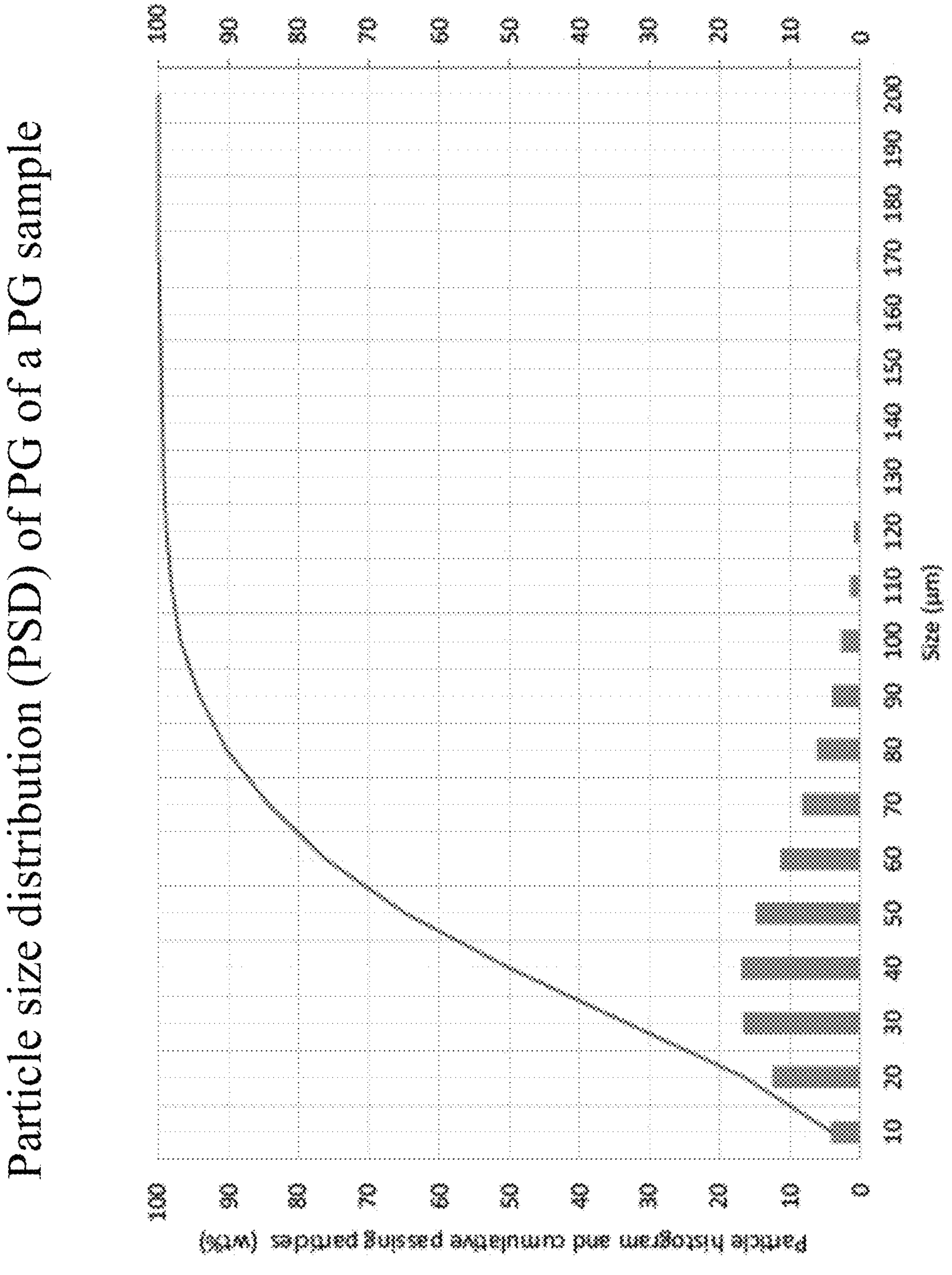
FIG. 2A is a graph showing the particle size distribution (PSD) of PG of a sample.
Figure 2B:
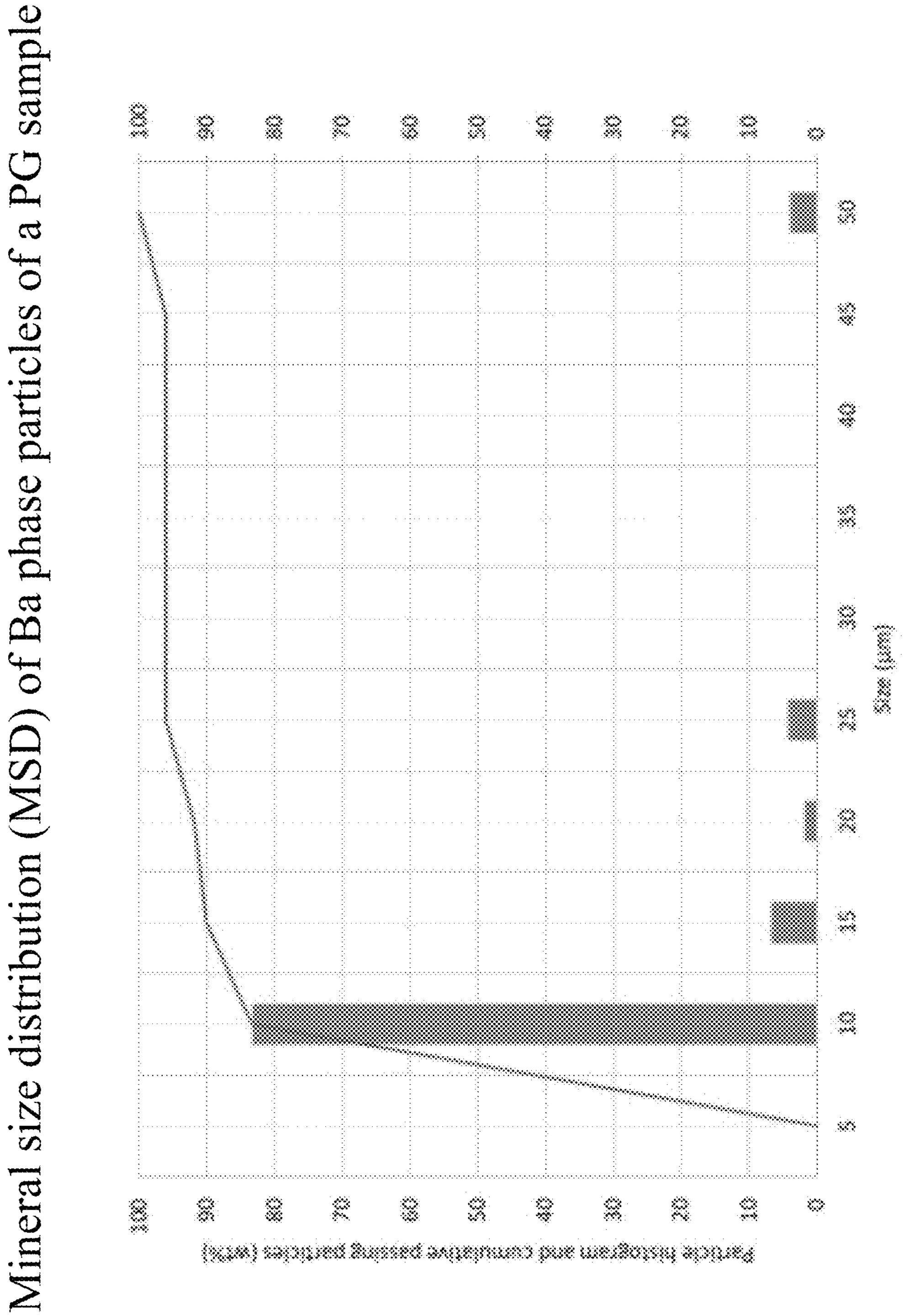
FIG. 2B is a graph showing the mineral size distribution (MSD) of Ba phase particles of the PG sample of FIG. 2A.

The particle size distribution determined by QEMScan is dominated by the size of the anhydrite- and gypsum-bearing particles, since they are the main constituents of the sample. FIG. 2A shows the particle size distribution (PSD) of PG and FIG. 2B shows the mineral size distribution (MSD) of Ba phase particles of the PG sample.

The majority of PG particles in the sample have a size of between 10-50 μm. By applying mechanical sieving, the percentage of particles of this size can be controlled in specific samples, such as by filtering out larger particles to increase the percentage of particles of this size in the sample. Additionally or alternatively, mechanical sieving can be performed to isolate any particular fraction of the PG, such as particles sized less than about 50 μm, or less than about 30 μm, or less than about 25 μm, or less than about 20 μm, or in the range of from about 10-20 μm, or less than about 10 μm, and so on.

Of particular note, the QEMScan revealed that Barite, for example, has very small grains, 83%<10 μm, compared to the majority of particles. If radium occurs primarily in barite, it is plausible to assume that $^{226}Ra$ is enriched in the fine fraction of below 25 μm.

Additionally, the QEMScan revealed that with respect to the association of barite particles to anhydrite/gypsum, most of the barite grains are either completely liberated or bound to the surface of gypsum or quartz particles. Consequently, the barite is not intergrown with most particles and is can be easily liberated with low-intensity attrition.

Bottle Roll Tests (BRTs). Various lixiviants can be used according to the leaching methods described herein, including one or more of water, sodium chloride solutions, solutions comprising sodium chloride and barium chloride, calcium nitrate, ammonium acetate ($NH_4CH_3COO$), lime water, sodium hydroxide, sulfuric acid, nitric acid, solutions comprising calcium nitrate and/or nitric acid, and/or oxalic acid.

In embodiments, the leach solution (lixiviant) comprises one or more of:

i) $H_2O$ (water, de-ionized water, tap water, rain water, etc.);

ii) NaCl (e.g., 1-20%, such as 5%, 10% or 15% NaCl, or any range in between);

iii) a solution of NaCl+$BaCl_2$ (such as 10% NaCl+0.1% $BaCl_2$, or 20% NaCl+0.2% $BaCl_2$, or 1-20% NaCl+0.05-0.5% $BaCl_2$, or any range in between);

iv) $Ca(NO_3)_2$ (such as 2-40% $Ca(NO_3)_2$, such as 5%, 10%, 15%, 20%, 25%, 30%, or 35% $Ca(NO_3)_2$, or any range in between);

v) $NH_4Ac$ (such as 2-30% $NH_4Ac$, such as 5%, 10%, 15%, 20%, or 25% $NH_4Ac$, or any range in between);

vi) lime water (e.g., saturated lime water);

vii) NaOH (such as 5-30% NaOH, such as 5%, 10%, 15%, 20%, or 25% NaOH, or any range in between);

viii) $H_2SO_4$ (such as 2-20% $H_2SO_4$, such as 5%, 10%, or 15% $H_2SO_4$, or any range in between);

ix) $HNO_3$ (such as 2-20% $HNO_3$, such as 3%, 4%, 5%, 10%, or 15% $HNO_3$, or any range in between);

x) $H_2Ox$ (such as 2-20% $H_2Ox$, such as 5%, 10%, or 15% $H_2Ox$, or any range in between);

xi) a solution of $Ca(NO_3)_2$+$HNO_3$ (such as 5% $Ca(NO_3)_{2+3}$% $HNO_3$, such as 10% $Ca(NO_3)_{2+5}$% $HNO_3$, such as 15% $Ca(NO_3)_{2+2}$-10% $HNO_3$, such as 5% $Ca(NO_3)_{2+5}$-15% $HNO_3$, such as 10% $Ca(NO_3)_{2+2}$-10% $HNO_3$, or any range in between);

one or more nitrate salts, such as $NaNO_3$;

xii) or any combination of any one or more of these.

In the work demonstrated herein, the highest $^{226}Ra$ leaching efficiencies were found for calcium nitrate ($Ca(NO_3)_2$) (15%), nitric acid ($HNO_3$) (28%), oxalic acid ($H_2Ox$) (19%), and ammonium acetate ($NH_4Ac$) (13%). Variations of the leaching system using $Ca(NO_3)_2$ are further exemplified to demonstrate $^{226}Ra$ leaching efficiency of this system in particular. The inventors have found that higher nitrate concentrations and elevated temperatures lead to an increased efficiency in leaching of $^{226}Ra$. Leaching systems according to embodiments of the invention, for example, can be performed at a temperature of between RT–70° C. with a lixiviant comprising calcium nitrate ($Ca(NO_3)_2$), such as at a concentration of about 20-25% and a pulp density of about 10%, with or without stirring and/or grinding during all or a portion of the reaction. $^{226}Ra$ leaching efficiencies in the range of up to about 73% and up to about 79% were found for these conditions.

Several samples were processed according to the methods described herein and were based on $10^2$ g scale (100-200 g per batch). The bottle roll tests (BRTs) were conducted as bottle roll tests under ambient conditions using the following as leach solutions: Water (duplicate), NaCl, $Ca(NO_3)_2$, diluted $H_2SO_4$ (<0.5 mol/L), diluted $HNO_3$, oxalic acid ($H_2Ox$), diluted NaOH, and ammonium acetate ($NH_4Ac$). Other methods of leaching can alternatively or in addition be employed, including heap leaching or bio leaching.

Leaching methods of embodiments of the invention optionally can include one or more of the following in addition to or as substitution of one or more steps of a leaching processes disclosed herein:

i) pretreatment of PG with hot water or NaOH;

ii) carbonation of PG by hydrothermal $Na_2CO_3$ leaching (Matyskin, A. V.; Ebin, B.; Tyumentsev, M.; Allard, S.; Skarnemark, G.; Ramebäck, H.; Ekberg, C. Disassembly of Old Radium Sources and Conversion of Radium Sulfate into Radium Carbonate for Subsequent Dissolution in Acid. *J Radioanal Nucl Chem* 2016, 310 (2), 589-595. DOI: 10.1007/s10967-016-4927-x) and subsequent dissolution with acid if appropriate;

iii) carbonation of PG with $NH_3$-water and $CO_2$ (Mukaba, J.-L.; Eze, C. P.; Pereao, O.; Petrik, L. F. Rare Earths' Recovery from Phosphogypsum: An Overview on Direct and Indirect Leaching Techniques. *Minerals* 2021, 11 (10), 1051. DOI: 10.3390/min11101051) and subsequent dissolution with acid if needed; and/or iv) direct leaching with mineral acids (Mukaba 2021).

The general experimental procedure for the bottle roll tests was as follows:

setup of 1 L glass leach vessel, preparation of lixiviant with 800 g water, addition of 200 g PG, monitoring of vessel for foaming and continue mixing at target temperature, after target retention time, filtration of suspension through 1-2 μm filter paper, then drying the sample of leach residue at 60° C. to determine weight loss.

The processes performed at ambient temperature were mixed in an overhead shaker, while the processes performed at elevated temperature were mixed by a magnetic stirrer stored in a heating cabinet to ensure constant conditions over time. Either mixing process can be used for any of the leaching methods disclosed herein, regardless of temperature.

The bottle roll tests include examples of the leaching methods using various lixiviants, at various concentrations and/or with various combinations of lixiviants and show results of the leaching methods as applied to stockpiled PG and fresh PG. A summary of the bottle roll tests is provided in Table 10:

TABLE 10

Parameters of BRT conducted with constant retention time (24 h)

| ID | Ore | Lixiviant | Temperature |
|---|---|---|---|
| BRT_1 | Stockpiled PG | $H_2O$_1 | RT |
| BRT_2 | Stockpiled PG | $H_2O$_2 | RT |
| BRT_3 | Stockpiled PG | 10% NaCl | RT |
| BRT_4 | Stockpiled PG | 10% NaCl + 0.1% $BaCl_2$ | RT |
| BRT_5 | Stockpiled PG | 10% $Ca(NO_3)_2$ | RT |
| BRT_6 | Stockpiled PG | 10% $NH_4Ac$ | RT |
| BRT_7 | Stockpiled PG | Lime Water (saturated) | RT |
| BRT_8 | Stockpiled PG | 5% NaOH | RT |
| BRT_9 | Stockpiled PG | 5% $H_2SO_4$ | RT |
| BRT_10 | Stockpiled PG | 5% $HNO_3$ | RT |
| BRT_11 | Stockpiled PG | 5% $H_2Ox$ | RT |
| BRT_12 | Stockpiled PG | 5% $Ca(NO_3)_2$ | RT |
| BRT_13 | Stockpiled PG | 20% $Ca(NO_3)_2$ | RT |
| BRT_14 | Stockpiled PG | 5% $Ca(NO_3)_2$ + 3% $HNO_3$ | RT |
| BRT_15 | Stockpiled PG | 10% $Ca(NO_3)_2$ | RT |
| BRT_16 | Fresh PG | $H_2O$ | RT |
| BRT_17 | Fresh PG | 10% $Ca(NO_3)_2$ | RT |
| BRT_18 | Fresh PG | 5% $HNO_3$ | RT |
| BRT_20 | Stockpiled PG | 20% $Ca(NO_3)_2$ | 40° C. |
| BRT_21 | Stockpiled PG | 20% $Ca(NO_3)_2$ | 70° C. |
| BRT_22 | Stockpiled PG | 25% $Ca(NO_3)_2$ | RT |
| BRT_23 | Fresh PG | $H_2O$ | RT |
| BRT_23b | LR DMT_BRT_23 | 20% $Ca(NO_3)_2$ | RT |

BRTs with different salt, acidic or caustic solutions (BRT_1 to BRT_11) were conducted in parallel to compare the behavior of the slurry samples. The color of the suspensions varied considerably between the individual tests. The tests with water and neutral salt solution showed all the same color, which corresponded to the suspended PG. The acidic tests with sulfuric, nitric and oxalic acid ($H_2Ox$) showed a significant change in color, and after the settling of the PG, a strongly dark discolored and turbid supernatant solution was left. The caustic tests with sodium hydroxide and lime water obtained a bright and turbid supernatant solution which suggests that a substantial amount of fine fraction is present.

The filtration time of all tests was comparable, and the adherent moisture of the neutral tests was in the range of 12-15%. For the caustic and acidic tests, the remaining moisture in the leach residue was slightly higher in the range of 16-30%. The filtrates of all tests were clear and almost color less. Only NaOH and $HNO_3$ showed a light yellowish staining. Thus, the brownish color of the acidic suspension is caused by a solid fraction of the leach residue (LR). The experimental data of the first test series are summarized in Table 11:

TABLE 11

| Experimental data for BRT_1 to BRT_11 | | | | | | | | | | |
|---|---|---|---|---|---|---|---|---|---|---|
| Test ID | Medium | pH | ORP (SHE) in mV | EC in mS/cm | Moist in % | Mass loss in % | A in Bq | ΔA | $\xi^{PLS}$ Ra in % | $\Delta\xi^{PLS}$ Ra in % |
| PG-mix | — | — | — | — | 1.8 | — | 247 | 51.4 | — | — |
| BRT_1 | $H_2O$ (1) | 6.26 | 433 (641) | 2.28 | 15.0 | 3.1 | 268 | 76.5 | 0.0 | 22.7 |
| BRT_2 | $H_2O$ (2) | 6.29 | 438 (646) | 2.28 | 12.2 | 3.2 | 254 | 71.6 | 0.0 | 21.4 |
| BRT_3 | NaCl | 5.51 | 471 (679) | 139.40 | 14.0 | 3.1 | 240 | 62.1 | 2.6 | 20.3 |
| BRT_4 | NaCl + $BaCl_2$ | 5.17 | 462 (670) | 143.10 | 13.4 | −1.0 | 229 | 47.0 | 7.2 | 19.3 |
| BRT_5 | $Ca(NO_3)_2$ | 5.30 | 304 (513) | 77.20 | 11.7 | −1.2 | 210 | 74.1 | 15.0 | 17.7 |
| BRT_6 | $NH_4Ac$ | 6.74 | 280 (489) | 81.50 | 14.1 | 5.4 | 214 | 65.1 | 13.3 | 18.1 |
| BRT_7 | Lime Water | 12.06 | 93 (303) | 5.78 | 16.1 | 3.1 | 229 | 62.0 | 7.3 | 19.3 |
| BRT_8 | NaOH | 12.44 | 77 (132) | 84.70 | 24.4 | 23.0 | 354 | 87.0 | 0.0 | 29.9 |
| BRT_9 | $H_2SO_4$ | 0.40 | 520 (728) | 231.00 | 30.2 | 17.8 | 326 | 78.7 | 0.0 | 27.5 |
| BRT_10 | $HNO_3$ | 0.45 | 754 (964) | 248.00 | 17.8 | 7.0 | 178 | 49.9 | 28.0 | 15.0 |
| BRT_11 | $H_2Ox$ | 0.62 | 380 (589) | 215.00 | 24.0 | 4.8 | 201 | 57.5 | 18.7 | 16.9 |

The neutral test of water and salt lixiviants did not show significant changes in the process parameters pH, ORP (Oxidation reduction potential measured vs. Ag/AgCl, in mV; SHE (Oxidation reduction potential vs. standard hydrogen electrode, given in mV)), and EC (electric conductivity). The duplicated water leach tests are in good agreement and show a good reproducibility. The mass loss of the leach residues of water, NaCl, and $NH_4Ac$ are in the same range within the experimental error and can be explained by the dissolution of gypsum up to the saturation of the solution. The tests of NaCl with addition of $BaCl_2$ and $Ca(NO_3)_2$, both show a slight gain in weight which is due to the formation of sparingly soluble $BaSO_4$ and likely a gypsum formation from the excess Ca and Ba of the lixiviant. The caustic lixiviants show a significant difference in mass loss. The mass loss in lime water ($Ca(OH)_2$ solution, saturated at room temperature) was only slight and comparable to water. In the NaOH solution however, the mass loss was 23% which can be assigned to the dissolution of gypsum and the formation of a saturated $Ca(OH)_2$ solution (Equation (1)).

$$CaSO_4 \cdot 2H_2O + 2NaOH \rightarrow Ca(OH)_2 + Na_2SO_4 + 2H_2O \quad \text{(Equation 1)}$$

Sulfuric and nitric acid also show a high mass loss, whereas oxalic acid ($H_2Ox$) only showed a slight loss compared to water. The mass loss is due to the formation of $CaHSO_4^+$ under acidic conditions. Ca and oxalic acid form a sparingly soluble calcium oxalate, which is precipitated as soon as gypsum is dissolved. Thus, the gypsum is converted and only a slight mass loss is detected.

The leach efficiency specifies the portion of the target element that was transferred to the solution (e.g., Ra, Ca, Sr, etc.). It evaluates the leaching step itself and was calculated from the results of the XRF and ICP-MS analyses, as well as the γ-spectroscopy of (i) the leachate (PLS) sampled from the filtrates, and (ii) the leach residue (LR) each related to the ICP-MS analysis and γ-spectroscopy of the PG feed (Equations 2 and 3):

$$\xi_{el}^{PLS} = \frac{c_{el}^{PLS} \cdot m_{Lix} \cdot \rho_{Lix}}{c_{el}^{ore} \cdot m_{ore}} \cdot 100\% \quad el = \text{element} \qquad \text{Equation (2)}$$

$$\xi_{el}^{LR} = 100\% - \left(\frac{c_{el}^{LR} \cdot m_{LR}}{c_{el}^{ore} \cdot m_{ore}} \cdot 100\%\right) \quad el = \text{element} \qquad \text{Equation (3)}$$

with $\zeta^i$ leach efficiency of the element el calculated from i=PLS or LR, ci concentration of el in j=PLS, LR and ore, $m_k$ mass of k=Lixiviant (Lix), LR and initial ore feed, respectively, $\rho_j$ density of the j=Lix. For simplification, the efficiency was set to 100% if the elemental concentration in the PLS was below detection limit and to 0% if a negative value was calculated. For the evaluation of the $^{226}Ra$ leaching efficiency the specific activity in Bq/kg was considered instead of the concentration.

Figure 3:
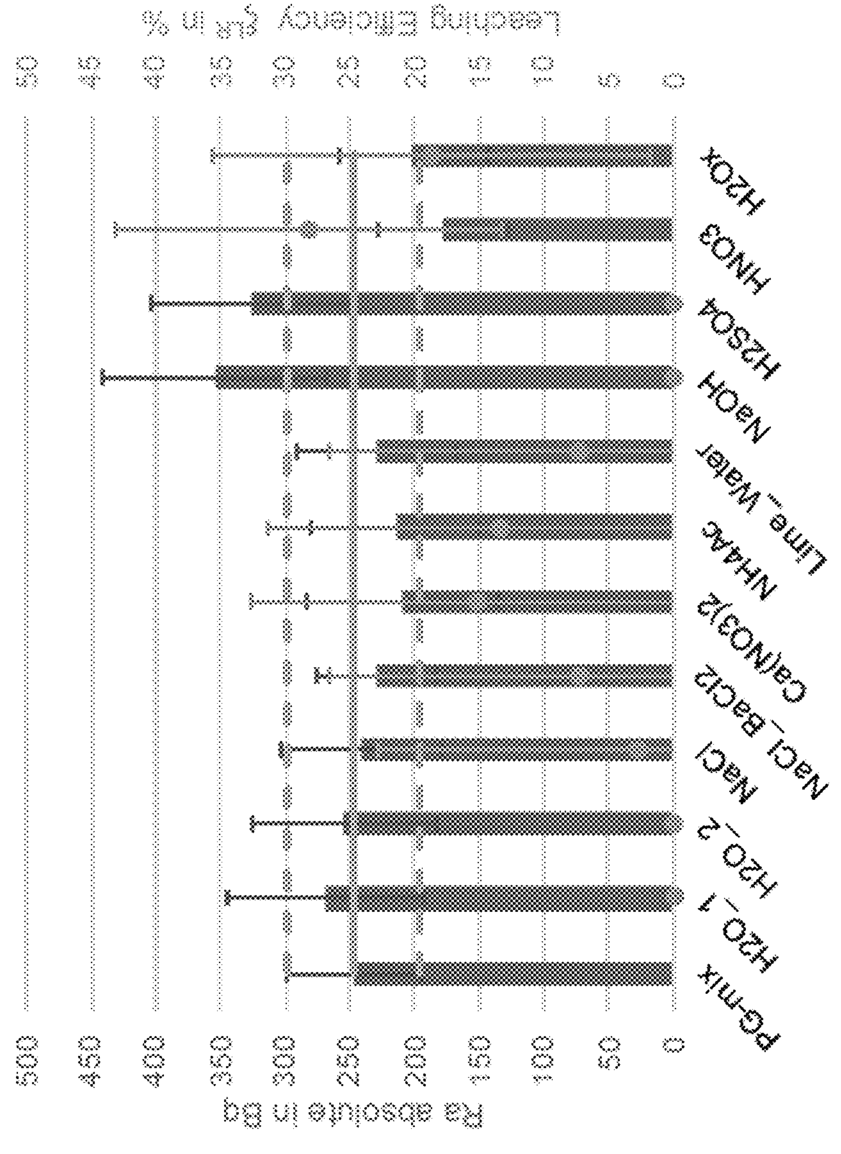
FIG. 3 is a graph showing evaluation of $^{226}Ra$ leachability based on comparison of the activity of $^{226}Ra$ in the feed sample PG-mix with that of the leach residue (Table 11) of the corresponding BRT test 1-11.

FIG. 3 shows evaluation of $^{226}Ra$ leachability based on comparison of the activity of $^{226}Ra$ in the feed sample PG-mix with the leach residue (Table 11) of the corresponding test.

The leaching efficiency was calculated according to Eq. (3). The activities measured of most LRs are in the range of uncertainty of the determination of the PG-mix activity, however, the measurements are consistent with each other and can be compared to show trends.

Figure 4A:
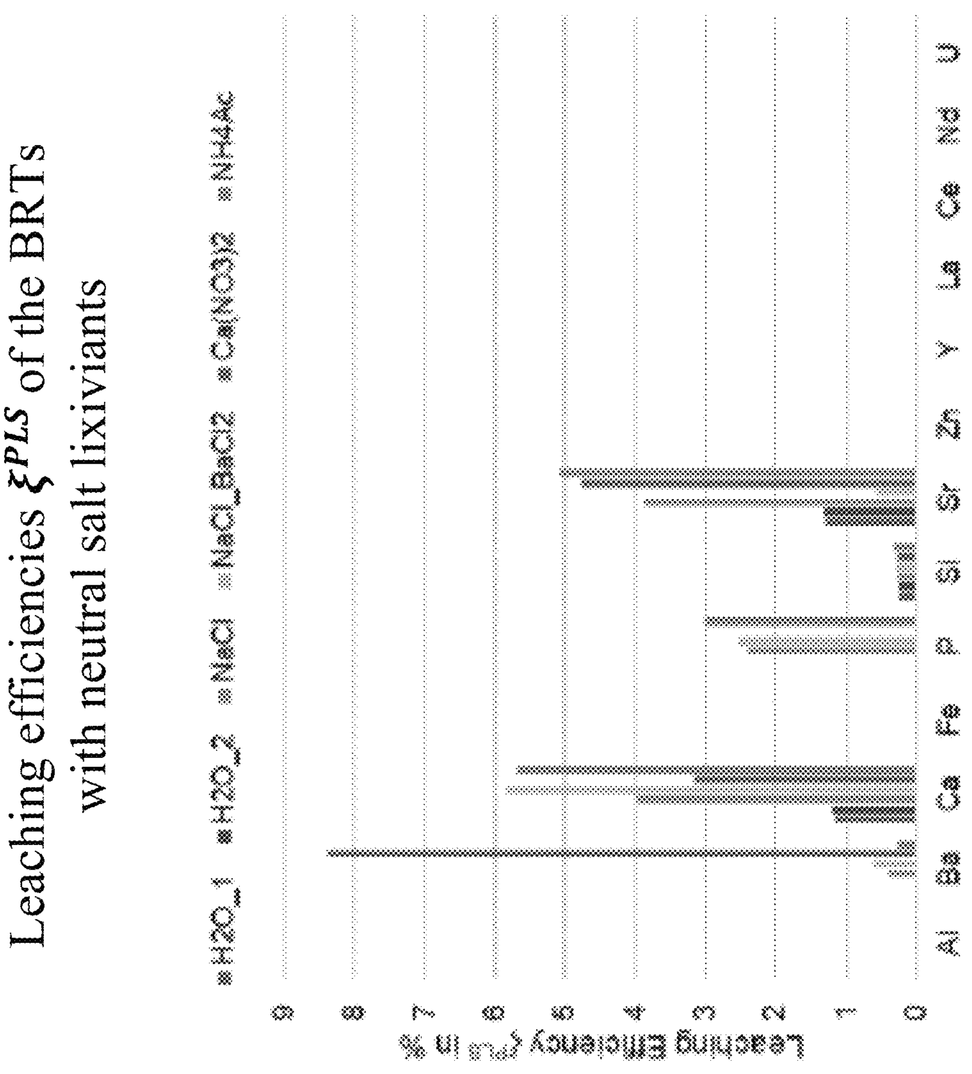
FIG. 4A is a graph showing leaching efficiencies $\zeta^{PLS}$ of the BRTs with neutral salt lixiviants.
Figure 4B:
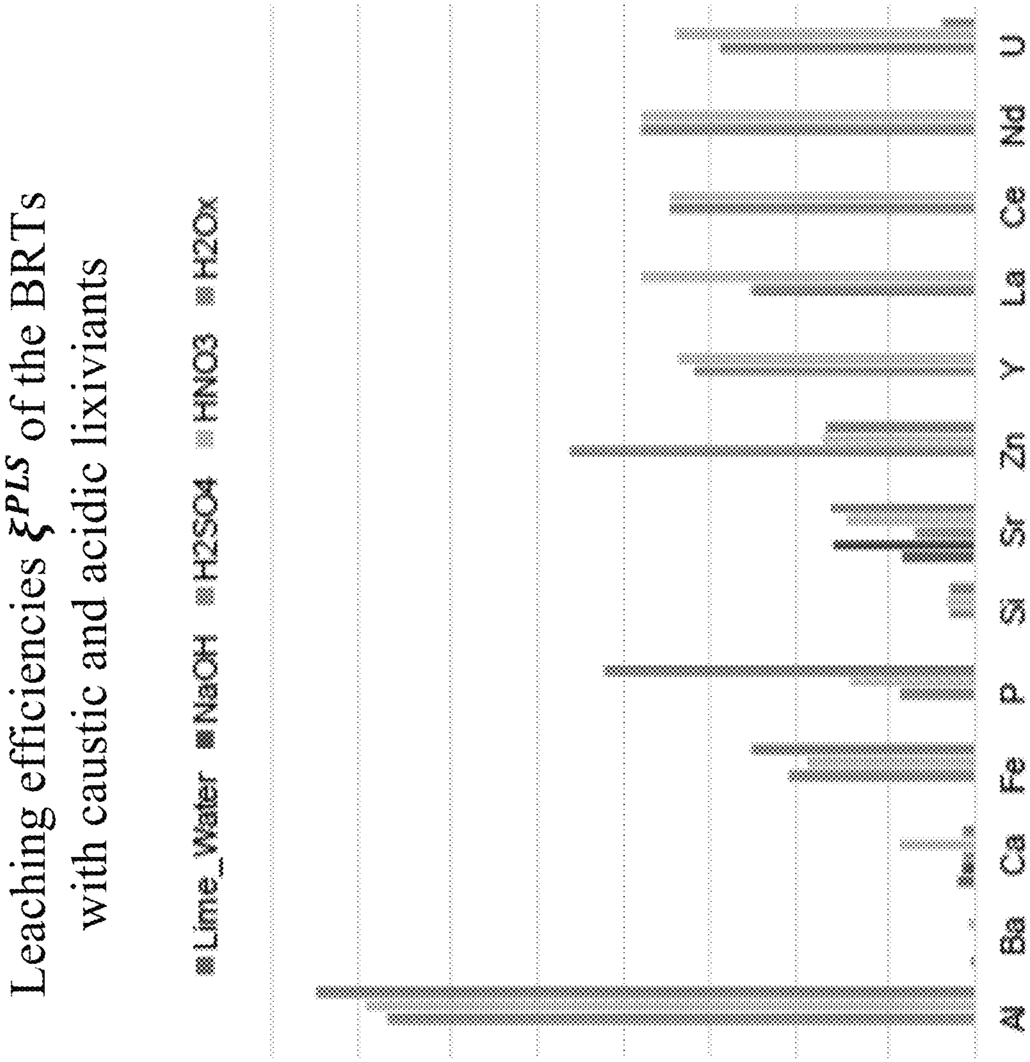
FIG. 4B is a graph showing leaching efficiencies $\zeta^{PLS}$ of the BRTs with caustic and acidic lixiviants.

All PLS samples were analyzed by ICP-MS to determine the leaching efficiency of the accompanying elements according to Eq. 2, with results shown in FIG. 4A and FIG. 4B.

Again, the results of the duplicated water leach are in good agreement and no $^{226}Ra$ was dissolved in these tests. In addition, the Ca and Sr leaching efficiency was between 1.2% and 1.3%, which is consistent with the expectation that since the stockpile material has been exposed to alteration processes (e.g., rain) over a long period of time, the water-soluble fraction of $^{226}Ra$ is expected to be washed out and only the main component of the PG, gypsum and other alkali earth sulfates, were leached to the solubility equilibrium.

An increase in salinity by NaCl caused a slight dissolution of $^{226}Ra$ and the addition of $BaCl_2$ was beneficial and increased the leaching efficiency by 5%. These tests showed an increased leaching efficiency of Ca, Ba and P compared to water and the addition of $BaCl_2$ increased the leaching efficiency slightly further. The Sr leaching increased with NaCl and decreased with $BaCl_2$ addition. This might indicate the precipitation of Sr in the presence of Ba. The formation of and (Ba,Sr) $SO_4$ might be possible. (E. Brower and J. Renault. Solubility and Enthalpy of the Barium-Strontium Sulfate Solid Solution Series: Circular 116. *New Mexico State Bureau of Mines and Mineral Resources* 1971, No. 116.)

The leaching with $Ca(NO_3)_2$ showed a further increase in $^{226}Ra$ leaching, whereby 15% of $^{226}Ra$ could be leached. In addition, Ca, Sr, and Ba were dissolved. This preferential leaching of alkali earth metals can be explained by the high solubility of the corresponding nitrate salts. The expected reaction is shown in Eq. (4):

$$RaSO_4+2Ca(NO_3)_2 \rightarrow Ra(NO_3)_2+CaSO_4 \quad \text{Eq. (4)}$$

Similar reactions for Sr-, Ba- and Ca- sulfate are considered. However, the predominance of Ca in the lixiviant will suppress $CaSO_4$ leaching. In addition, the solubility of $Ra(NO_3)_2$ is higher compared to $Ba(NO_3)_2$. (Brown, P. L.; Matyskin, A. V.; Ekberg, C. The Aqueous Chemistry of Radium. *Radiochimica Acta* 2022, 110 (6-9), 505-513. DOI: 10.1515/ract-2021-1141), which favors the dissolution of $^{226}Ra$.

The $NH_4Ac$ leaching showed a Ra leaching efficiency of 13.3%. The alkali earth acetates show a good solubility, which probably is the driving force for the dissolution of $^{226}Ra$, Ca, Sr, and Ba in this lixiviant.

The caustic lixiviants had only minor effect on the $^{226}Ra$-leachability and only small amounts of Ca and Sr were dissolved. Therefore, the assumed conversion of $RaSO_4$ to $Ra(OH)_2$ did not take place or took place only to a limited extent. High measured activity of the LR from NaOH leaching shows the accumulation of $^{226}Ra$ inside the LR. The overestimation of activity is caused by the high mass loss (23%) during the test and the associated measurement error.

The leaching with mineral acids $H_2SO_4$ and $HNO_3$ caused a significant increase in leaching of metals. Al, Fe, Zn, REEs and U are leached. Ca, Sr, and Ba only show a minor leaching efficiency. $^{226}Ra$ was preferably leached by $HNO_3$. $H_2SO_4$ did not result in the dissolution of $^{226}Ra$. The leaching of metals indicates that these are bound to a different mineral phase than $^{226}Ra$, presumably an oxide or a phosphate mineral such as monazite. The $^{226}Ra$ leaching is completely suppressed by $H_2SO_4$. This indicates that $^{226}Ra$ is present as a sulfate within the PG. This can be further confirmed by the high leachability with $HNO_3$. Here it can be considered that a similar leaching mechanism underlies as already discussed for Ca (Eq. (4)).

Oxalic acid is a diprotic organic acid. The anion forms chelating ligands and is therefore a good complexing agent. Leaching in oxalic acid leads to high leaching efficiencies for Al, Fe, and Zn. These metals form oxalate complexes with high stability constants and solubilities in water. Thus, they are preferably/selectively leached. In addition, the P concentration increases. Therefore, it can be concluded that these elements are associated with phosphate phases. The leaching efficiencies for the alkaline earth elements differ between the elements. $^{226}Ra$ and Sr show an increased leaching efficiency whereas Ca and Ba are only slightly dissolved.

The highest $^{226}Ra$ leaching efficiency was found for $HNO_3$, $H_2Ox$, $Ca(NO_3)_2$ and $NH_4Ac$. In practical applications of processing stockpiled PG, the leaching process will be expected to have a very high mass flow of PG in order to extract $^{226}Ra$ as efficiently as possible. Thus, in embodiments lixiviant(s) are selected that are available in large quantities at low cost, have good recyclability within the process, and are as environmentally friendly as possible if the lixiviant cannot be completely removed from the leach residue.

Embodiments of the invention include methods of processing PG comprising: A) combining fresh and/or stockpiled PG with a lixiviant (leach solution) chosen from i) $H_2O$ (water, de-ionized water, tap water, rain water, etc.); ii) NaCl (e.g., 1-20%, such as 5%, 10% or 15% NaCl, or any range in between); iii) a solution of NaCl+$BaCl_2$ (such as 10% NaCl+0.1% $BaCl_2$, or 20% NaCl+0.2% $BaCl_2$, or 1-20% NaCl+0.05-0.5% $BaCl_2$, or any range in between); iv) $Ca(NO_3)_2$ (such as 2-40% $Ca(NO_3)_2$, such as 5%, 10%, 15%, 20%, 25%, 30%, or 35% $Ca(NO_3)_2$, or any range in between); v) $NH_4Ac$ (such as 2-30% $NH_4Ac$, such as 5%, 10%, 15%, 20%, or 25% $NH_4Ac$, or any range in between); vi) lime water (e.g., saturated lime water); vii) NaOH (such as 5-30% NaOH, such as 5%, 10%, 15%, 20%, or 25% NaOH, or any range in between); viii) $H_2SO_4$ (such as 2-20% $H_2SO_4$, such as 5%, 10%, or 15% $H_2SO_4$, or any range in between); ix) $HNO_3$ (such as 2-20% $HNO_3$, such as 3%, 4%, 5%, 10%, or 15% $HNO_3$, or any range in between); x) $H_2Ox$ (such as 2-20% $H_2Ox$, such as 5%, 10%, or 15% $H_2Ox$, or any range in between); xi) a solution of $Ca(NO_3)_2$+$HNO_3$ (such as 5% $Ca(NO_3)_{2+3}$% $HNO_3$, such as 10% $Ca(NO_3)_{2+5}$% $HNO_3$, such as 15% $Ca(NO_3)_{2+2}$-10% $HNO_3$, such as 5% $Ca(NO_3)_{2+5}$-15% $HNO_3$, such as 10% $Ca(NO_3)_{2+2}$-10% $HNO_3$, or any range in between); xii) one or more nitrate salts, such as $NaNO_3$; xiii) or any combination of any one or more of these; B) allowing the leach solution to react with the PG for a residence time of up to about 24 hours, such as for about 2-6 hours, such as for about 3-5 hours, such as for about 4 hours and at a temperature in the range of about RT−70° C., such as from about 25-55° C., such as from about 30-50° C., such as from about 35-45° C., or about 40° C. to obtain pregnant leach solution (PLS) comprising $^{226}Ra$ separated from the PG and solids; and C) separating the PLS from the solids.

It will be understood by persons of ordinary skill in the art that the exemplary process conditions/parameters demonstrated in the Examples can be modified according to the teachings elsewhere in this disclosure. For example, with respect to the lixiviants exemplified, any one or more lixiviants can be substituted for any other lixiviant described herein. Further, with respect to the temperature of the leaching and/or the residence time for leaching, any temperature or time can be substituted for any other temperature or time within the ranges exemplified. Additionally, any lixiviant or lixiviant combination can be used in a leaching process with any temperature or time disclosed herein.

Exemplary leach systems, for example, using $Ca(NO_3)_2$ and/or $HNO_3$ as lixiviant(s), are described in greater detail below.

Nitrate System. Additional leaching processes for the nitrate system, $Ca(NO_3)_2$ and/or $HNO_3$, designed similar to the first, were further explored, with results shown in Table 12:

TABLE 12

Experimental data for BRT_12 to BRT_15 and BRT_20 to BRT_22

| Test ID | Medium | pH | ORP (SHE) in mV | EC in mS/cm | Moist in % | Mass loss in % | A in Bq | ΔA | $\xi^{PLS}$ Ra In % | $\Delta\xi^{PLS}$ Ra in % |
|---|---|---|---|---|---|---|---|---|---|---|
| PG-mix | — | — | — | — | | — | 247 | 51.4 | — | — |
| BRT_12 | 5% $Ca(NO_3)_2$ | 5.49 | 601 | 46.20 | 18.1 | 2.0 | 268 | 76.5 | 22.8 | 16.1 |

TABLE 12-continued

| Experimental data for BRT_12 to BRT_15 and BRT_20 to BRT_22 | | | | | | | | | | |
|---|---|---|---|---|---|---|---|---|---|---|
| Test ID | Medium | pH | ORP (SHE) in mV | EC in mS/cm | Moist in % | Mass loss in % | A in Bq | ΔA | $\xi^{PLS}$ Ra In % | $\Delta\xi^{PLS}$ Ra in % |
| | | | (811) | | | | | | | |
| BRT_13 | 20% $Ca(NO_3)_2$ | 4.06 | 573 (784) | 112.90 | 13.6 | −6.9 | 254 | 71.6 | 51.5 | 10.1 |
| BRT_14 | 5% $Ca(NO_3)_2$ 3% $HNO_3$ | 0.35 | 795 (1005) | 183.00 | 13.6 | 2.7 | 240 | 62.1 | 27.1 | 15.2 |
| BRT_15 | 10% $Ca(NO_3)_2$ | 5.08 | 595 (805) | 77.40 | 13.6 | 0.7 | 229 | 47.0 | 41.8 | 12.1 |
| BRT_20 | 40° C., 20% $Ca(NO_3)_2$ | 4.31 | 302 (511) | 13.70 | 10.1 | −1.8 | 214 | 65.1 | 72.5 | 5.7 |
| BRT_21 | 70° C., 20% $Ca(NO_3)_2$ | 3.81 | 296 (505) | 13.83 | 17.1 | −7.1 | 229 | 62.0 | 73.2 | 5.6 |
| BRT_22 | 25% $Ca(NO_3)_2$ | 4.44 | 368 (577) | 14.00 | 10.2 | −39.5 | 354 | 87.0 | 79.2 | 4.3 |

Table 12 summarizes the experimental data relating to various nitrate leaching systems. Only a slight mass loss or even a gain in mass was observed. Using BRT_22, 25% $Ca(NO_3)_2$, as lixiviant showed an enormous increase in mass. This might be due to the ongoing precipitation of the lixiviant and formation of gypsum.

$HNO_3$ as lixiviant resulted in a decrease of the pH and an increase of the ORP as expected. Furthermore, it could be observed that with increasing temperature both the pH value and the ORP of the resulting PLS decreased compared to the leaching at room temperature.

Figure 5A:
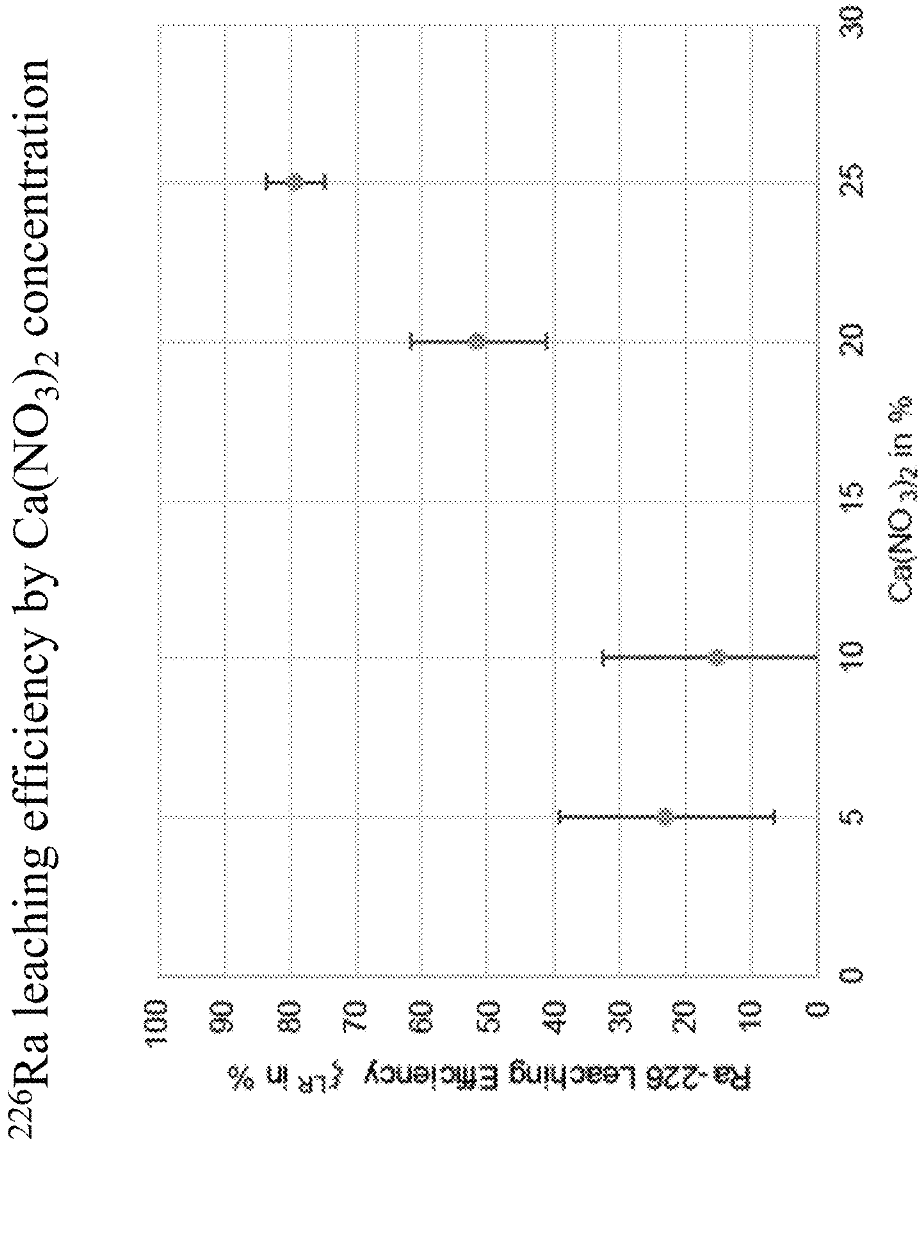
FIG. 5A is a graph showing $^{226}Ra$ leaching efficiency by $Ca(NO_3)_2$ concentration.
Figure 5B:
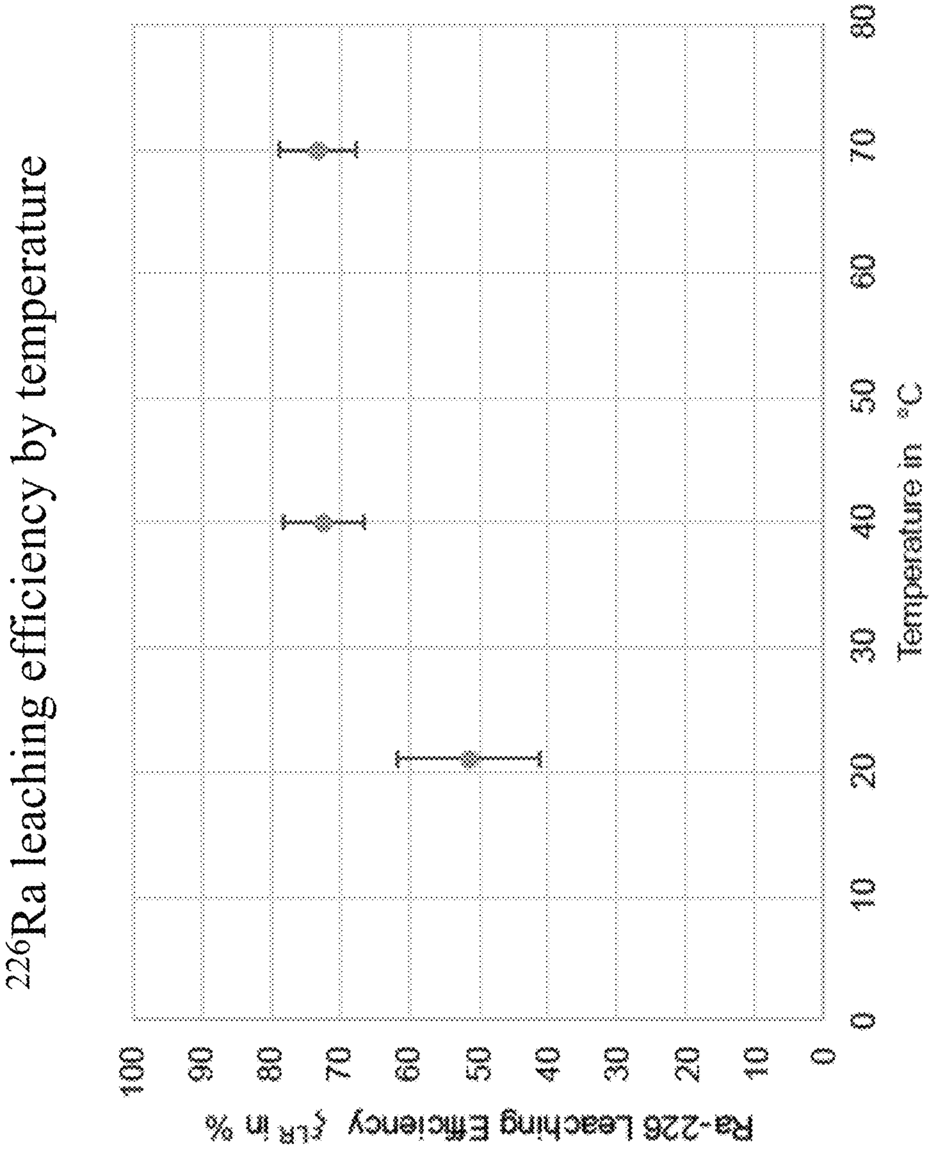
FIG. 5B is a graph showing $^{226}Ra$ leaching efficiency by temperature.

An increase in $^{226}Ra$ leaching with increasing $Ca(NO_3)_2$ content in the lixiviant was observed as shown in FIG. 5A. FIG. 5B shows $^{220}Ra$ leaching efficiency by temperature.

Figure 6:
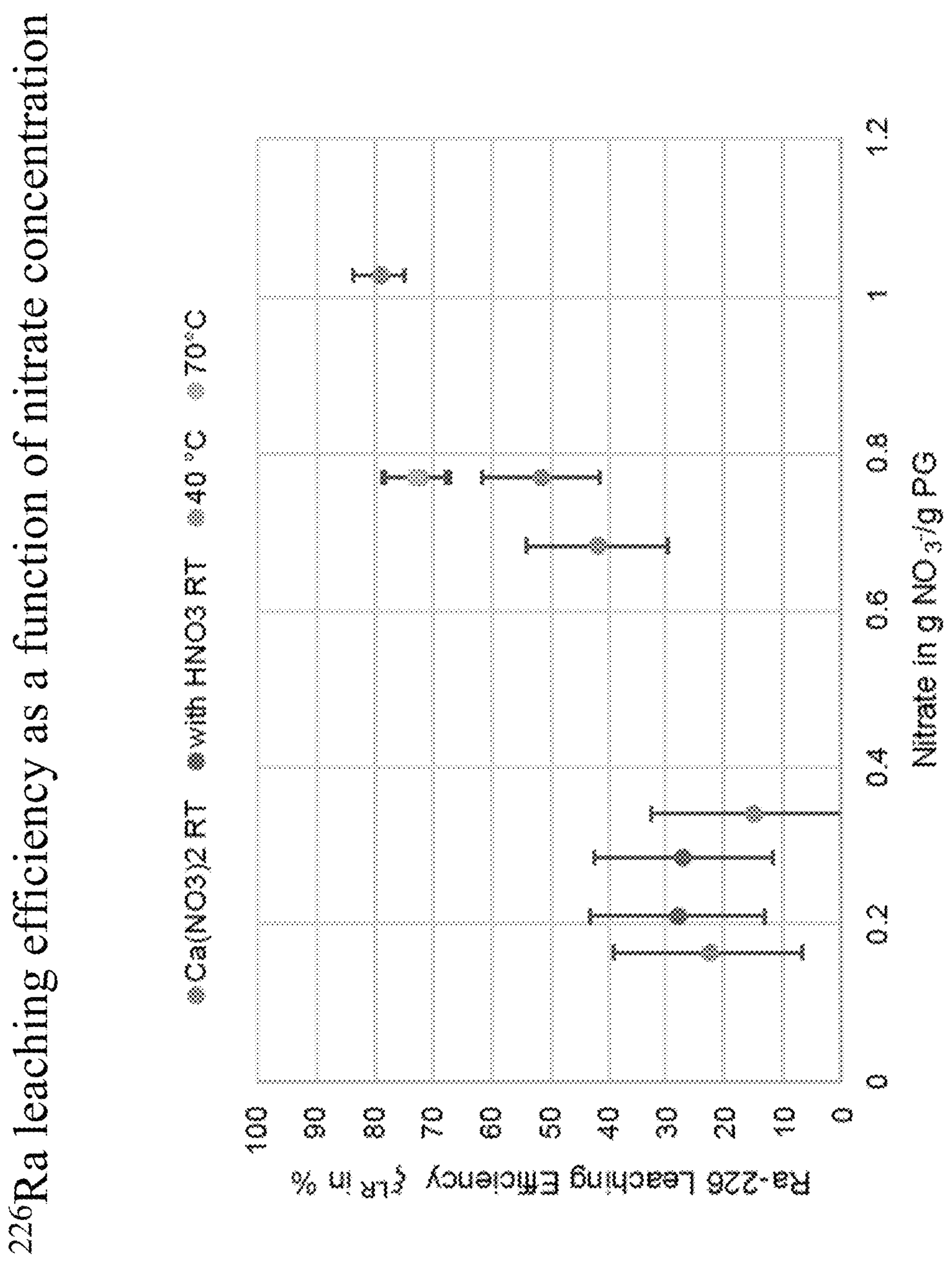
FIG. 6 is a graph showing $^{226}Ra$ leaching efficiency as a function of nitrate concentration.

When comparing the leachability in $Ca(NO_3)_2$ solution with and without $HNO_3$, no significant effect of the acid could be detected. $^{226}Ra$ leaching showed rather a correlation with total nitrate content as shown in FIG. 6 ($^{226}Ra$ leaching efficiency as a function of nitrate concentration).

The 2% Ra leaching had its maximum 25% $Ca(NO_3)_2$, however, the highest gain in mass was also observed. The temperature dependent assays showed an increasing $^{226}Ra$ leaching with increasing temperature, wherein the increase was highest between ambient conditions and 40° C. and only a small difference between 40° C. and 70° C. was observed. Since the tests at elevated temperature were mixed with a magnetic stirrer instead of the overhead shaker, the magnetic stir bar might have a grinding effect which enhances the $^{226}Ra$-leaching.

Figure 7A:
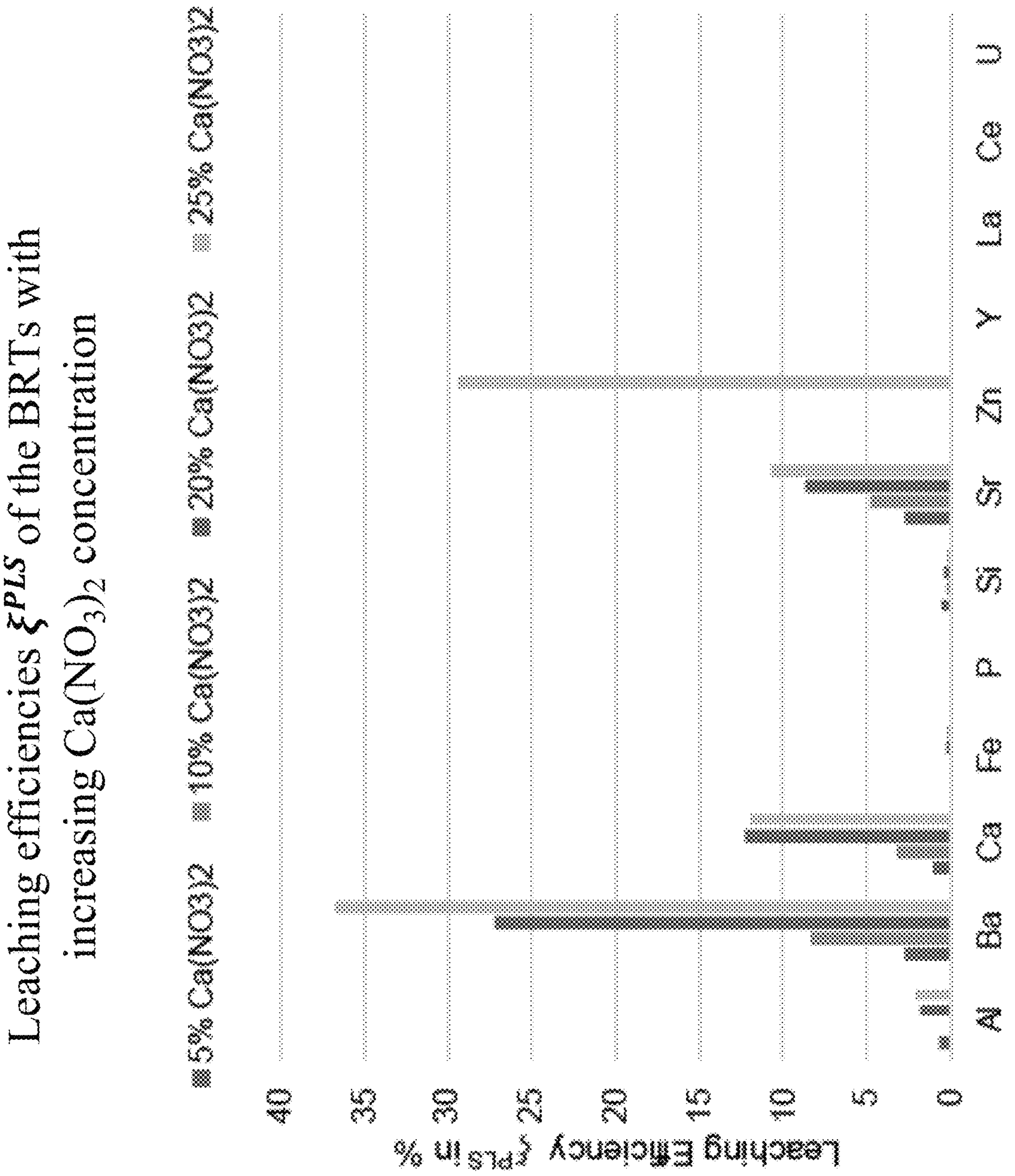
FIG. 7A is a graph showing leaching efficiencies $\zeta^{PLS}$ of the BRTs with increasing $Ca(NO_3)_2$ concentration.
Figure 7B:
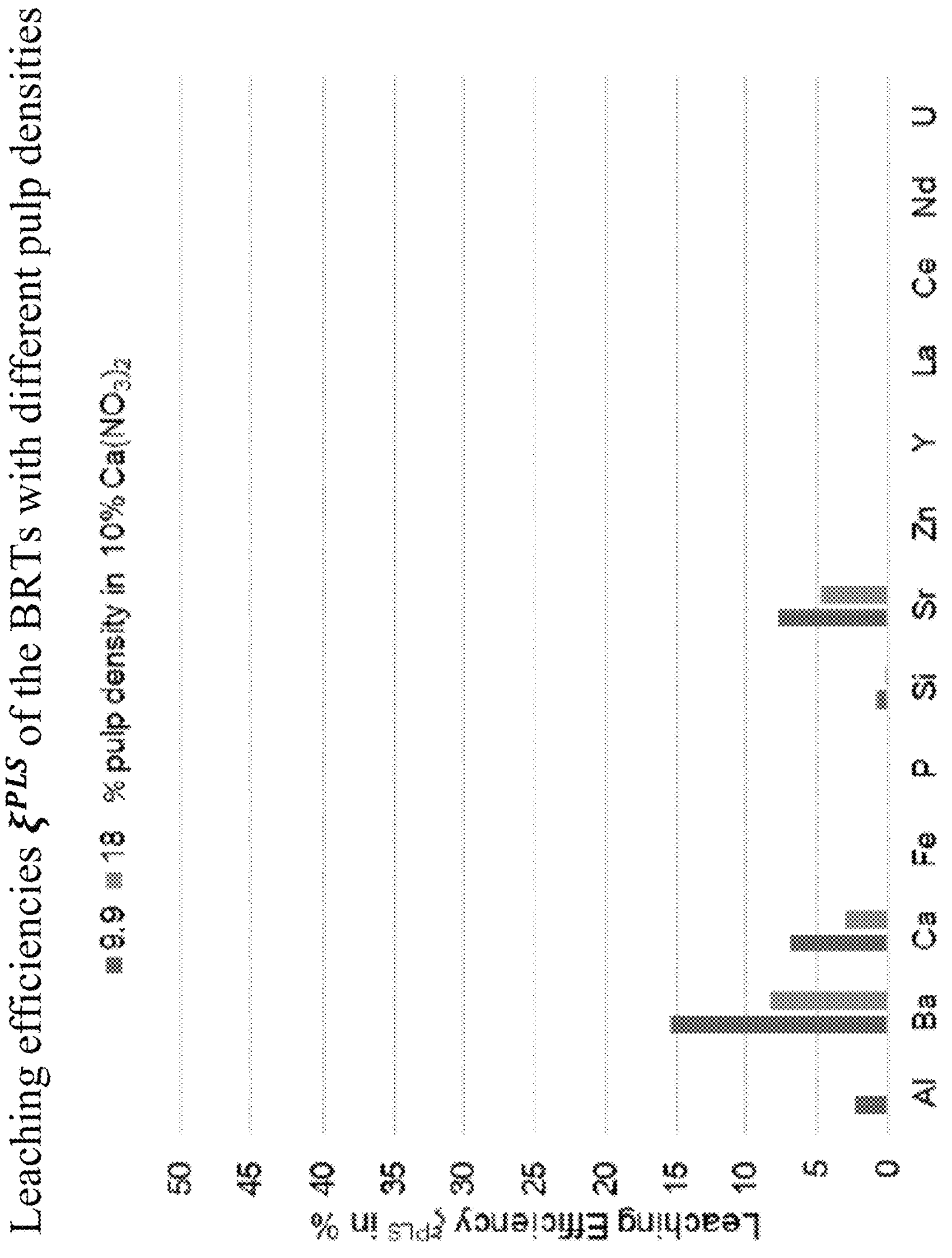
FIG. 7B is a graph showing leaching efficiencies $\zeta^{PLS}$ of the BRTs with different pulp densities.
Figure 8A:
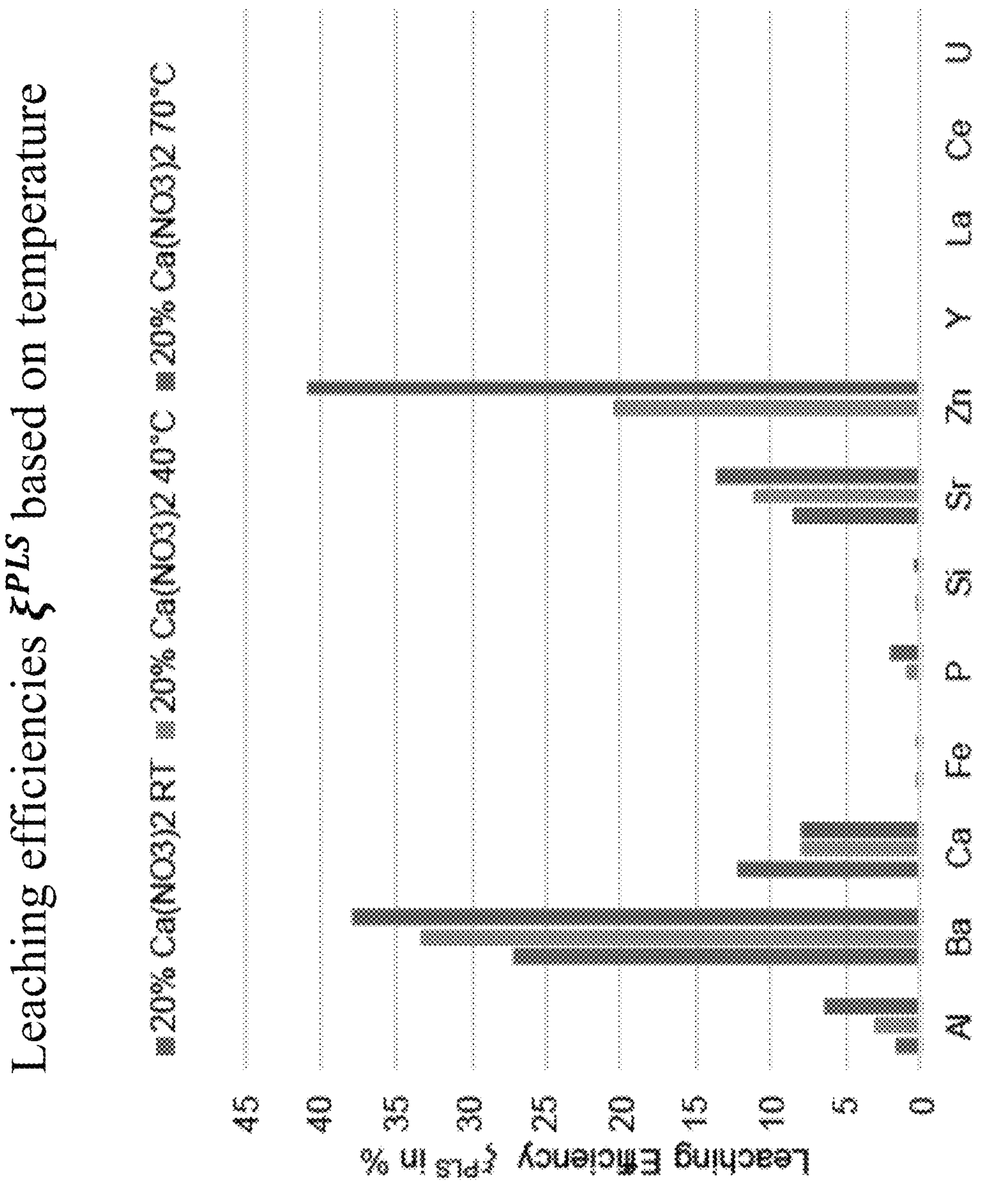
FIG. 8A is a graph showing leaching efficiencies ¿PLS based on temperature.
Figure 8B:
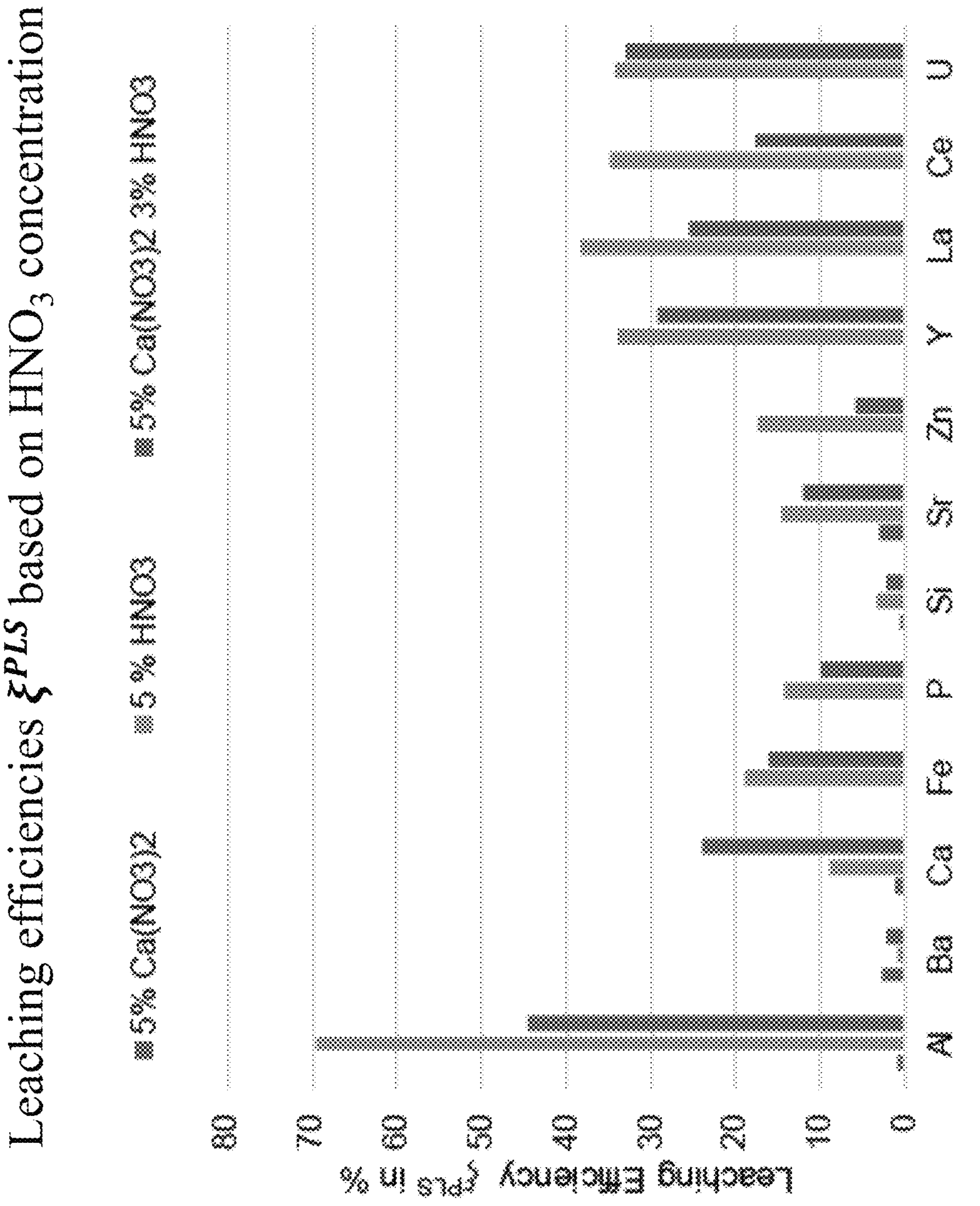
FIG. 8B is a graph of leaching efficiencies $\zeta^{PLS}$ based on $HNO_3$ concentration.

Leaching efficiencies of accompanying elements are summarized in FIG. 7A, FIG. 7B, FIG. 8A and FIG. 8B. FIG. 7A shows leaching efficiencies $\zeta^{PLS}$ of the BRTs with increasing $Ca(NO_3)_2$ concentration and FIG. 7B shows leaching efficiencies $\zeta^{PLS}$ of the BRTs with different pulp densities. FIG. 8A shows leaching efficiencies $\zeta^{PLS}$ based on temp, while FIG. 8B shows leaching efficiencies $\zeta^{PLS}$ based on $HNO_3$ concentration.

With increasing $Ca(NO_3)_2$ concentration, an increase in Ba, Ca and Sr leaching is observed, in addition, leaching of zinc occurs at the highest $Ca(NO_3)_2$ concentration (FIG. 7A, FIG. 8A). A comparison of the tests with 10% $Ca(NO_3)_2$ shows that a higher leaching efficiency can be achieved with a lower pulp density (FIG. 7B). This supports the hypothesis that leaching is dependent on the nitrate to PG ratio. With increasing temperature, an increase in Ba, Ca and Sr leaching as well as Al, P and Zn leaching is also observed (FIG. 8B).

Leaching under acidic conditions again shows an increasing leaching of impurity elements. Since this does not occur in pure $Ca(NO_3)_2$ solution, the pure and thus neutral salt solution is to be preferred for leaching of radium.

From the BRTs with stockpiled PG-mix the following observations are noted:

$^{226}Ra$ leaching ability increases with increasing nitrate content of the lixiviant.

No additional positive effect of an acidified lixiviant could be found. It is also to be expected that too high acidity leads to a decrease of radium nitrate solubility (Kirby & Salutsky, 1964, The radiochemistry of radium, in National Academy of Sciences, Nuclear Science Series NAS-NS 3057).

A high calcium nitrate concentration in solution leads to precipitation of calcium in the form of gypsum and thus to a strong gain in mass of the leach residue.

With increasing temperature, the $^{226}Ra$ leaching efficiency could be increased with only small differences between 40° C. and 70° C.

Increased $^{226}Ra$ leaching is accompanied by increased leaching efficiency of alkaline earth elements such as Ba, Ca, and Sr. Thus, $^{226}Ra$ is associated with the sulfates of the alkaline earth elements. Solid solution series between Ba and $^{226}Ra$ as well as between Sr and $^{226}Ra$ or mixtures of all three elements are possible (Hedström, H., Persson, I., Skarnemark, G., Ekberg, C., 2013, Characterization of Radium Sulfate, Journal of Nuclear Chemistry, vol 2013, article ID 940701, http://dx.doi.org/10.1155/2013/940701; Zhang, T., Gregory, K., Hammack R. W., Vidic, R. D., 2014, Co-precipitation of Radium and Strontium Sulfate and its impact on the fate of Radium during treatment of produced water from unconventional gas extraction, Environ. Sci. Technol., vol. 48, no. 8, p. 4596-4603).

From the BRTs the following conditions could be determined:

The inventors have demonstrated that higher nitrate concentrations, such as 20% $Ca(NO_3)_2$ and/or elevated temperature (between 40° C. and 70° C.) result in increased $^{226}Ra$ leaching. Under these conditions, $^{226}Ra$ leaching efficiencies of at least about 65% can be achieved. $^{226}Ra$-separation efficiency can be enhanced by a further increase in nitrate concentration of the lixiviant. Thus, alternative salts to $Ca(NO_3)_2$ can in addition or alternatively be used so as to avoid consumption of the medium by the formation of gypsum, but a higher gypsum dissolution is expected for a Ca-free lixiviant. Additionally, no further improvement results from increasing acidity during the leaching process. In fact, the solubility of $Ra(NO_3)_2$ decreases with increasing acidity. (Kirby, H. W., Salutsky, Murrell L., Grace, W. R. The Radiochemistry of Radium; NAS-NS No. 3057: Springfield, Virginia, 1964.) Furthermore, the increase in acidity causes the leaching of impurities.

EXAMPLE 2 (Fresh PG)

In addition to the PG-mix sample (EXAMPLE 1), a sample of fresh PG was processed using embodiments of leaching methods of the invention, including determining $^{226}Ra$ leaching efficiency of fresh PG with $Ca(NO_3)_2$ and $HNO_3$ as lixiviants. More particularly, the lixiviants included i) $H_2O$ (BRT_16), ii) 10% $Ca(NO_3)_2$ (BRT_17), iii) 5% $HNO_3$ (BRT_18) and iv) sequential leaching with $H_2O$ and 10% $Ca(NO_3)_2$ (BRT_23). It is noted that although the leaching of fresh PG was investigated using the nitrate system, like stockpiled PG, any of the leaching regimes described herein can be used with fresh PG as well.

The optical impression was similar to the acidic leaching tests with PG-mix, and the supernatant suspension was darkly discolored, but the leach filtrate was clear and colorless. The Ra leaching efficiency was in the range of 56% for $H_2O$ (BRT_16), 10% $Ca(NO_3)_2$ (BRT_17), and 5% $HNO_3$ (BRT_18) and thus appeared to be independent of the lixiviant tested. For a 2-stage leach regime (water and $Ca(NO_3)_2$, BRT_23) a slight increase in $^{226}Ra$ leaching to 67% was observed. The experimental data for leachability of fresh PG are summarized in Table 13:

TABLE 13

Experimental data for BRT_16 to BRT_18 and BRT_23

| Test ID | Medium | pH | ORP (SHE) in mV | EC in mS/cm | Moist in % | Mass loss in % | A in Bq | ΔA | $\xi^{PLS}$ Ra In % | $\Delta\xi^{PLS}$ Ra in % |
|---|---|---|---|---|---|---|---|---|---|---|
| PG fresh | — | — | — | — | 33.2 | — | 288 | 59.3 | — | — |
| BRT_16 | $H_2O$ | 2.38 | 470 (679) | 63.00 | 18.0 | −5.3 | 125 | 33.4 | 56.3 | 9.0 |
| BRT_17 | 10% $Ca(NO_3)_2$ | 1.00 | 585 (793) | 78.40 | 20.0 | −5.9 | 130 | 43.5 | 55.4 | 9.3 |
| BRT_18 | 5% $HNO_3$ | 0.33 | 798 (1006) | 237.00 | 18.3 | 8.6 | 120 | 34.5 | 58.7 | 8.6 |
| BRT_23 | $H_2O$ | 2.31 | 430 (639) | 4.94 | — | — | — | — | — | — |
| | 10% $Ca(NO_3)_2$ | 4.31 | 302 (511) | 13.70 | 16.2 | 1.7 | 87 | 21.6 | 67.2 | 6.8 |

Of note, the leaching efficiency of the accompanying elements is higher than for the corresponding tests with PG-mix and can be attributed to the acidity of the leaching solutions caused by remaining phosphoric acid in fresh PG. Additionally, the fresh PG had an initial moisture of 33.4%, which resulted in the solid liquid separation during long storage and having to be resuspended. The residual moisture of the leach residue was between 16 and 20%, slightly higher than for the tests with PG-mix (Table 11). The tests with water (BRT_16) and $Ca(NO_3)_2$ (BRT_17) resulted in a slight gain in mass. The leaching with $HNO_3$ (BRT_18) resulted in a mass decrease. Successive leaching with water and $Ca(NO_3)_2$ (BRT_23) leads to a slight decrease in mass. Due to the high moisture of the starting material of these tests, the indication of the mass loss is strongly subject to error because the weighing of the starting material with a constant moisture content was difficult, which may have resulted in different amounts of solids.

The pH of the leaching solutions was already strongly acidic both for leaching with $HNO_3$ and for leaching with water and neutral salt. This is an indicator that the fresh PG is still contaminated with phosphoric acid. The acidity can be washed out with water which is shown by the higher pH of the PLS of BRT_23 (4.31 pH). The ORP of the PLSs is in accordance with the lixiviant and complies with expectations.

For the evaluation of the leaching efficiency, the fresh PG was initially analyzed, with the elemental composition provided in Table 14:

TABLE 14

Elemental composition of fresh PG based on the composition of PG-mix

| mg/kg | As | Al | Ba | Ca | Fe | P | Si | Sr | Ti | Zn |
|---|---|---|---|---|---|---|---|---|---|---|
| PG-mix | 0.70 | 349 | 248 | 227294 | 283 | 3270 | 20057 | 868 | 90.7 | 7 |
| water soluble | 0 | 0 | 0 | 4611 | 23 | 1665 | 922 | 44 | 0 | 2 |
| Fresh PG (wet) | 0.47 | 233 | 166 | 156441 | 212 | 3849 | 14320 | 624 | 60.6 | 7 |

| mg/kg | Y | La | Ce | Pr | Nd | Gd | Dy | U |
|---|---|---|---|---|---|---|---|---|
| PG-mix | 68.5 | 31.5 | 23.0 | 5.55 | 21.0 | 5.50 | 5.30 | 3.05 |
| water soluble | 0 | 0 | 0 | 0 | 0 | 0 | 0 | 0.90 |
| Fresh PG (wet) | 45.7 | 21.0 | 15.3 | 3.71 | 14.0 | 3.67 | 3.54 | 2.94 |

Elemental composition was calculated based on the composition of PG-mix and the water-soluble fraction from the fresh PG of test BRT_16. For this calculation, the assumption is made that PG-mix is a leached fresh PG. The weathering was simulated by the water leaching so that the calculated composition should approximately reflect the real composition of the fresh PG.

The specific activity of the fresh PG was determined and is higher than the activity of PG-mix with $A_s$(fresh PG)=1439.84±296.62 Bq/kg (Table 4).

Figure 9A:
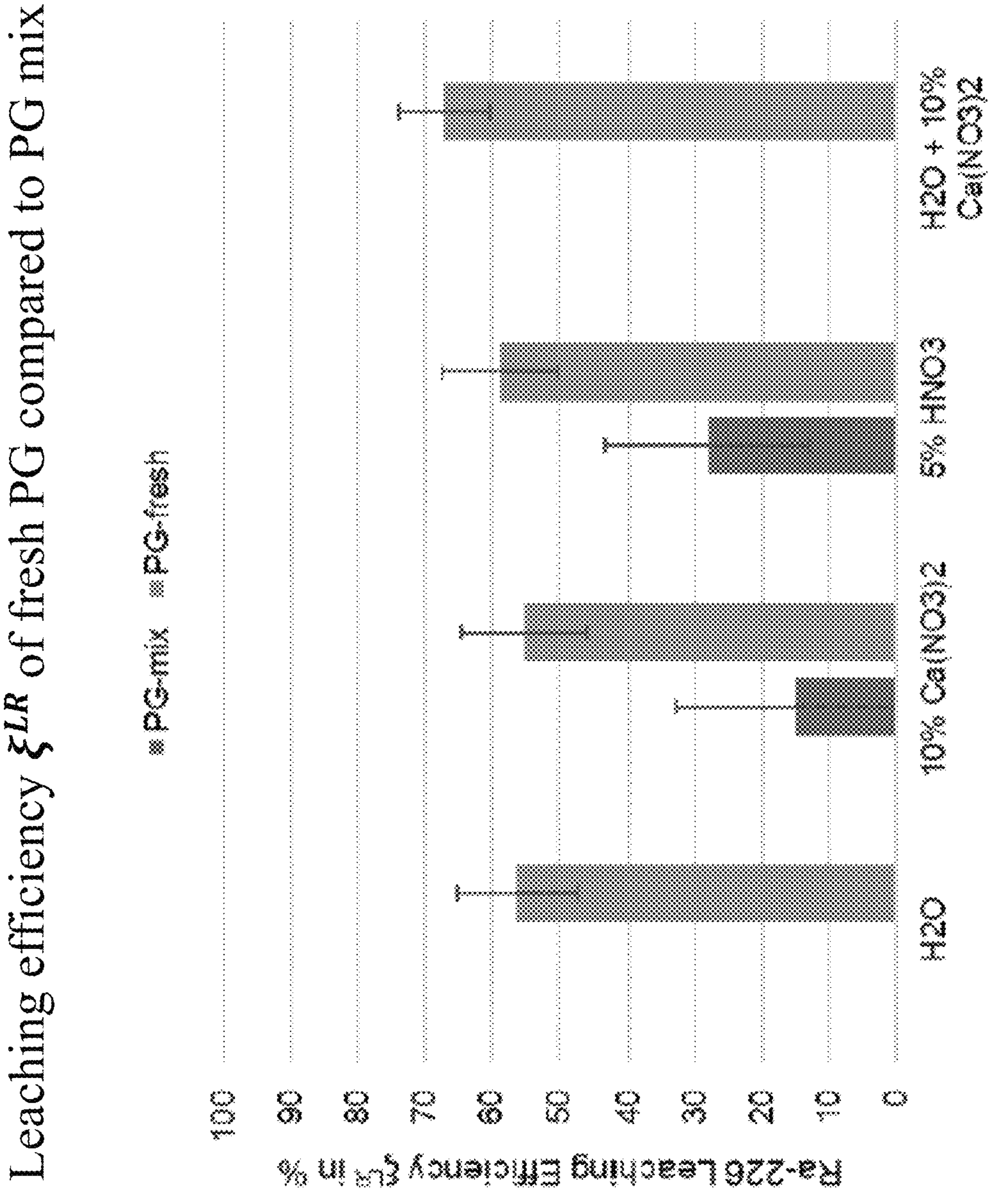
FIG. 9A is a graph of the leaching efficiency $\zeta^{LR}$ of fresh PG compared to PG mix.
Figure 9B:
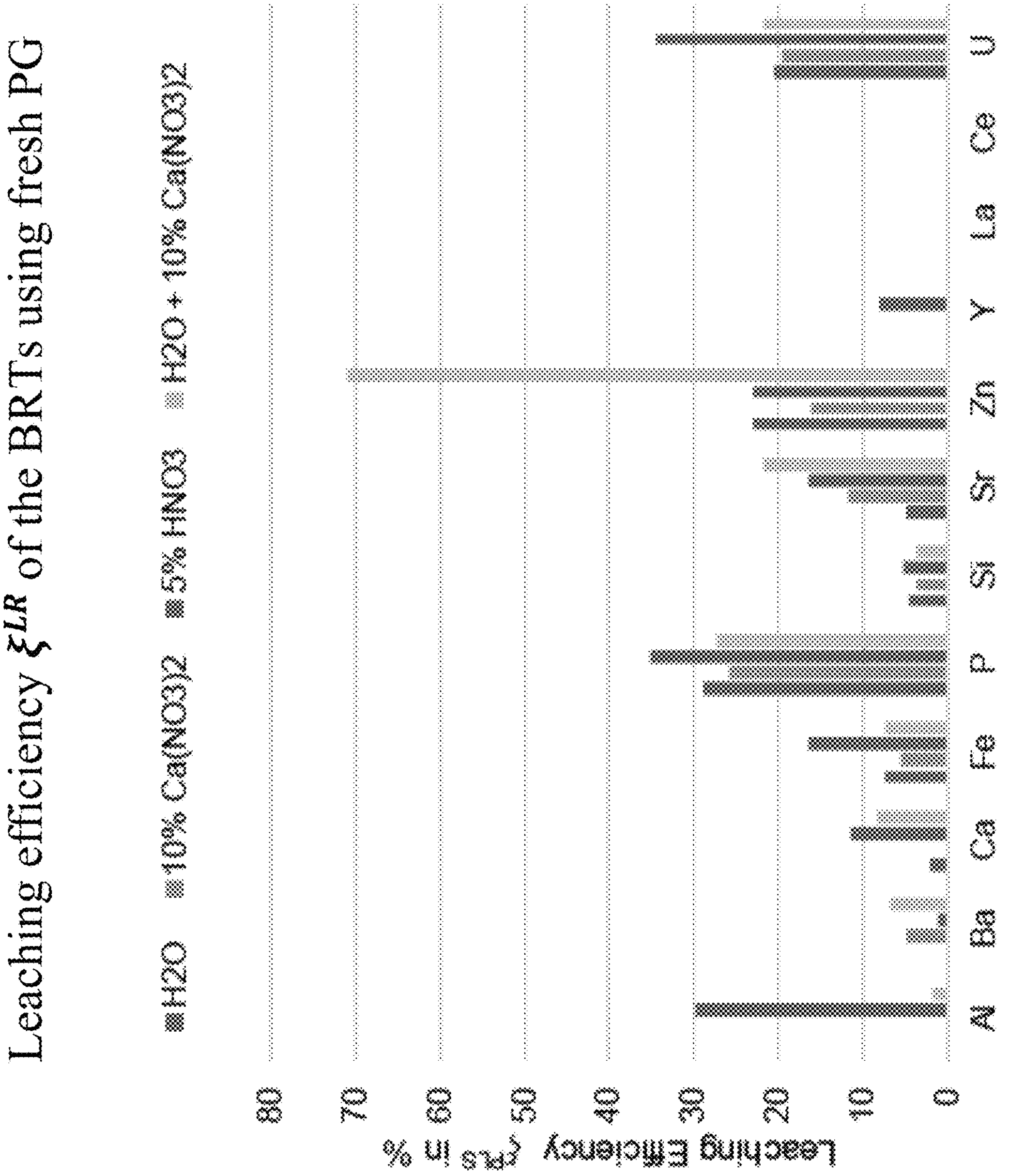
FIG. 9B is a graph of leaching efficiency $\zeta^{PLS}$ of the BRTs using fresh PG.

FIG. 9A and FIG. 9B show $^{226}$Ra leachability and elemental leaching. In particular, FIG. 9A shows leaching efficiencies $\zeta^{LR}$ of fresh PG compared to PG-mix, while FIG. 9B shows leaching efficiencies $\zeta^{PLS}$ of the BRTs conducted with fresh PG.

For the fresh PG, the results show that $^{226}$Ra leaching efficiency was independent of the lixiviant: $H_2O$ (BRT_16) (56.3%), 10% $Ca(NO_3)_2$ (BRT_17) (55.4%), and 5% $HNO_3$ (BRT_18) (58.7%). But for the leach regime using $H_2O$ and 10% $Ca(NO_3)_2$ (BRT_23) with fresh PG, a slight increase in $^{226}$Ra leaching of 10.9% to 67.2% was observed. This leads to the assumption that $^{226}$Ra is present in fresh PG mainly in water-soluble form. Additional leaching with $Ca(NO_3)_2$ leads to a leaching of the sulfate-bound $^{226}$Ra.

The additional leaching step(s) can be performed sequentially by leaching with water then another lixiviant, or can be performed sequentially by leaching with a first lixiviant then water. In embodiments, it is not critical the order of operation or the number of leaching steps.

For example, the water-soluble form of $^{226}$Ra can be leached with a selected lixiviant and the water-insoluble form of $^{226}$Ra can be leached with a different lixiviant, regardless of which lixiviant is exposed to the PG first or if the lixiviants are exposed to the PG simultaneously. Further, for example, such 2-step or multi-stage leaching can involve one or more leaching steps performed in a manner to separate either or both the soluble and insoluble forms of $^{226}$Ra from PG. In particular examples, fresh or stockpiled PG (or a combination) can be treated with a first lixiviant, then treated with a different lixiviant. Fresh or stockpiled PG (or a combination) can be treated with a first lixiviant, then treated with a different lixiviant, then treated with the first lixiviant again. Fresh or stockpiled PG (or a combination) can be treated with a first lixiviant, then treated with another lixiviant, then treated with the first lixiviant again, then treated with the other lixiviant again. Fresh or stockpiled PG (or a combination) can be treated with a first lixiviant, then treated with another lixiviant, then treated with the first lixiviant again, then treated with the other lixiviant again, and this pattern repeated any number of times, such as from 2-10 times, such as 3, 4, 5, 6, 7, 8, or 9 times. Fresh or stockpiled PG (or a combination) can be treated with a first lixiviant, then treated with a second lixiviant, then treated with another lixiviant, which is the same or different as the first or second lixiviant, optionally this pattern can be repeated any number of times, such as from 2-10 times, such as 3, 4, 5, 6, 7, 8, or 9 times.

Embodiments of the invention include methods of processing PG comprising: A) combining fresh and/or stockpiled PG with a lixiviant (leach solution) chosen from i) $Ca(NO_3)_2$ (such as 2-40% $Ca(NO_3)_2$, such as 5%, 10%, 15%, 20%, 25%, 30%, or 35% $Ca(NO_3)_2$, or any range in between); ii) $NH_4Ac$ (such as 2-30% $NH_4Ac$, such as 5%, 10%, 15%, 20%, or 25% $NH_4Ac$, or any range in between); iii) $HNO_3$ (such as 2-20% $HNO_3$, such as 3%, 4%, 5%, 10%, or 15% $HNO_3$, or any range in between); iv) $H_2Ox$ (such as 2-20% $H_2Ox$, such as 5%, 10%, or 15% $H_2Ox$, or any range in between); v) a solution of $Ca(NO_3)_2$+$HNO_3$ (such as 5% $Ca(NO_3)_{2+3}$% $HNO_3$, such as 10% $Ca(NO_3)_{2+5}$% $HNO_3$, such as 15% $Ca(NO_3)_{2+2}$-10% $HNO_3$, such as 5% $Ca(NO_3)_{2+5}$-15% $HNO_3$, such as 10% $Ca(NO_3)_{2+2}$-10% $HNO_3$, or any range in between); vi) or any combination of any one or more of these; B) allowing the leach solution to react with the PG for a residence time of up to about 24 hours, about 2-6 hours, such as for about 3-5 hours, such as for about 4 hours and at a temperature in the range of about RT–70° C., such as from about 25-55° C., such as from about 30-50° C., such as from about 35-45° C., or about 40° C. to obtain leachate/pregnant leach solution (PLS) comprising $^{226}$Ra separated from the PG, and solids; and C) separating the PLS from the solids.

Further of note is that particular temperatures, residence times and processing parameters for leaching and/or extraction can be selected according to the disclosures provided herein. For single, double or multi-step leaching, the leaching can be performed using a residence time (contact time of lixiviant and PG) in the range of up to about 24 hours, such as about 2-6 hours, such as about 2-5 hours, such as about 4 hours and/or at a temperature in the range of about room temperature (RT) to about 70° C., such as about 25-70° C., or about 30-55° C., or about 35-45° C., or about 35-50° C. Optionally, mechanical stirring of the PG and lixiviant can be employed so as to contribute a grinding effect, which may further enhance $^{226}$Ra leachability.

It is noticeable that there is no direct correlation between the $^{226}$Ra and the Ba or Sr leaching. Still, theses alkaline earth metals are leached by nitrate lixiviants. The observation suggests that $^{226}$Ra is not completely associated with barite in fresh PG.

The test results show a higher initial $^{226}$Ra leachability of fresh PG suggesting that 60% of $^{226}$Ra is in water soluble form. The leachability can be increased by $Ca(NO_3)_2$ re-leaching. Based on the results of the previous BRTs, this shows that 40% of the $^{226}$Ra in fresh PG is sulfate bound. This percentage could be due to an aging process in which the crystallization of sulfate phases proceeds. These observations are in accordance with the findings of Robert A. Zielinski, Mohammad S. Al-Hwaiti, James R. Budahn and James F. Ranville, 2011, Radionuclides, trace elements and radium residence in phosphogypsum of Jordan, Environ Geochem Health, vol. 33, p. 149-165 (Zielinski et al., 2011).

EXAMPLE 3—Upscaling of Process

Verification Tests. Select processes were repeated in $10^3$ g-scale to verify the results and produce a larger amount of solution for $^{226}$Ra separation and refining tests. In particular, the inventors demonstrate leaching methods using $Ca(NO_3)_2$ as an exemplary lixiviant which provides for enhanced $^{226}$Ra leaching efficiency, however, embodiments of the invention are by no means limited to this particular lixiviant, nor particular concentration of lixiviant.

The verification tests were used to verify on a larger scale select leaching conditions and to produce a larger volume of pregnant leach solution (PLS) for $^{226}$Ra separation tests therefrom. The positive effect of increased temperature to increase the $^{226}$Ra leaching efficiency was validated, as well as a reduction in retention time. It was determined that the retention time could be reduced from 24 h to 4 h with the same or even better leaching efficiency. In total, 50 L of PLS were produced. The PLS of 4 tests were combined and had a $^{226}$Ra concentration of 366±89 Bq/L.

For the experimental setup a 20 L double-walled stir tank reactor equipped with reflux condenser and gas scrubber was chosen. The temperature was set with an oil bath thermostat and monitored with a thermometer in the reactor. Evaporating water was recovered via a reflux condenser coupled to a cryostat to minimize mass loss. Additional exhaust gases were cleaned with a gas scrubber and vented through the ventilation system. The reactor was fed via a handhole and drained via a bottom valve. The suspension was filtrated in 3 batches with the help of a vacuum filtration unit in 5 L scale.

The experimental procedure was as follows: i) Setup of a 20 L leach vessel (double walled stirred tank reactor); ii) Preparation of the lixiviant at ambient temperature; iii) Start heating to target temperature; iv) Addition of PG; v) Mixing for target retention time; vi) Discharge of suspension; vii) Vacuum filtration through 2.5 μm filter paper in 5 L batches; viii) Dry sample of leach residue at 60° C., determine weight loss.

The analytical program consisted of: i) pH, ORP, EC determination of the solution samples at ambient conditions; ii) Elemental analysis of PLS and leach residue by XRF; iii) Elemental analysis by ICP-MS/OES of selected samples, iv) γ-spectroscopy of leach residue.

The experimental parameters of the leach conditions of the five batches were further varied. An overview of the large-scale verification tests is given in Table 15.

TABLE 15

Experimental parameters of verification tests

| ID | Feed | Lixiviant | Temperature | SLR | Leaching time |
|---|---|---|---|---|---|
| VT_1 | Stockpiled PG | 20% $Ca(NO_3)_2$ | 70° C. | 3/12 | 24 h |
| VT_2 | Stockpiled PG | 20% $Ca(NO_3)_2$ | 60° C. | 3/12 | 24 h |
| VT_3 | Stockpiled PG | 20% $Ca(NO_3)_2$ | 50° C. | 3/12 | 24 h |
| VT_4 | Stockpiled PG | 20% $Ca(NO_3)_2$ | 70° C. | 3/12 | 4 h |
| VT_5 | Stockpiled PG | 20% $Ca(NO_3)_2$ | 70° C. | 3/12 | 8 h |

The experimental results are summarized in Tables 16 and 17.

TABLE 16

Experimental data for VT_1 to VT_5

| Test ID | Parameter (T, t) | pH | ORP (SHE) in mV | EC in mS/cm | Moist in % | Mass loss in % |
|---|---|---|---|---|---|---|
| PG-mix | PG-mix | — | — | — | — | — |
| VT_1a | 70° C., 4 h | 2.52 | 525 (734) | 112.00 | — | — |
| VT_1b | 70° C., 24 h | 2.69 | 460 (669) | 110.70 | 14.1 | −4.4 |
| VT_2 | 55° C., 24 h | 4.10 | 468 (677) | 118.20 | 14.8 | −1.9 |
| VT_3 | 50° C., 24 h | 4.15 | 304 (602) | 117.00 | 15.5 | −13.0 |
| VT_4 | 70° C., 4 h | 3.48 | 380 (587) | 118.10 | 16.0 | −5.5 |
| VT_5 | 70° C., 8 h | 3.09 | 491 (700) | 117.70 | 11.1 | −3.1 |

TABLE 17

Balancing of $^{226}Ra$ activities of the verification tests

| Test ID | Parameter (T, t) | $A^{LR}$ in Bq/kg | $\Delta A^{LR}$ in Bq/kg | $\xi^{LR}_{el}$ in % | $\Delta\xi^{LR}_{el}$ in % | $A^{PLS}$ in Bq/L | $\Delta A^{PLS}$ in Bq/L | Accountability in % | ΔAccountability in % |
|---|---|---|---|---|---|---|---|---|---|
| PG-Mix | | 3701 | 771 | | | | | | |
| VT_1a | 70° C., 4 h | 1231 | 483 | 67 | 7 | | | | |
| VT_1b | 70° C., 24 h | 2266 | 464 | 39 | 13 | 1523 | 403 | 102 | 27 |
| VT_2 | 55° C., 24 h | 865 | 345 | 77 | 5 | 3473 | 719 | 117 | 33 |
| VT_3 | 50° C., 24 h | 1292 | 407 | 65 | 7 | 2515 | 734 | 103 | 31 |
| VT_4 | 70° C., 4 h | 942 | 569 | 75 | 5 | 3686 | 709 | 125 | 36 |
| VT_5 | 70° C., 8 h | 615 | 243 | 83 | 3 | 3507 | 705 | 111 | 31 |

The larger-scale leaching tests exhibited similar behavior to the BRTs, with the suspension showing comparable stirring and settling patterns. Filtration could also be performed similarly without encountering any difficulties. The moisture content of the leach residue is comparable across all five tests. The mass loss, however, showed a significant difference for VT_3 at 50° C. All tests showed a slight gain in weight (2-5%), whereas VT_3 had an increase of 13%. The test was conducted at 50° C. At this temperature the transition between gypsum and anhydrite as thermodynamic stable phase occurs (Freyer, D and Voigt, W., 2003, Crystallization and phase stability of $CaSO_4$ and $CaSO_4$-based salts, Monatshefte für Chemie, vol. 134, p. 693-719). For the other tests at higher temperatures, anhydrite is expected to be the stable phase. However, the formation of anhydrite at higher temperatures is kinetically hindered and hemihydrate is formed, which shows a much higher solubility (Freyer, Voigt, 2003). As a result, the $CaSO_4$ phase formed remains in solution and does not precipitate. The weight gain at 50° C. can be attributed to the precipitation of gypsum from the leaching solution, as observed previously in the case of BRT 22 (Table 12).

The pH of the leach solutions varied and decreased with increasing temperature. VT_1 already had a slightly lower initial pH since a different feedstock of salt was used. The ORP of the tests did not show a trend with time or temperature. However, it varies strongly between 600 and 700 mV. It is assumed that this is an effect of the absolute concentration of the PLS. It was observed that the volumes of the filtrates varied greatly. In some cases, there were differences of up to 4 L. This effect is due to the loss through evaporation. The lixiviant was heated prior to leaching in order to be able to perform short leaching periods safely at the target temperature. Depending on the length of this heating and holding period, evaporation of water occurred which could not be completely prevented by the reflux condenser.

$^{226}Ra$ leachability was determined based on the analysis of the leach residue and the PLS. The determination of the mass balance and accountability (Table 17) allowed for the evaluation of all tests. The accountability across all tests was within a similar range, with a slight tendency to overestimate $^{226}Ra$. This discrepancy can be attributed to experimental errors and the inherent measurement uncertainty of γ-spectroscopy.

Figure 10:
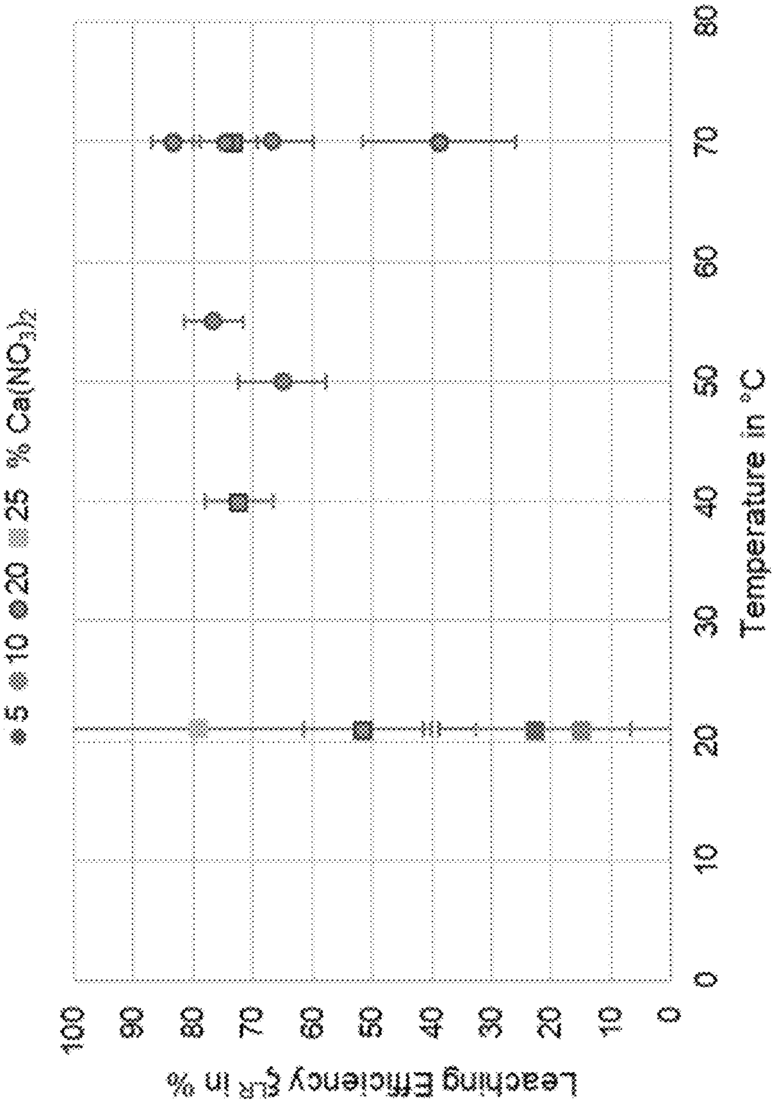
FIG. 10 is a graph showing $^{226}Ra$-leaching trends with temperature.

The $^{226}Ra$-leaching trends with temperature are shown in FIG. 10 and more particularly, $^{226}Ra$ leaching efficiency depending on temperature and $Ca(NO_3)_2$ concentration with the verification tests represented by circles and the BRTs represented by squares.

The leaching efficiencies of all VTs were in the range of 65-83%, with the exception of VT_1b (24 h), which showed a significantly decreased efficiency of $\zeta^{LR}$=39%. The 4 h sample of the same test at 70° C. (VT_1a), however, resulted in an efficiency of $\zeta^{LR}$=67%. The decrease in $^{226}Ra$ concentration of the VT_1b PLS is believed to be due to a secondary precipitation of Ra.

The dependency of the leaching efficiency on the retention time was tested in VT_4 and VT_5. Both VT_4 and VT_5 showed very high $^{226}Ra$ leaching efficiency of $\zeta^{LR}$=75-83%. Thus, a reduced retention time does not affect the leaching efficiency. Accordingly, in embodiments of the invention the retention time of the phosphogypsum in contact with the lixiviant(s) can be in the range of up to about 24 hours, such as in the range of about 2-6 hours, or in the range of about 3-5 hours, such as about 4 hours.

Figure 11:
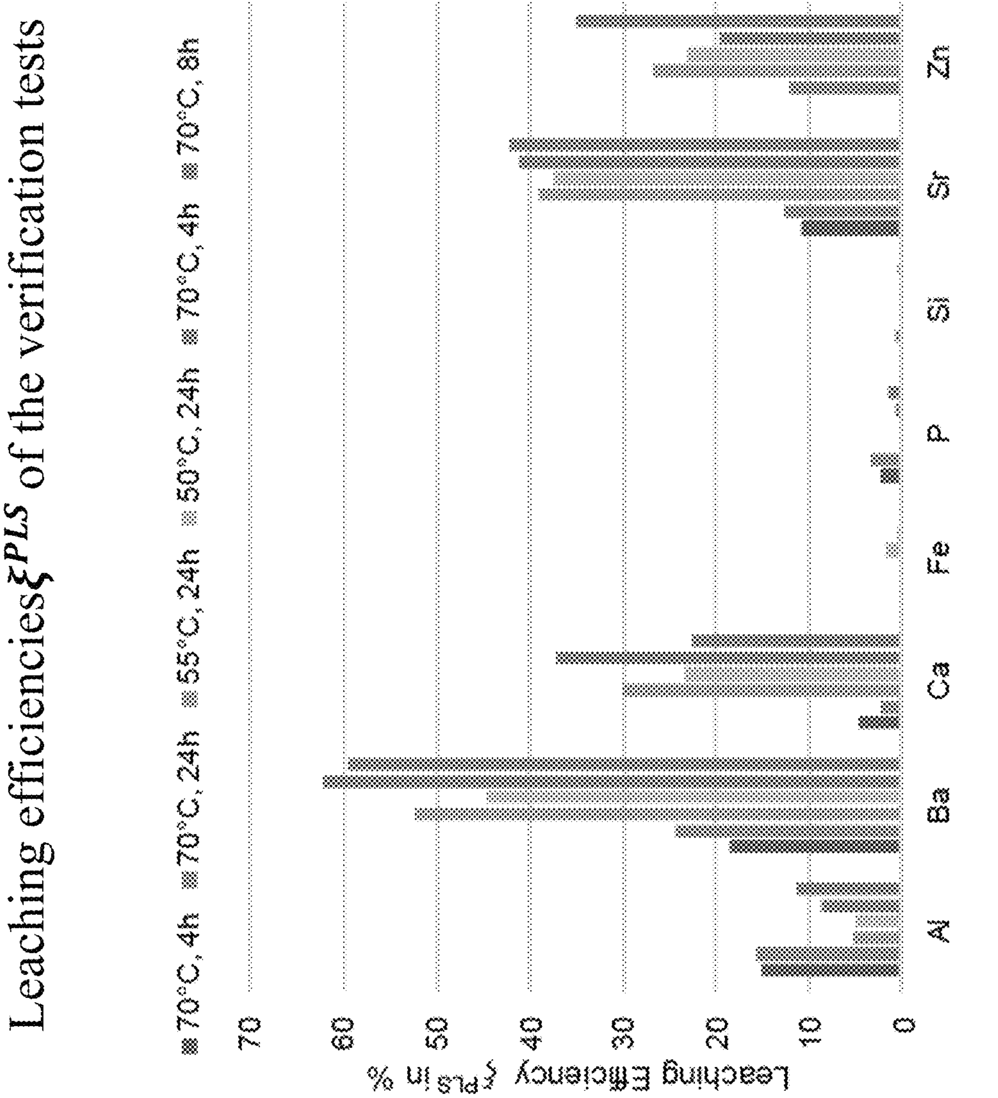
FIG. 11 is a graph showing leaching efficiencies PLS of the verification tests.

The accompanying elemental leaching is summarized in FIG. 11, showing leaching efficiencies PLS of the verification tests.

Similar elemental concentrations were detected for all VTs. In general, the leaching efficiency was highest for VTs at 70° C. and decreased with temperature. Again, Ba, Ca, and Sr were the main elements leached, and the leaching corresponds with the trends in $^{226}$Ra leaching. The reduced retention time in VT_4 and VT_5 resulted in the highest Ba leaching efficiency. Since it is assumed that Ra is associated with barite, this is in accordance with expectations. The VT_1 test does not match expectations. A different salt feedstock was used here, which lead to lower $^{226}$Ra and alkaline earth element leaching. The feed solution used showed elevated concentrations of Mg, Ba, Al, and Fe, which may have hindered the leaching. Further, the inventors have demonstrated that higher nitrate concentrations and elevated temperatures (e.g., temperatures above room temperature) lead to an increased efficiency in leaching of $^{226}$Ra and have found no further improvement from increasing acidity during the leaching process. In fact, the solubility of $Ra(NO_3)_2$ decreases with increasing acidity. (Kirby, H. W., Salutsky, Murrell L., Grace, W. R. The Radiochemistry of Radium; NAS-NS No. 3057: Springfield, Virginia, 1964.) In addition, the increase in acidity causes the leaching of impurities.

In addition to the solution analysis, the LR of VT_4 was sampled and re-suspended in water. The suspension was vacuum filtrated, and the residue was washed on the filter. The elemental analysis of the dried solid as an example for a purified PG is given in Table 18.

TABLE 18

Elemental composition of the washed LR of VT_4 vs. PG-mix

| Element | PG-mix | LR VT_4 (washed) | Difference in % |
|---|---|---|---|
| CaO in % | 31.8 | 36.4 | 14 |
| $SO_4$ in % | 51.0 | 47.8 | −6 |
| $SiO_2$ in % | 4.3 | 3.7 | −13 |
| $Na_2O$ in % | <0.1 | <0.1 | |
| C (organic) in % | 0.1 | n.d. | |
| F in % | 0.345 | 0.377 | 9 |
| $P_2O_5$ in % | 0.75 | 0.81 | 9 |
| $Al_2O_3$ in % | 0.07 | 0.16 | 145 |
| Cl in % | <0.01 | n.d. | |
| MgO in % | <0.005 | <0.005 | |
| $Fe_2O_3$ in % | 0.04 | 0.06 | 59 |
| Ti in mg/kg | 90.7 | 84.35 | −7 |
| Co in mg/kg | <1 | <1 | |
| Cu in mg/kg | <1 | <1 | |
| Zn in mg/kg | 7.0 | 4.45 | −36 |
| Hg in mg/kg | <0.07 | <0.07 | |
| Pb in mg/kg | <2 | <2 | |
| As in mg/kg | 0.7 | <0.8 | |
| Ba in mg/kg | 248 | 166.5 | −33 |
| Sr in mg/kg | 868 | 898.5 | 4 |
| Th in mg/kg | <20 | <2 | |
| U in mg/kg | 3.1 | 2.85 | −7 |
| REE in mg/kg | 91.8 | 77.25 | −16 |
| Sc in mg/kg | <50 | <10 | |
| Y in mg/kg | 68.5 | 63.2 | −8 |

While there are no major changes in the elemental composition of LR VT_4 relative to the PG-mix sample, the Ba content was strongly reduced (33%). Thus, it can be shown that leaching of $^{226}$Ra is very selective and has only negligible effect on the overall composition of PG.

50 L of PLS was produced from the verification tests, and the PLS' of VT_2 to VT_5 were combined as a mixed PLS, having a $^{226}$Ra concentration of 330.3±51.5 Bq/L.

Fresh PG already shows high leaching efficiencies with water, indicating that only a small portion of the $^{226}$Ra in fresh PG is associated with barite. In contrast, QEMScan analysis for aged PG suggests an association with barite, which is also related to reduced leachability.

EXAMPLE 4—Extraction/Recovery of $^{226}$Ra

Once $^{226}$Ra has been separated/removed from the phosphogypsum into the PLS/leachate, one or more various techniques can be used to extract the $^{226}$Ra for example for the purpose of isolating $^{226}$Ra. Although ion exchange (IX) is noted in FIG. 1 as an extraction method that can be used in combination with the exemplified leaching processes, one of ordinary skill in the art equipped with the teachings of this disclosure will understand/know that other extraction methods can be substituted instead. More details regarding these exemplary extraction methods are provided below.

In this Example, 2% Ra separation/extraction was performed using the pregnant leach solution (PLS) obtained from the verification tests above. The recovery specifies the portion of the target element (e.g., 2% Ra) transferred into the final filtrate. It evaluates the process step including the loss of solution within the process step, e.g., by filtration or transferring solution. The recovery is calculated similar to the efficiencies from the results of the XRF and ICP-MS analysis and γ-spectroscopy of the PLS sampled from the filtrates related to the ICP-MS analysis of the ore feed (Equation 5):

$$\eta_{el}^{PLS} = \frac{c_{el}^{PLS} \cdot m_{PLS} \cdot \rho_{PLS}}{c_{el}^{ore} \cdot m_{ore}} \cdot 100\% \quad \text{el} = \text{element} \qquad \text{Equation (5)}$$

With n' recovery of the element el calculated from i=PLS, c' concentration of el in j=PLS and ore, $m_k$ mass of k=PLS and initial ore feed, respectively, $\rho_j$ density of the j=PLS. For simplification, the recovery was set to 100% if the elemental concentration in the PLS was below detection limit and to 0% if a negative value was calculated.

The error propagation of the $^{226}$Ra leachability was calculated due to the partly very high measurement uncertainty of the γ-spectroscopy caused by the low activity of some samples according to Equation 6:

$$\Delta\xi(x, y, \ldots) = \sqrt{\left(\frac{\partial \xi}{\partial x}\right)^2 \Delta x^2 + \left(\frac{\partial \xi}{\partial y}\right)^2 \Delta y^2 + \ldots} \qquad \text{Equation (6)}$$

The following assumptions were made for the evaluation of the derived data: For the calculation of the leaching efficiency it is assumed that the total volume of the lixiviant is not affected by the leaching.

Specific characteristics of the PLS, such as high salinity and/or a high Ca/Ra ratio, should be considered when selecting an appropriate Ra-separation technology. Described herein are exemplary methods for extracting Radium from a liquid, such as PLS/leachate. Extraction methods can include extracting/separating Ra (or other constituent of interest) by way of selective precipitation and/or ion exchange (IX) and/or solvent extraction (SX) and/or membrane technologies.

For selective precipitation of (Ba,Ra) $SO_4$, various precipitants such as $NaSO_4$ or $H_2SO_4$ can be used. Notably, the inventors have discovered that selective Ra-precipitation as sulfate is kinetically hindered and that equilibration of the solution can be enhanced using longer retention times and an increase in temperature.

Batch tests using ion exchange (IX) were conducted to demonstrate the selectivity of the IX resin used for $^{226}Ra$ extraction. The resin, LEWATIT® MDS 200 H, commonly used for water treatment, was employed for the ion exchange. With increasing volume of PLS per wet settled resin (WSR), selectivity for $Ba^{2+}$ and $Ra^{2+}$ also increases. It was determined that a maximum resin loading of 3.68 nmol/$L_{WSR}$ $Ra^{2+}$ (36308 Bq/$L_{WSR}$) could be achieved. At the same time, $Ca^{2+}$ loading was significantly reduced with increasing PLS volume. With increased selectivity for $Ba^{2+}$ and $Ra^{2+}$ but decreased selectivity for $Ca^{2+}$, it was demonstrated that the LEWATIT® MDS 200 H resin is highly selective for radium, making it suitable for $^{226}Ra$ separation.

According to embodiments of the invention, for Ra separation from the PLS when the raffinate obtained is free of, or essentially free of, Radium and/or when the raffinate comprises only low concentrations of Ba and Sr, such raffinates can then be recycled in the process as a lixiviant for radium leaching again. This recycling option when implemented in the process would provide the additional benefits of reduced chemical consumption and wastewater production.

In embodiments, the process can include aging the PLS and/or using an aged PLS as the feed solution for the $^{226}Ra$ extraction/separation process, such as ion exchange.

In embodiments, the IX feed solution can be treated with one or more purification step, such as prior to subjecting the feed solution to ion exchange.

The PLS obtained from the $^{226}Ra$-selective leaching process described herein had high salinity and ionic strength, high density, gypsum saturation, and a high Ca/Ra ratio. In addition, due to the high $Ca(NO_3)_2$ dosage (about 1 kg per kg PG) a process is envisaged in which the leaching solution can be recycled efficiently. Thus, selective precipitation and ion exchange (IX) were considered as suitable processes.

For the selective precipitation, the (Ba,Ra) $SO_4$ solid solution applies as a potential precipitate due to its low solubility in water (Brown, P. L., Matyskin, A. V., Ekberg, C., 2022, The aqueous chemistry of Radium, Radiochim. Acta, vol. 110, no. 6-9, p. 505-513). In addition, precipitation of hydroxides is also possible. The solubility of $Ra(OH)_2$ is the highest among the alkaline earth elements (Brown 2022) and, in addition, the precipitation of the different hydroxides is strongly pH dependent. Thus, a fractional precipitation of the single alkaline earth hydroxides might be possible. This can help to reduce the Ca/Ra ratio so that alternative separation processes may apply.

$^{226}Ra$ Separation/Extraction by Selective Precipitation. $^{226}Ra$ separation by selective precipitation was performed on the PLS by two precipitation techniques, sulfate precipitation and hydroxide precipitation. The experimental procedure was identical for both. The general procedure included i) preparation of a 1 L glass vessel with feed solution (e.g., PLS); ii) adding precipitant ($NaSO_4$ or $H_2SO_4$); intensive mixing for 24 h at room temperature by magnetic stirrer on a stirring plate; iii) after target retention time, filtration of suspension through 1-2 μm filter paper; and iv) drying the leach residue at 105° C. and determining weight loss.

In embodiments, the precipitant is chosen from one or more of NaOH, $NaSO_4$ and/or $H_2SO_4$. In embodiments, the precipitant is concentrated or dilute.

The experimental parameters of the precipitation tests are summarized in Table 19.

TABLE 19

Parameters of selective precipitation with constant retention time (24 h) and temperature (RT)

| PLS | Source | Precipitant | Dosage $SO_4^{2-}$ (mmol/L) |
|---|---|---|---|
| SP_1 | VT_F-mix | $Na_2SO_4$ (S) | 0.76 |
| SP_2 | VT_F-mix | $Na_2SO_4$ (S) | 3.78 |
| SP_3 | VT_F-mix | $H_2SO_4$ (90%) | 0.76 |
| SP_4 | VT_F-mix | $H_2SO_4$ (90%) | 3.78 |
| SP_5 | VT_F-mix | NaOH (s + 50%) | addition to pH = 12 |
| SP_6 | VT_F-mix | $H_2SO_4$ (10%) | 1.45 |

The dosing at SP_1 and SP_3 corresponds to 57% of the stochiometric required amount of sulfate, while the dosage of test SP_2 and SP_4 was 287% of the stochiometric amount.

The experimental data is summarized in Table 20. The observed changes in pH, ORP and EC compared to the feed correspond to the expectation.

TABLE 20

Experimental data for SP_1 to SP_6

| Test ID | Precipitant | pH | ORP (SHE) in mV | EC in mS/cm | A in Bq | ΔA | $\xi^{PLS}_{Ra}$ in % | $\Delta\xi^{PLS}_{Ra}$ in % |
|---|---|---|---|---|---|---|---|---|
| VT-F_mix | — | 3.57 | 445 (654) | 118.5 | 385 | 94 | — | — |
| DMT_SP_1 | $Na_2SO_4$ | 3.61 | 451 (659) | 117.9 | 310 | 58 | 19.3 | 19.7 |
| DMT_SP_2 | $Na_2SO_4$ | 3.46 | 450 (658) | 117.9 | 314 | 75 | 18.3 | 19.9 |
| DMT_SP_3 | $H_2SO_4$ | 2.20 | 514 (723) | 118.2 | 296 | 88 | 23.0 | 18.8 |
| DMT_SP_4 | $H_2SO_4$ | 1.42 | 561 (769) | 119.0 | 304 | 68 | 21.1 | 19.3 |
| DMT_SP_5 | NaOH | 12.05 | 77 (285) | 170.2 | 283 | 51 | 26.3 | 18.0 |
| DMT_SP_6 | $H_2SO_4$ | 1.96 | 475 (682) | 118.0 | 340 | 59 | 11.7 | 21.5 |

The precipitation feed for the sulfate and hydroxide precipitation assays was prepared by mixing the filtrates from VT_2 to VT_4. The $^{226}Ra$ concentration was determined with $A_s$=366±89 Bq/L by γ-spectroscopy.

Sulfate precipitation assays were performed using $Na_2SO_4$ and $H_2SO_4$, for formation of (Ba,Ra) $SO_4$. During the tests with concentrated precipitants (SP_1 to SP_4) a chunky precipitate had formed immediately. To resuspend it and to force the quickest possible equilibration, the tests were stirred very intensively. A milky suspension had formed but still some larger agglomerates remained over in the filter cake. With diluted $H_2SO_4$, these agglomerates were not observed.

$^{226}Ra$ precipitation for the sulfate precipitation assays using concentrated precipitant (SP_1-4) was low (e.g., respectively 19.3%, 18.3%, 23.0%, 19.3%). A slight correlation to Ba could be found. The highest $^{226}Ra$ precipitation of the sulfate precipitation assays was achieved for SP_3 with concentrated $H_2SO_4$ (90%) in an under-stochiometric dosage (i.e., 57% under stochiometric). The higher precipitation efficiencies are believed to demonstrate, however, that it is not an effect of sulfate dosage but kinetics and equilibration. As such, it is expected that further dilution and longer retention times would favor a more selective $^{226}Ra$-precipitation and, thus, equilibration of the solution can be enhanced using a sulfate dosage close to stoichiometry, longer retention times and an increase in temperature.

The hydroxide precipitation aimed for a Ca reduced solution for further separation. The addition of NaOH was conducted in three steps. For the first two steps, solid NaOH was used and for the last addition, a 50% NaOH solution was used. A white slurry formed, and the filtration process was slow. During the NaOH addition, the pH and Ca concentration (by XRF) were monitored. Even only a slight addition of NaOH caused a significant increase in pH. With further NaOH addition, the Ca concentration reduced significantly and only minor changes in pH could be measured. This trend in pH is very typical for the hydroxide precipitation since the hydroxide is consumed by the formed $Ca(OH)_2$.

The selectivity of this precipitation is seen in the trends of the precipitation efficiencies of the alkaline earth elements, which precipitated in the order of increasing atomic numbers (Mg, Ca, Sr, Ba, Ra). The precipitation efficiency of Sr, Ba, and Ra is in the same order of magnitude and is probably due to adherent solution in the filter cake and a slight co-precipitation. With the precipitation efficiency of Ca being much higher, the cut between Ca and that of Sr, Ba and Ra is very clear. Thus, selective precipitation of Ca with hydroxide is a viable option.

$^{226}Ra$ Separation/Extraction by Ion Exchange. Another technique that can be used for extraction/separation of $^{226}Ra$ is ion exchange (IX). With ion exchange, the selectivity of an IX resin is used to remove $^{226}Ra$ from the solution, which is then enriched in an elution step. The separation effect is based on similar mechanisms as that of solvent extraction (SX). Compared to this, however, IX has the advantage in the present application of being able to process large solution volumes efficiently. In addition, the separation effect in an IX column is given in two dimensions since the concentration of the solution changes over the column length. As shown by Bi et al. a strong acidic cation exchange resin is suitable for the separation of $^{226}Ra$ from high-total dissolved solid (TDS) brines (Bi, Y.; Zhang, H.; Ellis, B. R.; Hayes, K. F. Removal of Radium from Synthetic Shale Gas Brines by Ion Exchange Resin. *Environmental Engineering Science* 2016, 33 (10), 791-798. DOI: 10.1089/ees.2016.0002.) The enhanced selectivity for $Ra^{2+}$ is attributed to the resin's greater affinity for larger cations, which possess lower hydration energy and can more effectively release water molecules during the ion exchange process (Bi, 2016).

$^{226}Ra$ separation by ion exchange was performed on the PLS. The experimental procedure included: i) washing of resin with water to remove contaminants; ii) preparation of a reaction vessel with the feed solution (PLS); iii) adding resin (MDS 200H); iv) mixing for 24 h at room temperature with an overhead shaker; v) after target retention time, filtration of suspension through 5-13 μm fluted filter. A 10 L large scale test was conducted in a larger vessel with a mechanical PTFE stirrer. The stirring speed was set low to ensure gentle agitation of the resin. The experimental parameters of the ion exchange separation are summarized in Table 21.

TABLE 21

Test parameters of IX tests conducted with constant retention time (24 h) and temperature (RT)

| ID | Solution | Feed Volume in L | Resin | Resin Volume in mL |
|---|---|---|---|---|
| DMT_IX_1 | DMT_VT | 1.05 | MDS 200H | 10.25 |
| DMT_IX_2 | DMT_VT | 1.05 | MDS 200H | 102.6 |
| DMT_IX_3 | DMT_VT | 10.00 | MDS 200H | 10.38 |
| DMT_IX_4 | DMT_VT | 0.53 | MDS 200H | 202.6 |

The analytical program consisted of: i) pH, ORP, EC determination of the solution samples at ambient conditions; ii) Elemental analysis of filtrate by XRF; iii) Elemental analysis by ICP-MS/OES of selected samples; and iv) γ-spectroscopy of the filtrate.

Experimental data were evaluated to determine the efficacy of $^{226}Ra$ separation from impurities and alkaline earth elements. The following parameters were calculated to evaluate the process.

For the IX test work a strongly acidic gel type cation exchange resin in its $H^+$ form, LEWATIT® MDS 200 H, was used. The functional group of this resin is sulfonic acid, and it is a resin for IX chromatography with very small beads of a uniform size. This resin is similar to the Purolite C100E cation exchange resin used by Bi at al. (Bi, 2016).

To evaluate the selectivity of the resin towards $^{226}Ra$, batch tests with varying volumes of wet settled resin (WSR) and feed solution were conducted. The aim of these tests was not the complete extraction of $^{226}Ra$ but to achieve the maximum loading of the resin with $^{226}Ra$ to determine the applicability of the selected resin for the separation of $^{226}Ra$.

Table 22 summarizes the experimental data of the tests:

TABLE 22

Experimental data for IX_1 to IX_4

| Test ID | Resin | pH | ORP (SHE) in mV | EC in mS/cm | $A_s$ in Bq/L | $\Delta A_s$ | $\xi^{PLS}_{Ra}$ in % | $\Delta\xi^{PLS}_{Ra}$ in % |
|---|---|---|---|---|---|---|---|---|
| VT-F_mix | — | 3.57 | 445 (654) | 118.5 | 366.2 | 89.3 | — | — |

TABLE 22-continued

| Experimental data for IX_1 to IX_4 | | | | | | | | |
|---|---|---|---|---|---|---|---|---|
| Test ID | Resin | pH | ORP (SHE) in mV | EC in mS/cm | $A_s$ in Bq/L | $\Delta A_s$ | $\xi^{PLS}_{Ra}$ in % | $\Delta\xi^{PLS}_{Ra}$ in % |
| DMT_IX_1 | MDS 200H | 1.15 | 504 (714) | 120.5 | 251.7 | 71.4 | 31.8 | 16.6 |
| DMT_IX_2 | MDS 200H | 0.23 | 727 (936) | 140.5 | 270.3 | 58.1 | 27.4 | 17.7 |
| DMT_IX_3 | MDS 200H | 2.16 | 536 (743) | 118.70 | 332.8 | 64.2 | 10.3 | 21.9 |
| DMT_IX_4 | MDS 200H | 0.25 | 825 (1033) | 201.00 | 250.6 | 58.6 | 31.6 | 16.7 |

It can be seen that the acidity of the obtained solution increases due to the exchange of protons of the resin with cation of the solution. The ORP increased with decreasing pH due to the formation of $HNO_3$.

Figure 12A:
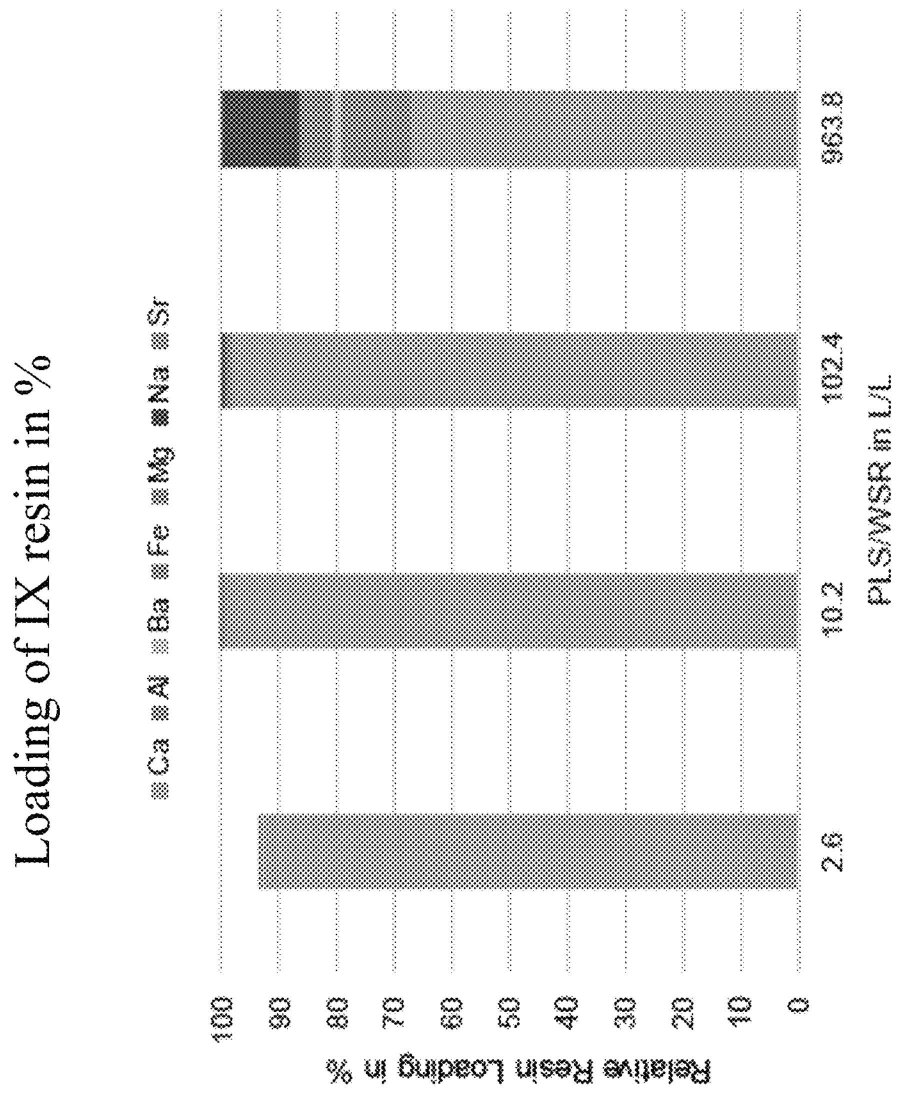
FIG. 12A Loading of IX resin in % is shown in FIG. 12A and Ra load depending of PLS/resin ratio in 12B FIG. 12B Loading of IX resin in % is shown in FIG. 12A and Ra load depending of PLS/resin ratio in 12B

Based on the elemental composition of the extraction raffinates and the theoretical capacity of the resin (2.3 eq/$L_{WSR}$) the relative load of the resin was calculated (cf. FIG. 12A). Loading of IX resin in % is shown in FIG. 12A and Ra load depending of PLS/resin ratio in 12B.

Figure 12B:
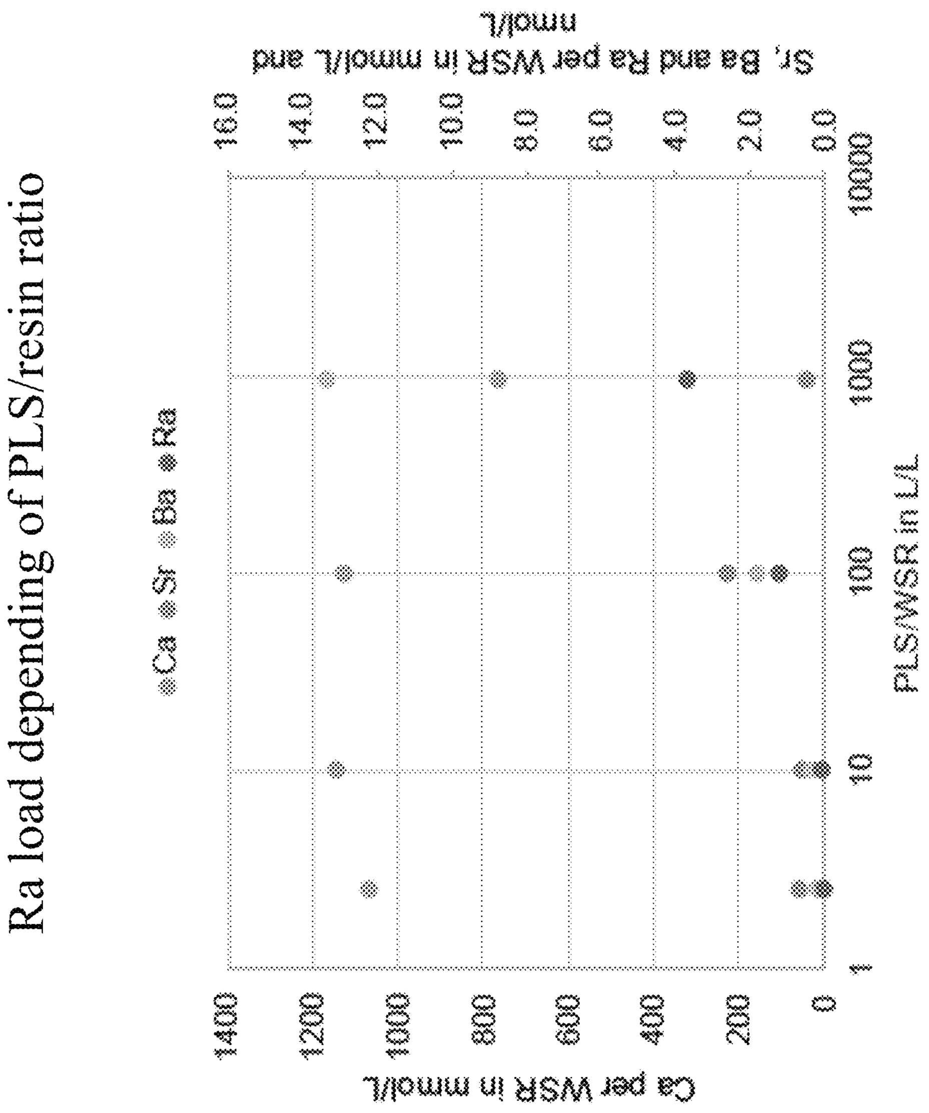

In FIG. 12B it can be seen that the reduction of available binding sites (by increasing the volume of PLS per WSR) leads to an increase in selectivity for $Ba^{2+}$ and $Ra^{2+}$. In test IX_1, a resin loading of 1.21 nmol/$L_{WSR}$ $Ra^{2+}$ (11928 Bq/$L_{WSR}$) could be achieved. Due to the small effect of the exchange reaction on the overall Ca concentration, the extraction efficiencies of test IX_1 and IX_3 were $\zeta^{PLS}=0$. Therefore, the Ca concentration of the solutions was calculated assuming that Ca occupied all binding sites not occupied by the other particular ions. This assumption ignores the competition with H ions, therefore the indicated amount of Ca extracted is the sum of $Ca^{2+}$ and $H^+$ at the resin. For Test IX_4 (2.6 L PLS/$L_{WSR}$) this assumption did not apply. The Ca extraction is $\zeta^{PLS}=18\%$ which leads to a difference of 6.9% with respect to the capacity of the resin. This difference can be explained by the increasing acidity of the solution and the associated increased concurrence to H. In addition, there is the relatively high influence of the analysis error of the Ca determination.

Figure 13:
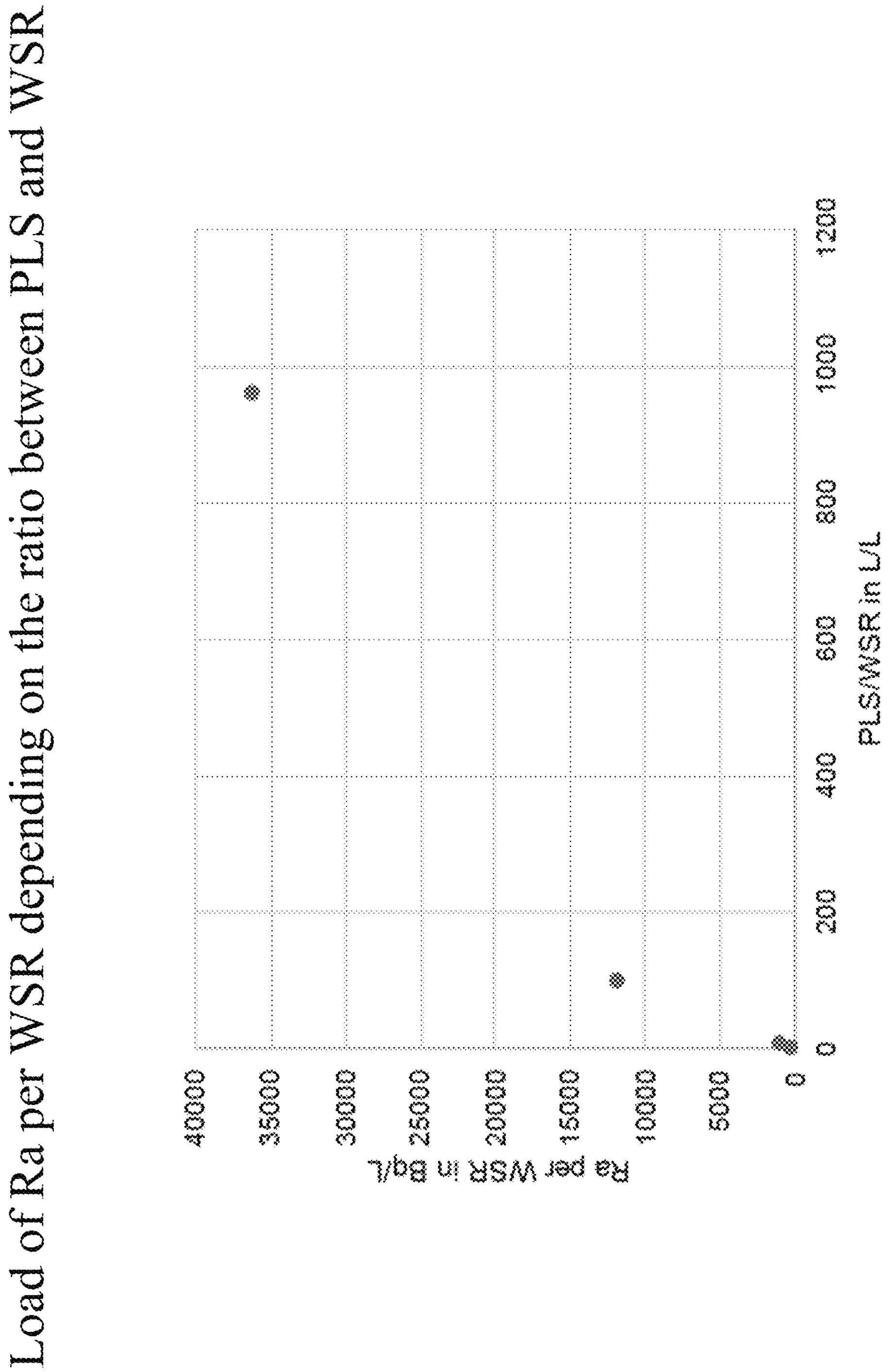
FIG. 13 is a graph showing load of Ra per WSR depending on the ratio between PLS and WSR.

FIG. 13 shows the load of Ra per WSR depending on the ratio between PLS and WSR. In particular, for IX_3 a resin loading of 3.69 nmol/$L_{WSR}$ $Ra^{2+}$ (36309 Bq/$L_{WSR}$).

At the same time, the Ca loading was greatly reduced. Thus, the resin is highly selective for Ra which makes is applicable for Ra separation.

In an IX process, the resin is a packed column over which the feed solution is passed. In this case, the exchange process retains all ions in the order of their affinity and the raffinate is free of these ions and strongly acidic due to the exchange of the H. As the load increases, the concentration of ions in the raffinate increases until the feed concentration is reached. This is the so-called breakthrough of the respective ion. Based on the results of tests IX_3, at least 1000 L of PLS can be processed with 1 L of WSR to remove $Ra^{2+}$ from solution.

In addition to further verification tests, the prior purification of the PLS is recommended to remove the competing ions such as $Fe^{3+}$ and $Al^{3+}$. A pH adjustment to pH=7 could already be sufficient for this.

After loading the resin with ions, they can be eluted with a salt solution or a strong acid. Based on the results of the present tests, the different affinity of the ions to the resin can also be exploited and these can be fractionally washed out of the resin with, for example, a pH gradient, thus obtaining an additionally purified $^{226}Ra$ fraction. For this step, the type of acid is selectable and can be adjusted to the $^{226}Ra$ production process that would follow.

In embodiments, IX shows high affinity of the Ra to the resin and the obtained IX raffinate is ideally free of Ra and shows only low concentrations of Ba and Sr. Thus, optionally after neutralization of the increased acidity, this solution can again be used (recycled) as a lixiviant for $^{226}Ra$ leaching. This recycling reduces chemical costs and reduces waste streams of the process.

EXAMPLE 5—Purifying Phosphogypsum

Methods of embodiments of the invention include methods of purifying phosphogypsum. For example, PG (fresh or aged/stockpiled) can be treated with a leach solution (lixiviant) to remove $^{226}Ra$ from the PG. Such lixiviants include one or more of: $H_2O$ (water, de-ionized water, tap water, rain water, etc.); NaCl (such as 1-20%, such as 5%, 10% or 15% NaCl); a solution of NaCl+$BaCl_2$ (such as 10% NaCl+0.1% $BaCl_2$, or 20% NaCl+0.2% $BaCl_2$, or 1-20% NaCl+0.05-0.5% $BaCl_2$,); $Ca(NO_3)_2$ (such as 2-40% $Ca(NO_3)_2$, such as 5%, 10%, 15%, 20%, 25%, 30%, or 35% $Ca(NO_3)_2$); $NH_4$+Ac (such as 2-30% $NH_4Ac$, such as 5%, 10%, 15%, 20%, or 25% $NH_4Ac$); lime water (e.g., saturated lime water); NaOH (such as 5-30% NaOH, such as 5%, 10%, 15%, 20%, or 25% NaOH); $H_2SO_4$ (such as 2-20% $H_2SO_4$, such as 5%, 10%, or 15% $H_2SO_4$); $HNO_3$ (such as 2-20% $HNO_3$, such as 3%, 4%, 5%, 10%, or 15% $HNO_3$); $H_2Ox$ (such as 2-20% $H_2Ox$, such as 5%, 10%, or 15% $H_2Ox$); a solution of $Ca(NO_3)_2$+$HNO_3$ (such as 5% $Ca(NO_3)_{2+3}$% $HNO_3$, such as 10% $Ca(NO_3)_{2+5}$% $HNO_3$, such as 15% $Ca(NO_3)_{2+2}$-10% $HNO_3$, such as 5% $Ca(NO_3)_{2+5}$-15% $HNO_3$, such as 10% $Ca(NO_3)_{2+2}$-10% $HNO_3$). In particular embodiments, the lixiviant comprises one or more of $Ca(NO_3)_2$, $HNO_3$. $NH_4Ac$, and/or $H_2Ox$.

The lixiviant can be allowed to react with the PG for 2-6 hours at a temperature in the range of about 40-70° C. to obtain a pregnant leach solution (PLS) (leachate comprising $^{226}Ra$) and solids. The solids (leach residue) can be separated from the leachate/PLS by one or more physical or chemical processes, such as filtering. At least a portion of the solids can be further processed to provide NORM-free gypsum and/or NORM-free fertilizer. For example, the NORM-free gypsum and/or fertilizer can be processed in a manner such that the $^{226}Ra$ concentration is in an amount of no more than about 20 picocuries per gram (pCi/g), no more than about 15 pCi/g, no more than about 10 pCi/g, no more than about 7 pCi/g, or about 5 picocuries per gram (pCi/g) or less. In particular embodiments, the $^{226}Ra$ concentration of the NORM-free gypsum and/or fertilizer is in an amount of about 10 pCi/g or less.

Additionally or alternatively, the NORM-free gypsum and/or fertilizer can have a concentration of Pb, Cr and/or Cd (or other contaminants, such as heavy metals) below a selected limit. For example, one or more separation techniques can be performed to remove or reduce the amount of any one or more of the following constituents: one or more alkaline earth metals, including for example radium, calcium, barium; one or more of thorium, uranium, fluorine, phosphorus, phosphate; naturally occurring radioactive material (NORM); technologically enhanced naturally occurring radioactive material (TENORM); gypsum; heavy metals, such as Zn, Cr, Mn, Ni, Pb, Cd, As, Hg, Ag, Cu, Fe, Pd, Pt; rare earth elements (REEs), such as: i) Sb, Be, Co, Ga, Ge, Mg, In; ii) Platinum Group Elements (PGMs), such as platinum, palladium, rhodium, ruthenium, iridium, osmium; iii) Nb and Ta; iv) lanthanides (such as light REEs (LREEs), including La, Ce, Pr, Nd, Pm, Sm, and heavy rare earth elements (HREEs), including Eu, Gd, Tb, Dy, Ho, Er, Tm, Yb, Lu); and/or to remove/reduce the amount of Sc, Y (an HREE).

In particular embodiments for NORM-free fertilizer, the fertilizer can be processed in such manner to comprise no more than 20 mg $kg^{-1}$ $P_2O_5$.

For example, as described by Weizhen Liu, et al., Effective Extraction of Cr(VI) from Hazardous Gypsum Sludge via Controlling the Phase Transformation and Chromium Species, *Environ. Sci. Technol.* 2018, 52, 22, 13336-13342 (Oct. 24, 2018), DOI: 10.1021/acs.est.8b02213, the dissolution-recrystallization of $CaSO_4 \cdot 2H_2O$ into $CaSO_4$ can be used to release encapsulated Cr(VI) from phosphogypsum, with a persulfate salt providing H and $SO_4^{2-}$ ions. The H ions provide for an acidic condition for transforming $CrO_4^{2-}$ into $Cr_2O_7^{2}$ with less similarity to $SO_4^{2-}$, which prevents the recombination of the Cr(VI) with gypsum. The $SO_4^{2-}$ ions accelerate crystal growth of calcium sulfate and enhance Cr(VI) extraction. Such removal of Cr can be performed before or after removal of $^{226}Ra$ from the phosphogypsum.

Lead can be removed before or after either of $^{226}Ra$ or Cr removal. Techniques for removing/reducing the amount of lead, if present, can include the remediation of lead contaminated gypsum sludge by washing the hazardous waste with hydrochloric acid (HCl) and ethylenediaminetetraacetic acid (EDTA) solutions. In some cases, EDTA is more efficient than HCl in lead extraction, but either can be used. Further, based on its high lead removal efficiency and lesser dissolution of solids, 0.1 M EDTA is considered as a most effective washing agent for removing lead from contaminated gypsum sludge. See, e.g., GC Raju, et al., Remediation of Lead Contaminated Gypsum Sludge, Geotechnical Special Publication, DOI: 10.1061/40970 (309) 71, Conference: GeoCongress (March 2008).

The present disclosure has described particular implementations having various features. In light of the disclosure provided herein, it will be apparent to those skilled in the art that various modifications and variations can be made without departing from the scope or spirit of the disclosure. One skilled in the art will recognize that the disclosed features may be used singularly, in any combination, or omitted based on the requirements and specifications of a given application or design. When an implementation refers to "comprising" certain features, it is to be understood that the implementations can alternatively "consist of" or "consist essentially of" any one or more of the features. Other implementations will be apparent to those skilled in the art from consideration of the specification and practice of the disclosure.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the disclosure fall within the scope of the disclosure. Further, all of the references cited in this disclosure including patents, published applications, and non-patent literature are each individually incorporated by reference herein in their entireties and as such are intended to provide an efficient way of supplementing the enabling disclosure as well as provide background detailing the level of ordinary skill in the art.

The invention claimed is:

1. A method of processing phosphogypsum (PG), the method comprising:

combining phosphogypsum (PG) with a leach solution comprising $Na(NO_3)_2$ and/or $Ca(NO_3)_2$;

reacting the leach solution with the PG for a time and temperature sufficient to obtain i) leachate comprising an amount of radium and/or $^{226}Ra$ extracted from the PG and ii) solids;

and separating the leachate from the solids.

2. The method of claim 1, comprising not repeating the reacting step, thereby performing only a single leaching step.

3. The method of claim 2, wherein:

the leachate comprises at least 70% of the radium and/or $^{226}Ra$ from the PG; or the solids comprise a non-detectable amount of radium and/or $^{226}Ra$, or a concentration of no more than about 10 picocuries per gram (pCi/g) of radium and/or $^{226}Ra$.

4. The method of claim 1, further comprising:

separating an amount of radium and/or $^{226}Ra$ from the leachate by ion exchange.

5. The method of claim 4, wherein the separating by ion exchange is performed by contacting at least a portion of the leachate with an ion exchange resin.

6. The method of claim 1, further comprising:

prior to the reacting, separating a fine fraction from the PG and performing the reacting with the fine fraction to obtain the leachate and the solids;

wherein at least 75% of particles of the fine fraction are less than 25 μm in diameter.

7. The method of claim 6, further comprising:

separating an amount of radium and/or $^{226}Ra$ from the leachate by way of ion exchange.

8. The method of claim 7, wherein the separating by ion exchange is performed by contacting at least a portion of the leachate with an ion exchange resin.

9. The method of claim 6, further comprising:

grinding particles of the fine fraction prior to or during the reacting and/or the separating.

10. The method of claim 9, further comprising subjecting at least a portion of the leachate and/or at least a portion of the solids to one or more separation techniques.

11. The method of claim 10, wherein one or more of the separation techniques is chosen from separation by precipitation, ion exchange, solvent extraction, or membrane technologies.

12. The method of claim 10, wherein:

one or more of the separation techniques is capable of separating one or more of the following constituents from the leachate and/or the solids:

one or more alkaline earth metals;

technologically enhanced naturally occurring radioactive material (TENORM);

gypsum; and/or heavy metals.

13. The method of claim 10, wherein one or more of the separation techniques comprises:

precipitation and/or ion exchange; and/or precipitation with hydroxide; and/or precipitation of $Ca(OH)_2$; and/or
precipitation with sulfate; and/or
precipitation of (Ba,Ra) $SO_4$.

14. The method of claim 13, wherein one or more of the separation techniques comprises:
reducing Ca content of the leachate to provide a Ca-reduced leachate; and
separating an amount of radium and/or $^{226}Ra$ from the Ca-reduced leachate by way of selective precipitation, ion exchange, solvent extraction, and/or membrane technologies.

15. The method of claim 10, wherein one or more of the separation techniques comprises:
ion exchange with acidic gel type cation exchange resin; or
ion exchange with one or more cation exchange resin; wherein the cation is $H^+$; and/or
wherein the cation exchange resin comprises sulfonic acid functional groups.

16. The method of claim 10, further comprising:
subjecting the leachate to ion exchange by contacting at least a portion of the leachate with an ion exchange resin and separating an amount of radium and/or $^{226}Ra$ from the leachate to provide a recyclable leach solution;
recycling and combining the recyclable leach solution with a second batch of PG comprising radium and/or $^{226}Ra$;
allowing the recycled leach solution to react with the second batch of PG to obtain a second batch of leachate and a second batch of solids;
separating the second batch of leachate from the second batch of solids;
subjecting the second batch of leachate to ion exchange by contacting at least a portion of the second batch of leachate with an ion exchange resin; and
separating an amount of radium and/or $^{226}Ra$ from the second batch of leachate.

17. The method of claim 10, further comprising:
processing at least a portion of the solids into NORM-free gypsum having a non-detectable amount, or a concentration of no more than about 10 picocuries per gram (pCi/g) of radium and/or $^{226}Ra$.

18. The method of claim 1, wherein the leach solution comprises $Na(NO_3)_2$.

19. The method of claim 1, wherein the leach solution comprises $Ca(NO_3)_2$.

20. The method of claim 19, wherein:
the time the leach solution is reacted with the material PG is for about 2-6 hours; and
the temperature is in the range of about 40-70° C.

21. The method of claim 1, wherein the leach solution comprises about 10-30% $Ca(NO_3)_2$.

* * * * *